US011304226B2

(12) United States Patent
Nogami et al.

(10) Patent No.: US 11,304,226 B2
(45) Date of Patent: Apr. 12, 2022

(54) USER EQUIPMENTS, BASE STATIONS AND METHODS

(71) Applicants: Sharp Kabushiki Kaisha, Sakai (JP); FG Innovation Company Limited, Hong Kong (CN)

(72) Inventors: Toshizo Nogami, Vancouver, WA (US); Zhanping Yin, Vancouver, WA (US)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 53 days.

(21) Appl. No.: 15/586,958

(22) Filed: May 4, 2017

(65) Prior Publication Data

US 2017/0325258 A1 Nov. 9, 2017

Related U.S. Application Data

(60) Provisional application No. 62/333,590, filed on May 9, 2016.

(51) Int. Cl.
*H04W 72/14* (2009.01)
*H04L 5/14* (2006.01)
(Continued)

(52) U.S. Cl.
CPC ............ *H04W 72/14* (2013.01); *H04J 11/00* (2013.01); *H04L 1/0068* (2013.01); *H04L 5/001* (2013.01);
(Continued)

(58) Field of Classification Search
CPC ........................... H04W 72/14; H04L 27/2613
See application file for complete search history.

(56) References Cited

U.S. PATENT DOCUMENTS

| 2014/0254522 | A1* | 9/2014 | Aiba | ...................... H04L 5/0037 |
| | | | | 370/329 |
| 2016/0192396 | A1* | 6/2016 | Ng | ...................... H04W 74/0808 |
| | | | | 370/329 |
| 2016/0255577 | A1* | 9/2016 | Kazmi | ...................... H04J 11/00 |
| | | | | 370/311 |

FOREIGN PATENT DOCUMENTS

| CN | 104333902 | 2/2015 |
| CN | 104539405 | 4/2015 |

(Continued)

OTHER PUBLICATIONS

3 Generation Partnership Project; Technical Specification Group Radio Access Network; Evolved Universal Terrestrial Radio Access (E-UTRA); Physical layer procedures (Release 13), 3GPP Standard; 3GPP TS 36.213, France, vol. RAN WG1, No. V13.1.1, pp. 255-333 Mar. 2016 (Year: 2016) (Year: 2016).*

(Continued)

*Primary Examiner* — Jung H Park
*Assistant Examiner* — Sumitra Ganguly
(74) *Attorney, Agent, or Firm* — ScienBiziP, P.C.

(57) ABSTRACT

A UE is described that includes a higher layer processor configured to receive a dedicated RRC configuration message which configures a License Assisted Access (LAA) cell. The UE also includes a PDCCH receiver configured to receive a first PDCCH and a second PDCCH. The first PDCCH is a PDCCH with CRC scrambled by CC-RNTI, and with a DCI format which contains a subframe configuration field. The second PDCCH is a PDCCH with DCI formats for scheduling physical uplink shared channel(s) (PUSCH(s)) on the LAA cell. If the first PDCCH is detected in subframe n, and the first PDCCH is not detected in subframe n−1, and if the number of occupied OFDM symbols for the subframe n indicated by the subframe configuration field in the subframe n is less than 14, the UE is not (Continued)

required to receive any other physical channels in subframe n except for the second PDCCH.

4 Claims, 34 Drawing Sheets

(51) Int. Cl.
| | |
|---|---|
| *H04L 5/00* | (2006.01) |
| *H04L 27/26* | (2006.01) |
| *H04W 72/12* | (2009.01) |
| *H04J 11/00* | (2006.01) |
| *H04L 1/00* | (2006.01) |
| *H04W 88/02* | (2009.01) |
| *H04W 88/08* | (2009.01) |
| *H04W 16/14* | (2009.01) |

(52) U.S. Cl.
CPC .......... *H04L 5/0087* (2013.01); *H04L 5/0092* (2013.01); *H04L 5/1469* (2013.01); *H04L 27/2602* (2013.01); *H04L 27/2613* (2013.01); *H04W 72/1268* (2013.01); *H04W 72/1289* (2013.01); *H04W 72/1294* (2013.01); *H04J 2211/006* (2013.01); *H04L 5/0023* (2013.01); *H04W 16/14* (2013.01); *H04W 72/1215* (2013.01); *H04W 88/02* (2013.01); *H04W 88/08* (2013.01)

(56) References Cited

FOREIGN PATENT DOCUMENTS

| WO | 2015105440 | | 7/2015 |
|---|---|---|---|
| WO | 2015131806 | A1 | 9/2015 |

OTHER PUBLICATIONS

3 Generation Partnership Project; Technical Specification Group Radio Access Network; Evolved Universal Terrestrial RadioAccess (E-UTRA); Physical layer procedures (Release 13), 3GPP Standard; 3GPP TS 36.213, France, voi.RAN WG1, No. VI3.1.1, pp. 255-333 Mar. 2016 (Year: 2016) (Year: 2016).*

LG Electronics, Qualcomm, Sharp, [Nokia], [Alcatel-Lucent Shanghai Bell] . . . WF on PUSCH multi-subframe scheduling in LAA, 3GPP TSG RAN WG1 Meeting #84bis, Busan, Korea, R1-163565, Apr. 15, 2016 (Year: 2016) (Year: 2016).*

International Search Report and Written Opinion issued for PCT Application No. PCT/US2017/031552 dated Jul. 25, 2017.

"3 Generation Partnership Project; Technical Specification Group Radio Access Network; Evolved Universal Terrestrial Radio Access (E-UTRA); Physical layer procedures (Release 13)", 3GPP Standard; 3GPP TS 36.213, France, vol. RAN WG1, No. V13.1.1, pp. 255-333 Mar. 2016.

LG Electronics, Qualcomm, Sharp, [Nokia], [Alcatel-Lucent Shanghai Bell], . . . , "WF on PUSCH multi-subframe scheduling in LAA", 3GPP TSG RAN WG1 Meeting #84bis, Busan, Korea, R1-163565, Apr. 15, 2016.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.1.0, France, pp. 1-551 Mar. 2016.

LG Electronics, "Discussion on the ETSI regulation of occupied channel bandwidth", 3GPP TSG RAN WG1 Meeting #84, St. Julian's, Malta, R1-160623, Feb. 19, 2016.

Nokia Networks, Alcatel-Lucent, Alcatel-Lucent Shanghai Bell, "UL waveform for LAA PUSCH", 3GPP TSG RAN WG1 Meeting #84, St. Julian's, Malta, R1-160775, Feb. 19, 2016.

Samsung, "UL Waveform and PUSCH Resource Allocation", 3GPP TSG RAN WG1 Meeting #84, St. Julian's, Malta, R1-160559, Feb. 19, 2016.

Sequans Communications, "Considerations for LAA UL Waveform Design", 3GPP TSG RAN WG1 Meeting #84, St. Julian's, Malta, R1-160399, Feb. 19, 2016.

Fujitsu, "Evaluation results for UL LBT and PUSCH Design", 3GPP TSG RAN WG1 Meeting #84, St. Julian's, Malta, R1-160490, Feb. 19, 2016.

Broadcom Limited, "Discussion on LAA UL LBT Design", 3GPP TSG RAN WG1 Meeting #84, St. Julian's, Malta, R1-160817, Feb. 19, 2016.

Ericsson, "On UL Channel Access Procedures for Enhanced LAA", 3GPP TSG RAN WG1 Meeting #84, St. Julian's, Malta, R1-161001, Feb. 19, 2016.

Qualcomm Incorporated, "Cross-carrier scheduling for UL", 3GPP TSG RAN WG1 Meeting #84, St. Julian's, Malta, R1-160891, Feb. 19, 2016.

CATT, "Uplink channel access scheme for LAA Scell", 3GPP TSG RAN WG1 Meeting #84, St. Julian's, Malta, R1-160359, Feb. 19, 2016.

3GPP TR 36.889 V0.2.2 "Technical Specification Group Radio Access Network; Study on Licensed-Assisted Access to Unlicensed Spectrum (Release 13)," R1-150949, Feb. 2015 Feb. 1, 2015.

3GPP TS 36.211. v13.0.0, Evolved Universal Terrestrial Radio Access (E-UTRA); Physical channels and modulation (Release 13), Dec. 2015.

* cited by examiner

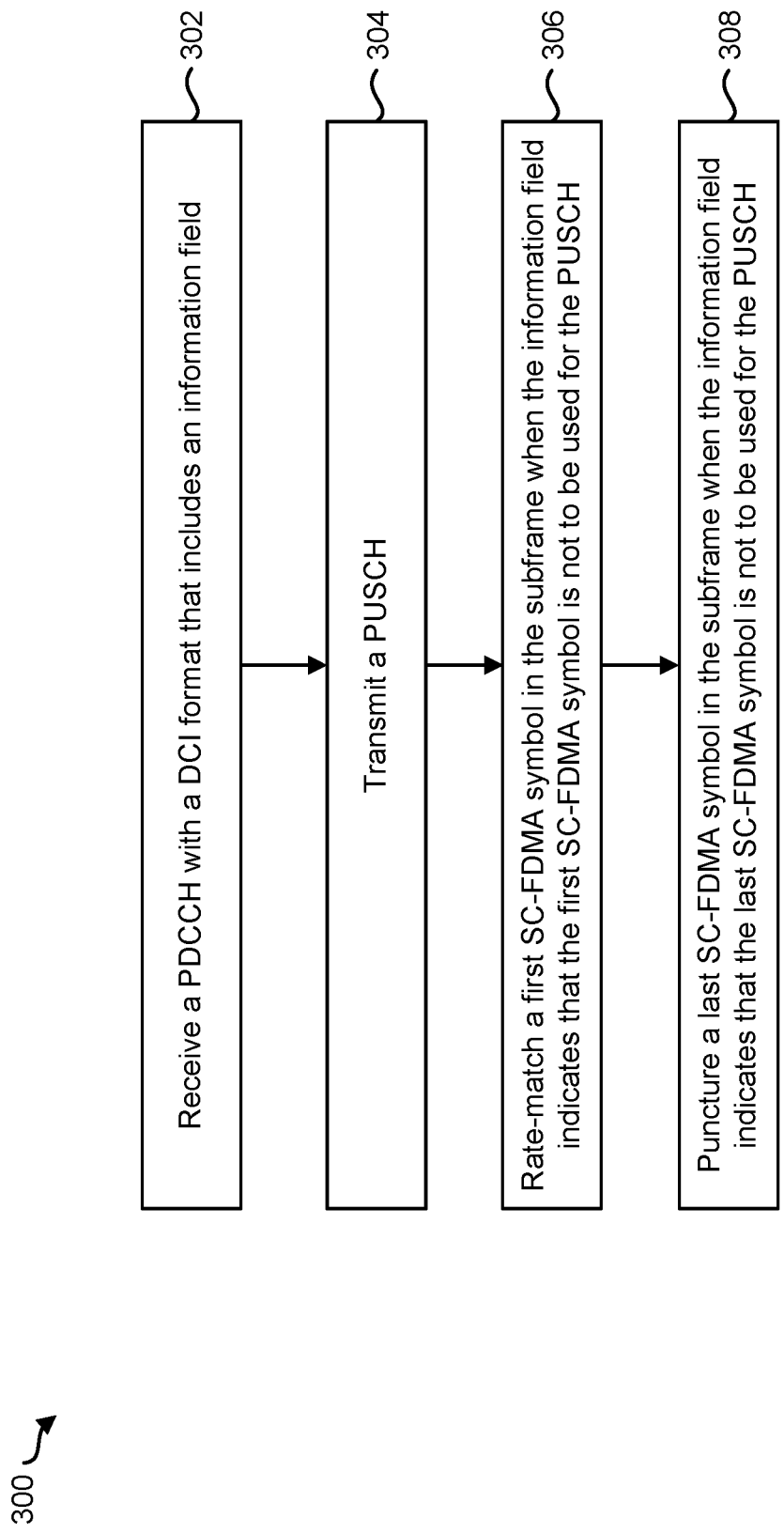

USER EQUIPMENTS, BASE STATIONS AND METHODS

RELATED APPLICATIONS

This application is related to and claims priority from U.S. Provisional Patent Application No. 62/333,590, entitled "USER EQUIPMENTS, BASE STATIONS AND METHODS," filed on May 9, 2016, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 3 is a flow diagram illustrating a method by a UE;

DETAILED DESCRIPTION

Figure 1:
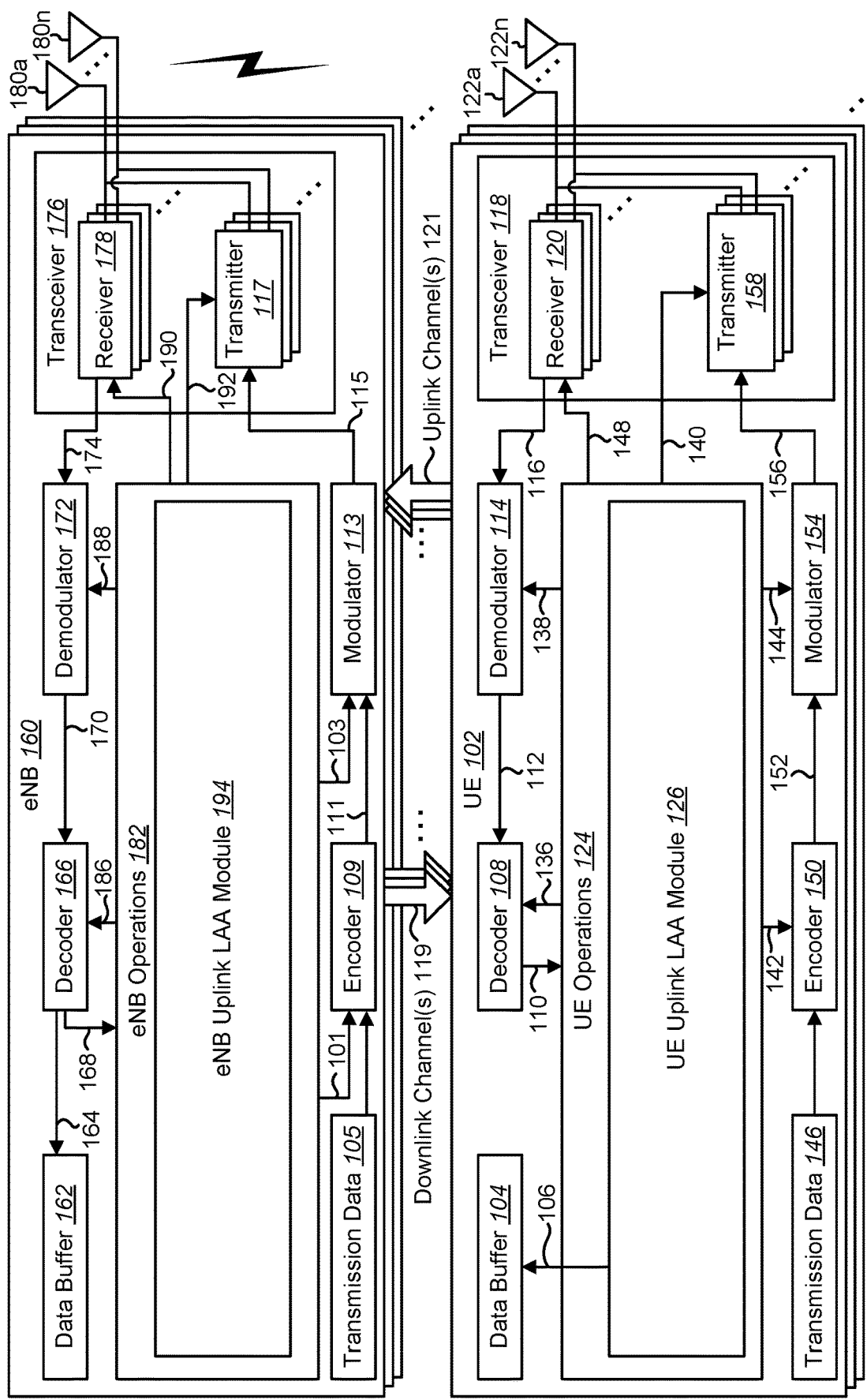
FIG. 1 is a block diagram illustrating one implementation of one or more evolved NodeBs (eNBs) and one or more user equipments (UEs) in which systems and methods for uplink Licensed-Assisted Access (LAA) operations may be implemented.

A user equipment (UE) is described. The UE includes a higher layer processor configured to receive a dedicated radio resource control (RRC) configuration message which configures a License Assisted Access (LAA) cell. The UE also includes a physical downlink control channel (PDCCH) receiver configured to receive a first PDCCH and a second PDCCH. The first PDCCH is a PDCCH with Cyclic Redundancy Check (CRC) scrambled by Common Control-Radio Network Temporary Identifier (CC-RNTI), and with a Downlink Control Information (DCI) format which contains a subframe configuration field. The second PDCCH is a PDCCH with DCI formats for scheduling physical uplink shared channel(s) (PUSCH(s)) on the LAA cell. If the first PDCCH is detected in subframe n, and the first PDCCH is not detected in subframe n−1, and if the number of occupied Orthogonal Frequency Division Multiplexing (OFDM) symbols for the subframe n indicated by the subframe configuration field in the subframe n is less than 14, the UE is not required to receive any other physical channels in subframe n except for the second PDCCH.

An evolved node B (eNB) communicating with a UE is also described. The eNB includes a higher layer processor configured to send the UE a dedicated RRC configuration message which configures a LAA cell. The eNB also includes a PDCCH transmitter configured to transmit a first PDCCH and a second PDCCH. The first PDCCH is a PDCCH with CRC scrambled by CC-RNTI, and with a DCI format which contains a subframe configuration field. The second PDCCH is a PDCCH with DCI formats for scheduling physical uplink shared channel(s) (PUSCH(s)) on the LAA cell. If the first PDCCH is detected in subframe n, and the first PDCCH is not detected in subframe n−1, and if the number of occupied OFDM symbols for the subframe n indicated by the subframe configuration field in the subframe n is less than 14, the UE is not required to receive any other physical channels in subframe n except for the second PDCCH.

A method for a UE is also described. The method includes receiving a dedicated RRC configuration message which configures a LAA cell. The method also includes receiving a first PDCCH. The method further includes receiving a second PDCCH. The first PDCCH is a PDCCH with CRC scrambled by CC-RNTI, and with a DCI format which contains a subframe configuration field. The second PDCCH is a PDCCH with DCI formats for scheduling physical uplink shared channel(s) (PUSCH(s)) on the LAA cell. If the first PDCCH is detected in subframe n, and the first PDCCH is not detected in subframe n−1, and if the number of occupied Orthogonal Frequency Division Multiplexing (OFDM) symbols for the subframe n indicated by the subframe configuration field in the subframe n is less than 14, the UE is not required to receive any other physical channels in subframe n except for the second PDCCH.

A method for an eNB communicating with a UE is also described. The method includes sending the UE a dedicated RRC configuration message which configures a LAA cell. The method also includes transmitting a first PDCCH. The method further includes transmitting a second PDCCH. The first PDCCH is a PDCCH with CRC scrambled by CC-RNTI, and with a DCI format which contains a subframe configuration field. The second PDCCH is a PDCCH with DCI formats for scheduling physical uplink shared channel(s) (PUSCH(s)) on the LAA cell. If the first PDCCH is detected in subframe n, and the first PDCCH is not detected in subframe n−1, and if the number of occupied OFDM symbols for the subframe n indicated by the subframe configuration field in the subframe n is less than 14, the UE is not required to receive any other physical channels in subframe n except for the second PDCCH.

A user equipment (UE) is also described that includes a physical downlink control channel (PDCCH) receiver configured to receive a PDCCH with a downlink control information (DCI) format, the PDCCH scheduling at least one physical uplink shared channel (PUSCH) in a subframe, the subframe including 14 single carrier-frequency domain multiple access (SC-FDMA) symbols, the DCI format including an information field for indicating (1) whether the first SC-FDMA symbol in the subframe is to be used for the PUSCH or not and (2) whether the last SC-FDMA symbol in the subframe is to be used for the PUSCH or not. The UE also includes a PUSCH transmitter configured to transmit the PUSCH. In a case that the information field indicates the first SC-FDMA symbol in the subframe is not to be used for the PUSCH, the first SC-FDMA symbol is rate-matched. In a case that the information field indicates the last SC-FDMA symbol in the subframe is not to be used for the PUSCH, the last SC-FDMA symbol is punctured.

The information field may also indicate whether the PUSCH transmission in the subframe is granted or not. The information field may also indicate a channel access scheme for the subframe.

An evolved node B (eNB) is also described. The eNB includes a PDCCH transmitter configured to transmit a PDCCH with a DCI format, the PDCCH scheduling at least one PUSCH in a subframe, the subframe including 14 SC-FDMA symbols, the DCI format including an information field for indicating (1) whether the first SC-FDMA symbol in the subframe is to be used for the PUSCH or not and (2) whether the last SC-FDMA symbol in the subframe is to be used for the PUSCH or not. The eNB also includes a PUSCH receiver configured to receive the PUSCH. In a case that the information field indicates the first SC-FDMA symbol in the subframe is not to be used for the PUSCH, the eNB assumes that the first SC-FDMA symbol is rate-matched. In a case that the information field indicates the last SC-FDMA symbol in the subframe is not to be used for the PUSCH, the eNB assumes that the last SC-FDMA symbol is punctured.

A method for a UE is also described. The method includes receiving a PDCCH with a DCI format, the PDCCH scheduling at least one PUSCH in a subframe, the subframe including 14 SC-FDMA symbols, the DCI format including an information field for indicating (1) whether the first SC-FDMA symbol in the subframe is to be used for the PUSCH or not and (2) whether the last SC-FDMA symbol in the subframe is to be used for the PUSCH or not. The method also includes transmitting the PUSCH. In a case that the information field indicates the first SC-FDMA symbol in the subframe is not to be used for the PUSCH, the first SC-FDMA symbol is rate-matched. In a case that the information field indicates the last SC-FDMA symbol in the subframe is not to be used for the PUSCH, the last SC-FDMA symbol is punctured.

A method for an eNB is also described. The method includes transmitting a PDCCH with a DCI format, the PDCCH scheduling at least one PUSCH in a subframe, the subframe including 14 SC-FDMA symbols, the DCI format including an information field for indicating (1) whether the first SC-FDMA symbol in the subframe is to be used for the PUSCH or not and (2) whether the last SC-FDMA symbol in the subframe is to be used for the PUSCH or not. The method also includes receiving the PUSCH. In a case that the information field indicates the first SC-FDMA symbol in the subframe is not to be used for the PUSCH, the eNB assumes that the first SC-FDMA symbol is rate-matched. In a case that the information field indicates the last SC-FDMA symbol in the subframe is not to be used for the PUSCH, the eNB assumes that the last SC-FDMA symbol is punctured.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation (CA). Carrier aggregation refers to the concurrent utilization of more than one carrier. In carrier aggregation, more than one cell may be aggregated to a UE. In one example, carrier aggregation may be used to increase the effective bandwidth (BW) available to a UE. The same time division duplexing (TDD) uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

The Licensed-Assisted Access (LAA) supports deployment of LTE in unlicensed spectrum. In an LAA network, the LAA subframe transmission is in opportunistic manner. Thus, listen before talk (LBT) with clear channel assessment (CCA) is required before a LAA transmission in most regulatory domains. The DL only LAA was specified in LTE release-13. Some behaviors of UL LAA are defined herein.

Unlike WiFi device, a LTE UL transmission is scheduled by an eNB with an uplink grant. At the same time, LBT is needed, unlike a non-LAA carrier. Therefore, an uplink transmission procedure should be designed considering these aspects. However, the detailed design of the uplink transmission procedure for LAA carriers has not been defined.

An eNB may indicate a PUSCH subframe structure that can contain one or two blanked single carrier frequency-division multiple access (SC-FDMA) (e.g., DFT-S-OFDM) symbols for the purpose of LBT. Upon the indication from the eNB, a UE may perform PUSCH transmission with rate-matching or puncturing of the blanked SC-FDMA symbol Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for uplink LAA operations may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a physical uplink shared channel (PUSCH), etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more eNBs 160. The UE operations module 124 may include one or more of a UE uplink LAA module 126.

The UE uplink LAA module 126 may perform UL LAA operations. Downlink and uplink transmissions may be organized into radio frames with a 10 millisecond (ms) duration. For a frame structure Type 1 (e.g., frequency division duplexing (FDD)), each 10 ms radio frame is divided into ten equally sized sub-frames. Each sub-frame consists of two equally sized slots. For a frame structure Type 2 (e.g., TDD), each 10 ms radio frame consists of two half-frames of 5 ms each. Each half-frame consists of eight slots of length 0.5 ms and three special fields: DwPTS, GP and UpPTS. The length of Downlink Pilot TimeSlot (DwPTS), guard period (GP) and Uplink Pilot TimeSlot (UpPTS) is configurable subject to the total length of DwPTS, GP and UpPTS being equal to 1 ms. Additional details about frame structure are discussed in connection with FIG. 5.

Both 5 ms and 10 ms switch-point periodicity are supported. Subframe 1 in all configurations and subframe 6 in a configuration with 5 ms switch-point periodicity consist of DwPTS, GP and UpPTS. Subframe 6 in a configuration with 10 ms switch-point periodicity consists of DwPTS only. All other subframes consist of two equally sized slots.

In LTE license access, subframes are classified into 2 types of subframes. One is the normal subframe that contains only either one of DL transmission and UL transmission. LTE license access with FDD has only the normal subframe. The other is the special subframe that contains three fields DwPTS, GP and UpPTS. DwPTS and UpPTS are durations reserved for DL transmission and UL transmission, respectively.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS consists of 3 Orthogonal Frequency Division Multiplexing (OFDM) symbols. UpPTS consists of 1 single carrier frequency-division multiple access (SC-FDMA) symbol.

2) Special subframe configuration 1: DwPTS consists of 9 OFDM symbols for normal cyclic prefix (CP) and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 can be configured only for normal CP 10) Special subframe configuration 9: DwPTS consists of 6 OFDM symbols. UpPTS consists of 2 SC-FDMA symbols. Special subframe configuration 9 can be configured only for normal CP.

Frame structure Type 3 may be applicable to LAA secondary cell operation with normal cyclic prefix only. The 10 subframes within a radio frame are available for downlink transmissions. Downlink transmissions occupy one or more consecutive subframes, starting anywhere within a subframe and ending with the last subframe either fully occupied or one of the DwPTS durations and structures.

For a UE 102 not capable of UL LAA, if the UE 102 is configured with a LAA secondary cell (SCell), the UE 102 may apply physical layer procedures assuming frame structure type 1 for the LAA SCell unless stated otherwise.

In the downlink, the OFDM access scheme may be employed. In the downlink, PDCCH, enhanced physical downlink control channel (EPDCCH), PDSCH and the like may be transmitted. A downlink radio frame may consist of multiple pairs of downlink resource blocks (RBs). The downlink RB pair is a unit for assigning downlink radio resources, defined by a predetermined bandwidth (RB bandwidth) and a time slot. Two slots (i.e., slot0 and slot1) equal one subframe. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs. An example of a resource grid in the downlink is discussed in connection with FIG. 6.

In the uplink, a Single-Carrier Frequency Division Multiple Access (SC-FDMA) access scheme may be employed. In the uplink, PUCCH, PDSCH, Physical Random Access Channel (PRACH) and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. Two slots (i.e., slot0 and slot1) equal one subframe. The uplink RB pair consists of two uplink RBs that are continuous in the time domain.

The uplink RB may consist of twelve sub-carriers in frequency domain and seven (for normal CP) or six (for extended CP) SC-FDMA symbols in time domain. A region defined by one sub-carrier in the frequency domain and one SC-FDMA symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC. An example of a resource grid in the uplink is discussed in connection with FIG. 7.

In Carrier Aggregation (CA), two or more CCs may be aggregated to support wider transmission bandwidths (e.g., up to 100 MHz, beyond 100 MHz). A UE 102 may simultaneously receive or transmit on one or multiple CCs. Serving cells can be classified into a primary cell (PCell) and a secondary cell (SCell).

The primary cell may be the cell, operating on the primary frequency, in which the UE 102 either performs the initial connection establishment procedure or initiates the connection re-establishment procedure, or the cell indicated as the primary cell in the handover procedure. The secondary cell may be a cell, operating on a secondary frequency, which may be configured once a Radio Resource Control (RRC) connection is established and which may be used to provide additional radio resources.

In the downlink, the carrier corresponding to the PCell is the downlink primary component carrier (DL PCC) while in the uplink it is the uplink primary component carrier (UL PCC). Similarly, in the downlink, the carrier corresponding to the SCell is the downlink secondary component carrier (DL SCC) while in the uplink it is the uplink secondary component carrier (UL SCC). The UE 102 may apply a system information acquisition (i.e., acquisition of broadcast system information) and change monitoring procedures for the PCell. For an SCell, E-UTRAN may provide, via dedicated signaling, all system information relevant for operation in an RRC_CONNECTED message when adding the SCell.

In Dual Connectivity (DC), each of two or more serving cells may belong to either one of a master cell group (MCG) or a secondary cell group (SCG). The MCG is associated with a master eNB (MeNB) while the SCG is associated with a secondary eNB (SeNB).

DC operation may be configured to utilize radio resources provided by two distinct schedulers, located in the MeNB and SeNB. In the case of DC, the UE 102 may be configured with two Medium Access Control (MAC) entities: one MAC entity for MeNB and one MAC entity for SeNB.

When a UE 102 is configured with CA in the MCG, CA principles may generally apply to the MCG. For the SCG, at least one cell in the SCG has a configured UL CC and one of them, named the primary secondary cell (PSCell), is configured with physical uplink control channel (PUCCH) resources. Unlike the CA for which a UE 102 should cope with a delay spread of up to 30.26 μs among the component carriers, two operations are defined for the DC: synchronous and asynchronous DC. In synchronous DC operation, the UE 102 can cope with a maximum reception timing difference up to at least 33 μs between cell groups (CGs). In asynchronous DC operation, the UE 102 can cope with a maximum reception timing difference up to 500 μs between CGs.

Even in the case that DC is not configured, one or more PUCCH cell group(s) can be configured. A PUCCH cell group having a PCell may be referred to as a MCG or master PUCCH cell group (MPCG). The other cell group(s) may be referred to as a SCG or secondary PUCCH cell group (SPCG). Each SCG (or SPCG) may include a PSCell, on which a PUCCH transmission(s) for the SCG (or SPCG) can be performed.

A downlink physical channel may correspond to a set of resource elements carrying information originating from higher layers. The following downlink physical channels may be defined. A physical downlink shared channel (PDSCH) may carry a transport block provided by a higher layer. The transport block may contain user data, higher layer control messages, physical layer system information.

The scheduling assignment of PDSCH in a given subframe may normally be carried by PDCCH or EPDCCH in the same subframe.

A physical broadcast channel (PBCH) may carry a master information block, which is required for an initial access.

A physical multicast channel (PMCH) may carry Multimedia Broadcast Multicast Services (MBMS) related data and control information.

A physical control format indicator channel (PCFICH) may carry a control format indicator (CFI) specifying the number of OFDM symbols on which PDCCHs are mapped.

A physical downlink control channel (PDCCH) may carry a scheduling assignment (also referred to as a DL grant) or a UL grant. The PDCCH may be transmitted via the same antenna port (e.g., cell-specific reference signal (CRS) port) as the PBCH.

A physical hybrid automatic repeat request (ARQ) indicator channel (PHICH) may carry UL-associated hybrid automatic repeat request acknowledgment (HARQ-ACK) information.

An enhanced physical downlink control channel (EPDCCH) may carry a scheduling assignment or a UL grant. The EPDCCH may be transmitted via a different antenna port (e.g., Demodulation RS (DMRS) port) from the PBCH and PDCCH. Possible REs on which EPDCCHs are mapped may be different from those for PDCCH, though they may partially overlap.

A downlink physical signal may correspond to a set of resource elements used by the physical layer but may not carry information originating from higher layers.

A cell-specific reference signal (CRS) may be assumed to be transmitted in all downlink subframes and DwPTS. For a normal subframe with normal CP, a CRS may be mapped on REs that are located in the 1st, 2nd, and 5th OFDM symbols in each slot. A CRS may be used for demodulation of the PDSCH, Channel State Information (CSI) measurement and Radio Resource Management (RRM) measurement.

A CSI reference signal (CSI-RS) may be transmitted in the subframes that are configured by higher layer signaling. The REs on which a CSI-RS is mapped are also configured by higher layer signaling. A CSI-RS may be further classified into non zero power (NZP) CSI-RS and ZP (zero power) CSI-RS. A part of a ZP CSI-RS resources may be configured as a CSI interference measurement (CSI-IM) resource, which may be used for interference measurement.

A UE-specific RS (UE-RS) may be assumed to be transmitted in physical resource block (PRB) pairs that are allocated for the PDSCH intended to the UE 102. UE-RS may be used for demodulation of the associated PDSCH.

A Demodulation RS (DMRS) may be assumed to be transmitted in PRB pairs that are allocated for EPDCCH transmission. DMRS may be used for demodulation of the associated EPDCCH.

Primary/secondary synchronization signals may be transmitted to facilitate the UE's 102 cell search, which is the procedure by which the UE 102 acquires time and frequency synchronization with a cell and detects the physical layer Cell ID of that cell. E-UTRA cell search supports a scalable overall transmission bandwidth corresponding to 6 resource blocks and upwards.

A discovery signal may consist of CRS, primary/secondary synchronization signals NZP-CSI-RS (if configured). The UE 102 may assume a discovery signal occasion once every discovery reference signal (DRS) measurement timing configuration (DMTC)-Periodicity. The eNB 160 using cell on/off may adaptively turn the downlink transmission of a cell on and off. A cell whose downlink transmission is turned off may be configured as a deactivated SCell for a UE 102. A cell performing on/off may transmit only periodic discovery signals and UEs 102 may be configured to measure the discovery signals for RRM. A UE 102 may perform RRM measurement and may discover a cell or transmission point of a cell based on discovery signals when the UE 102 is configured with discovery-signal-based measurements.

Aspects of the uplink physical channels and uplink physical signals are described herein. An uplink physical channel may correspond to a set of resource elements carrying information originating from higher layers. The following uplink physical channels may be defined. A Physical Uplink Shared Channel (PUSCH) may carry transport block provided by higher layer. The transport block may contain user data or higher layer control messages. An uplink grant of PUSCH in a given subframe may normally be carried by PDCCH or EPDCCH several subframes before the given subframe. A Physical Uplink Control Channel (PUCCH) may carry DL-associated HARQ-ACK information, scheduling request, and/or CSI. A Physical Random Access Channel (PRACH) may carry random access preamble.

A uplink physical signal may correspond to a set of resource elements used by the physical layer but may not carry information originating from higher layers. A reference signal (RS) may include a PUSCH Demodulation reference signal (DMRS). A PUSCH DMRS may be assumed to be transmitted in PRB pairs that are allocated for the PUSCH transmitted by the UE 102. PUSCH DMRS may be used for demodulation of the associated PUSCH. PUSCH DMRS may be mapped on REs which are located in the 4th SC-FDMA symbol in each slot.

PUCCH DMRS may be assumed to be transmitted in PRB pairs that are allocated for the PUCCH transmitted by the UE. PUCCH DMRS may be used for demodulation of the associated PUCCH. For PUCCH format 1, 1a and 1b, PUCCH DMRS may be mapped on REs which are located in the 3rd, 4th and 5th SC-FDMA symbols in each slot. For PUCCH format 2, 2a, 2b and 3, PUCCH DMRS may be mapped on REs which are located in the 2nd and 6th SC-FDMA symbols in each slot. For PUCCH format 4 and 5, PUCCH DMRS may be mapped on REs which are located in the 4th SC-FDMA symbol in each slot.

A sounding reference signal (SRS) may be transmitted in the last SC-FDMA symbol in uplink subframe or in 1 of 2 SC-FDMA symbol(s) in UpPTS.

In a UE sounding procedure, a UE 102 may transmit SRS on serving cell SRS resources based on two trigger types: trigger type 0 and trigger type 1. Trigger type 0 may include higher layer signaling. Trigger type 1 may include DCI formats 0/4/1A for FDD and TDD and DCI formats 2B/2C/2D for TDD.

In case both trigger type 0 and trigger type 1 SRS transmissions would occur in the same subframe in the same serving cell, the UE 102 may only transmit the trigger type 1 SRS transmission.

A UE 102 may be configured with SRS parameters for trigger type 0 and trigger type 1 on each serving cell. For trigger type 0, only a single set of SRS parameters may be used.

For trigger type 1 and DCI format 4, three sets of SRS parameters, srs-ConfigApDCI-Format4, are configured by higher layer signaling. The 2-bit SRS request field in DCI format 4 indicates the SRS parameter set given in Table 1. For trigger type 1 and DCI format 0, a single set of SRS parameters, srs-ConfigApDCI-Format0, is configured by higher layer signaling. For trigger type 1 and DCI formats 1A/2B/2C/2D, a single common set of SRS parameters, srs-ConfigApDCI-Format1a2b2c, is configured by higher layer signaling. The SRS request field is 1 bit for DCI formats 0/1A/2B/2C/2D, with a type 1 SRS triggered if the value of the SRS request field is set to '1'. A 1-bit SRS request field shall be included in DCI formats 0/1A for frame structure type 1 and 0/1A/2B/2C/2D for frame structure type 2 if the UE 102 is configured with SRS parameters for DCI formats 0/1A/2B/2C/2D by higher-layer signaling. Table 1 provides an SRS request value for trigger type 1 in DCI format 4

TABLE 1

| Value of SRS request field | Description |
| --- | --- |
| '00' | No type 1 SRS trigger |
| '01' | The 1$^{st}$ SRS parameter set configured by higher layers |
| '10' | The 2$^{nd}$ SRS parameter set configured by higher layers |
| '11' | The 3$^{rd}$ SRS parameter set configured by higher layers |

Trigger type 0 SRS configuration of a UE 102 in a serving cell for SRS periodicity ($T_{SRS}$) and SRS subframe offset ($T_{offset}$) is derived using a higher layer parameter $I_{SRS}$. The periodicity $T_{SRS}$ of the SRS transmission is serving cell specific and is selected from the set {2, 5, 10, 20, 40, 80, 160, 320} ms or subframes. For the SRS periodicity $T_{SRS}$ of 2 ms in TDD serving cell, two SRS resources are configured in a half frame containing UL subframe(s) of the given serving cell.

Trigger type 1 SRS configuration of a UE 102 in a serving cell for SRS periodicity ($T_{SRS,1}$) and SRS subframe offset ($T_{offset,1}$) is derived using higher layer parameter $I_{SRS}$. The periodicity $T_{SRS,1}$ of the SRS transmission is serving cell specific and is selected from the set {2, 5, 10} ms or subframes. For the SRS periodicity $T_{SRS,1}$ of 2 ms in TDD serving cell, two SRS resources are configured in a half frame containing UL subframe(s) of the given serving cell.

In Rel-12, there are ten transmission modes. These transmission modes may be configurable for an LAA SCell. These transmission modes are illustrated in Table 2.

TABLE 2

| Transmission mode | DCI format | Transmission scheme |
| --- | --- | --- |
| Mode 1 | DCI format 1A | Single antenna port |
|  | DCI format 1 | Single antenna port |
| Mode 2 | DCI format 1A | Transmit diversity |
|  | DCI format 1 | Transmit diversity |
| Mode 3 | DCI format 1A | Transmit diversity |
|  | DCI format 2A | Large delay Cyclic Delay Diversity (CDD) or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user Multiple-Input Multiple-Output (MIMO) |
| Mode 6 | DCI format 1A | Transmit diversity |
|  | DCI format 1B | Closed-loop spatial multiplexing using a single transmission layer |
| Mode 7 | DCI format 1A | Single-antenna port (for a single CRS port), transmit diversity (otherwise) |
|  | DCI format 1 | Single-antenna port |
| Mode 8 | DCI format 1A | Single-antenna port (for a single CRS port), transmit diversity (otherwise) |
|  | DCI format 2B | Dual layer transmission or single-antenna port |

TABLE 2-continued

| Transmission mode | DCI format | Transmission scheme |
| --- | --- | --- |
| Mode 9 | DCI format 1A | Single-antenna port (for a single CRS port or multicast-broadcast single-frequency network (MBSFN) subframe), transmit diversity (otherwise) |
|  | DCI format 2C | Up to 8 layer transmission or single-antenna port |
| Mode 10 | DCI format 1A | Single-antenna port (for a single CRS port or MBSFN subframe), transmit diversity (otherwise) |
|  | DCI format 2D | Up to 8 layer transmission or single-antenna port |

In Rel-12, there are sixteen DCI formats. DCI format 1, 1A, 1B, 1C, 1D, 2, 2A, 2B, 2C, and 2D may be used for DL assignment (also referred to as DL grant). The DCI formats are illustrated in Table 3.

TABLE 3

| DCI format | Use |
| --- | --- |
| DCI format 0 | scheduling of PUSCH in one UL cell |
| DCI format 1 | scheduling of one PDSCH codeword in one cell |
| DCI format 1A | compact scheduling of one PDSCH codeword in one cell and random access procedure initiated by a PDCCH order |
| DCI format 1B | compact scheduling of one PDSCH codeword in one cell with precoding information |
| DCI format 1C | very compact scheduling of one PDSCH codeword, notifying Multicast Control Channel (MCCH) change, reconfiguring TDD, and LAA common information |
| DCI format 1D | compact scheduling of one PDSCH codeword in one cell with precoding and power offset information |
| DCI format 1A | Transmit diversity |
| DCI format 2 | scheduling of up to two PDSCH codewords in one cell with precoding information |
| DCI format 2A | scheduling of up to two PDSCH codewords in one cell |
| DCI format 2B | scheduling of up to two PDSCH codewords in one cell with scrambling identity information |
| DCI format 2C | scheduling of up to two PDSCH codewords in one cell with antenna port, scrambling identity and number of layers information |
| DCI format 2D | scheduling of up to two PDSCH codewords in one cell with antenna port, scrambling identity and number of layers information and PDSCH RE Mapping and Quasi-Co-Location Indicator (PQI) information |
| DCI format 3 | transmission of transmitter power control (TPC) commands for PUCCH and PUSCH with 2-bit power adjustments |
| DCI format 3A | transmission of TPC commands for PUCCH and PUSCH with single bit power adjustments |
| DCI format 4 | of PUSCH in one UL cell with multi-antenna port transmission mode |
| DCI format 5 | scheduling of Physical Sidelink Broadcast Channel (PSCCH), and also contains several Sidelink Control Information (SCI) format 0 fields used for the scheduling of Physical Sidelink Shared Channel (PSSCH) |

DCI format 1, 1A, 1B, 1C, 1D may include the bit fields provided in Table 4, where $N^{DL}_{RB}$ is a downlink system band width of the serving cell, which is expressed in multiples of PRB (physical resource block) bandwidth.

TABLE 4

|  | DCI F 1 | DCI F 1A | DCI F 1B | DCI F 1C | DCI F 1D |
|---|---|---|---|---|---|
| Carrier Indicator Field (CIF) | 0 or 3 | 0 or 3 | 0 or 3 | N/A | 0 or 3 |
| Flag for format0/1A differentiation | N/A | 1 | N/A | N/A | N/A |
| Localized/Distributed Virtual Resource Block (VRB) assignment flag | N/A | 1 | 1 | N/A | 1 |
| Resource allocation header | 1 | N/A | N/A | N/A | N/A |
| Gap value | N/A | N/A | N/A | 0 ($N^{DL}_{RB} < 50$) or 1 (otherwise) | N/A |
| Resource block assignment | * | ** | ** | *** | ** |
| Modulation and coding scheme | 5 | 5 | 5 | 5 | 5 |
| HARQ process number | 3 (FDD PCell) or 4 (TDD PCell) | 3 (FDD PCell) or 4 (TDD PCell) | 3 (FDD PCell) or 4 (TDD PCell) | N/A | 3 (FDD PCell) or 4 (TDD PCell) |
| New data indicator | 1 | 1 | 1 | N/A | 1 |
| Redundancy version | 2 | 2 | 2 | N/A | 2 |
| TPC command for PUCCH | 2 | 2 | 2 | N/A | 2 |
| Downlink Assignment Index | 0 (FDD PCell) or 2 (otherwise) | 0 (FDD PCell) or 2 (otherwise) | 0 (FDD PCell) or 2 (otherwise) | N/A | 0 (FDD PCell) or 2 (otherwise) |
| SRS request | N/A | 0 or 1 | N/A | N/A | N/A |
| Downlink power offset | N/A | N/A | N/A | N/A | 1 |
| Transmitted Precoding Matrix Indicator (TPMI) information for precoding | N/A | N/A | 2 (2 CRS ports) or 4 (4 CRS ports) | N/A | 2 (2 CRS ports) or 4 (4 CRS ports) |
| HARQ-ACK resource offset | 2 (EPDCCH) or 0 (PDCCH) | 2 (EPDCCH) or 0 (PDCCH) | 2 (EPDCCH) or 0 (PDCCH) | N/A | 2 (EPDCCH) or 0 (PDCCH) |

It should be noted that * is ceil($N^{DL}_{RB}/P$) bits, where P is determined from Table 5;  is ceil($\log_2(N^{DL}_{RB}(N^{DL}_{RB}+1)/2)$) bits; and * is ceil($\log_2(\text{floor}(N^{DL}_{VRB,gap1}/N^{step}_{RB})(\text{floor}(N^{DL}_{VRB,gap1}/N^{step}_{RB})+1)/2)$) bits, where $N^{DL}_{VRB,gap1}=2*\min(N_{gap}, N^{DL}_{RB}-N_{gap})$, where Ngap may be derived from system bandwidth of the concerned serving cell and $N^{step}_{RB}$ is determined from Table 6.

TABLE 5

| System BW $N^{DL}_{RB}$ | Precoding resource block group (PRG) size P |
|---|---|
| <=10 | 1 |
| 11-26 | 2 |

TABLE 5-continued

| System BW $N^{DL}_{RB}$ | Precoding resource block group (PRG) size P |
|---|---|
| 27-63 | 3 |
| 64-110 | 4 |

TABLE 6

| System BW $N^{DL}_{RB}$ | $N^{step}_{RB}$ |
|---|---|
| 6-49 | 2 |
| 50-110 | 4 |

DCI format 2, 2A, 2B, 2C, 2D may include the bit fields provided in Table 7.

TABLE 7

|  | DCI F 2 | DCI F 2A | DCI F 2B | DCI F 2C | DCI F 2D |
|---|---|---|---|---|---|
| CIF | 0 or 3 | 0 or 3 | 0 or 3 | 0 or 3 | 0 or 3 |
| Resource allocation header | 1 | 1 | 1 | 1 | 1 |
| Resource block assignment | * | * | * | * | * |
| TPC command for PUCCH | 2 | 2 | 2 | 2 | 2 |

TABLE 7-continued

|  | DCI F 2 | DCI F 2A | DCI F 2B | DCI F 2C | DCI F 2D |
|---|---|---|---|---|---|
| Downlink Assignment Index | 0 (FDD PCell) or 2 (otherwise) | 0 (FDD PCell) or 2 (otherwise) | 0 (FDD PCell) or 2 (otherwise) | 0 (FDD PCell) or 2 (otherwise) | 0 (FDD PCell) or 2 (otherwise) |
| HARQ process number | 3 (FDD PCell) or 4 (TDD PCell) | 3 (FDD PCell) or 4 (TDD PCell) | 3 (FDD PCell) or 4 (TDD PCell) | 3 (FDD PCell) or 4 (TDD PCell) | 3 (FDD PCell) or 4 (TDD PCell) |
| Scrambling identity | N/A | N/A | 1 | N/A | N/A |
| Antenna port, scrambling identity and number of layers | N/A | N/A | N/A | 3 | 3 |
| SRS request | N/A | N/A | 0 or 1 | 0 or 1 | N/A |
| Transport block to codeword swap flag | 1 | 1 | N/A | N/A | N/A |
| Modulation and coding scheme (TB1) | 5 | 5 | 5 | 5 | 5 |
| New data indicator (TB1) | 1 | 1 | 1 | 1 | 1 |
| Redundancy version (TB1) | 2 | 2 | 2 | 2 | 2 |
| Modulation and coding scheme (TB2) | 5 | 5 | 5 | 5 | 5 |
| New data indicator (TB2) | 1 | 1 | 1 | 1 | 1 |
| Redundancy version (TB2) | 2 | 2 | 2 | 2 | 2 |
| PDSCH RE Mapping and Quasi-Co-Location Indicator | N/A | N/A | N/A | N/A | 2 |
| Precoding information | 3 (2 CRS ports) or 6 (4 CRS ports) | 0 (2 CRS ports) or 2 (4 CRS ports) | N/A | N/A | N/A |
| HARQ-ACK resource offset | 2 (EPDCCH) or 0 (PDCCH) | 2 (EPDCCH) or 0 (PDCCH) | 2 (EPDCCH) or 0 (PDCCH) | 2 (EPDCCH) or 0 (PDCCH) | 2 (EPDCCH) or 0 (PDCCH) |

DCI format 0 and 4 may include the bit fields provided in Table 8.

TABLE 8

|  | DCI F 0 | DCI F 4 |
|---|---|---|
| CIF | 0 or 3 | 0 or 3 |
| Flag for format0/1A differentiation | 1 | N/A |
| Frequency hopping flag | 1 | N/A |
| Resource block assignment | **** | ***** |
| TPC command for PUSCH | 2 | 2 |
| Cyclic shift for DMRS and orthogonal cover code (OCC) index | 3 | 3 |
| UL index | 2 (TDD conf. 0) or 0 (otherwise) | 2 (TDD conf. 0) or 0 (otherwise) |
| Downlink Assignment Index | 0 (TDD PCell) or 2 (otherwise) | 0 (TDD PCell) or 2 (otherwise) |
| CSI request | 2 (multiple DL cells, multiple CSI processes, multiple subframe sets) or 1 (otherwise) | 2 (multiple DL cells, multiple CSI processes, multiple subframe sets) or 1 (otherwise) |
| SRS request | 0 or 1 | 2 |
| Resource allocation type | 1 | 1 |
| Modulation and coding scheme (TB1) | 5 | 5 |
| New data indicator (TB1) | 1 | 1 |
| Modulation and coding scheme (TB2) | N/A | 5 |
| New data indicator (TB2) | N/A | 1 |
| Precoding information | N/A | 3 (2 CRS ports) or 6 (4 CRS ports) |

It should be noted that in Table 8, ** is $\operatorname{ceil}(\log_2(N^{UL}_{RB}(N^{UL}_{RB}+1)/2))$ bits. Also, *** is $\max(\operatorname{ceil}(\log_2(N^{UL}_{RB}(N^{UL}_{RB}+1)/2)), \operatorname{ceil}(\log_2(C(\operatorname{ceil}(N^{UL}_{RB}/P+1), 4))))$ bits, where $C(n, r)$ is a formula for Combinations (i.e., "n choose r").

Common control signaling for frame structure type 3 is also described herein. If a UE 102 detects PDCCH with DCI cyclic redundancy check (CRC) scrambled by a component carrier Radio Network Temporary Identifier (CC-RNTI) in subframe n−1 or subframe n of a LAA Scell, the UE 102 may assume the configuration of occupied OFDM symbols in subframe n of the LAA Scell according to the 'Subframe configuration for LAA' field in the detected DCI in subframe n−1 or subframe n.

The 'Subframe configuration for LAA' field may indicate the configuration of occupied OFDM symbols (i.e., OFDM symbols used for transmission of downlink physical channels and/or physical signals) in a current and/or the next subframe according to Table 9.

TABLE 9

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

If the configuration of occupied OFDM symbols for subframe n is indicated by the Subframe configuration for LAA field in both subframe n−1 and subframe n, the UE 102 may assume that the same configuration of occupied OFDM symbols is indicated in both subframe n−1 and subframe n.

If a UE 102 detects PDCCH with DCI CRC scrambled by CC-RNTI in subframe n, and the UE 102 does not detect PDCCH with DCI CRC scrambled by CC-RNTI in subframe n−1, and if the number of occupied OFDM symbols for subframe n indicated by the Subframe configuration for LAA field in subframe n is less than 14, the UE 102 is not required to receive any physical channels or signals in subframe n.

There could be an exceptional case that a UE 102 may be required to receive some kind of physical channel (e.g., PDCCH carrying UL grant), if the UE 102 detects PDCCH with DCI CRC scrambled by CC-RNTI in subframe n, and the UE 102 does not detect PDCCH with DCI CRC scrambled by CC-RNTI in subframe n−1, and if the number of occupied OFDM symbols for subframe n indicated by the Subframe configuration for LAA field in subframe n is 3. Another approach to transmit/receive UL grant only in subframe n is to use the value "1110" or "1111" in Table 9 for indicating "UL grant only in the current subframe". Here, the UL grant only may mean that the UE does not assume any physical channel or physical signal in the subframe except for CRS and PDCCH within the first 3 OFDM symbols for the UL grant detection purpose only.

A UE 102 is not required to use subframe n for updating CSI measurement, if the UE 102 does not detect PDCCH with DCI CRC scrambled by CC-RNTI in subframe n−1, or if the UE 102 does not detect PDCCH with DCI CRC scrambled by CC-RNTI in subframe n.

The UE 102 may detect PDCCH with DCI CRC scrambled by CC-RNTI by monitoring the following PDCCH candidates according to DCI Format 1C. One PDCCH candidate at aggregation level L=4 with the control channel element (CCEs) corresponding to the PDCCH candidate given by CCEs numbered 0, 1, 2, 3. One PDCCH candidate at aggregation level L=8 with the CCEs corresponding to the PDCCH candidate given by CCEs numbered 0, 1, 2, 3, 4, 5, 6, 7.

If a serving cell is a LAA SCell, and if the higher layer parameter subframeStartPosition for the SCell indicates 's07', and if the UE 102 detects PDCCH/EPDCCH intended for the UE 102 starting in the second slot of a subframe, the UE 102 may assume that OFDM symbols in the first slot of the subframe are not occupied, and all OFDM symbols in the second slot of the subframe are occupied, If subframe n is a subframe in which OFDM symbols in the first slot are not occupied, the UE 102 may assume that all the OFDM symbols are occupied in subframe n+1.

DL channel access procedures are also described herein. An eNB 160 operating LAA Scell(s) may have to perform the channel access procedures (also known as LBT) for accessing the channel(s) on which the LAA Scell(s) transmission(s) are performed.

For a category 4 (Cat-4) LBT, the eNB 160 may transmit a transmission including PDSCH on a channel on which LAA SCell(s) transmission(s) are performed after first sensing the channel to be idle during the slot durations of a defer duration $T_d$ and after the counter N is zero in step 4 below. The counter N may be adjusted by sensing the channel for additional slot duration(s) according to the steps of the procedure below.

In step 1, set $N=N_{init}$, where $N_{init}$ is a random number uniformly distributed between 0 and $CW_p$. Next, go to step 4.

In step 2, if N>0 and the eNB 160 chooses to decrement the counter, set N=N−1.

In step 3, sense the channel for an additional slot duration, and if the additional slot duration is idle, go to step 4; else, go to step 5.

In step 4, if N=0, stop; else, go to step 2.

In step 5, sense the channel during the slot durations of an additional defer duration $T_d$.

In step 6, if the channel is sensed to be idle during the slot durations of the additional defer duration $T_d$, go to step 2; else, go to step 5.

If an eNB 160 has not transmitted a transmission including PDSCH on a channel on which LAA Scell(s) transmission(s) are performed after step 4 in the procedure above, the eNB 160 may transmit a transmission including PDSCH on the channel, after sensing the channel to be idle at least in the slot durations of an additional defer duration $T_d$.

The defer duration $T_d$ consists of duration $T_f$=16 us immediately followed by $m_p$ consecutive slot durations where each slot duration is $T_{sl}$=9 us, and $T_f$ includes an idle slot duration $T_{sl}$ at start of $T_f$. A slot duration $T_{sl}$ is considered to be idle if the eNB 160 senses the channel during the slot duration, and the power detected by the eNB 160 for at least 4 us within the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_{min,p}$ and $CW_{max,p}$ are chosen during step 1 of the procedure above. $m_p$, $CW_{min,p}$, and $CW_{max,p}$ are based on channel access priority class associated with the eNB 160 transmission.

If the eNB 160 transmits discovery signal transmission(s) not including PDSCH when N>0 in the procedure above, the eNB 160 may not decrement N during the slot duration(s) overlapping with discovery signal transmission. The eNB 160 may not contiguously transmit on a channel on which the LAA SCell(s) transmission(s) are performed, for a period exceeding $T_{m\_cot,p}$. For p=3 and p=4, if the absence of any other technology sharing the carrier can be guaranteed on a long term basis (e.g., by level of regulation), $T_{m\ cot,p}$=10 ms, otherwise, $T_{m\ cot,p}$=8 ms. Table 10 shows channel access priority class parameters.

TABLE 10

| Channel Access Priority Class (p) | $m_p$ | $CW_{min,\,p}$ | $CW_{max,\,p}$ | $T_{mcot,\,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

For Category 2 (Cat-2) LBT, an eNB 160 may transmit a transmission including discovery signal but not including PDSCH on a channel on which LAA SCell(s) transmission(s) are performed immediately after sensing the channel for at least a sensing interval $T_{drs}$=25 us, if the power detected by the eNB 160 during $T_{drs}$ is less than $X_{Thresh}$ and if the duration of the transmission is less than 1 ms.

Another kind of Category 2 LBT (e.g., one shot sensing for channel access) may be used within the MCOT the follows the above-described Category-4 LBT. If the eNB 160 has transmitted a transmission after N=0 in step 4 of the procedure above, the eNB 160 may transmit the next contiguous transmission, for duration of maximum $T_j$ (e.g., 4 msec), immediately after sensing the channel for at least a sensing interval of $T_{js}$=34 μsec, if the power detected by the eNB during $T_{js}$ is less than $X_{Thresh}$, and if the total sensing and transmission time is not more than $1000 \cdot T_{mcot} + |T_{mcot}/T_j - 1| \cdot T_{js}$ μsec.

UL LBT methods and potential issues are also described herein. The Licensed-Assisted Access (LAA) supports LTE in unlicensed spectrum. In an LAA network, the LAA subframe transmission is in opportunistic manner. Thus, listen before talk (LBT) with clear channel assessment (CCA) is required before a LAA transmission. The DL-only LAA was specified in LTE release-13. Behaviors of UL LAA are described herein.

A LTE UL transmission is scheduled by an eNB 160 with an uplink grant. A UL grant may be a DCI format in a PDCCH or EPDCCH, or PHICH feedback. The time between a UL grant and the scheduled UL transmission is at least 4 ms. The eNB 160 may schedule simultaneous UL transmissions from multiple UEs 102 in a single subframe. For a scheduled UL transmission, the eNB 160 should make sure there is no conflict between a DL and a UL on the same LAA cell.

There are several approaches for UL LBT, described herein. In a first approach, (Approach 1), no LBT is performed if the temporal gap between a DL and UL is very small. In this approach, a UL transmission may happen without LBT if the gap between a DL and a UL is very small. In the case where there is no other present unlicensed network (e.g., WiFi or LAA cells from other operators), this approach may be applicable. In particular, if LAA patterns include LAA DL and LAA UL subframes are defined, this approach can be used.

In a second approach, (Approach 2), Category 2 LBT may be performed before scheduled transmission. Category 2 LBT only requires a single CCA sensing before transmission. This is also called frame based equipment (FBE) contention access method. Category 2 LBT makes sense because a UL transmission is scheduled, and the UL transmission should be dropped if it cannot get the channel at scheduled time. At the same time, this approach allows simultaneous UL transmission from multiple UEs 102 since they all sense the same CCA interval before transmission.

A scheduled LAA UE 102 performs CCA detection in a single CCA sensing interval upon the scheduled UL subframe boundary. If the channel is idle, the LAA UE 102 can transmit the LAA UL subframe as scheduled. Otherwise, the UL transmission is dropped.

To avoid potential interruption of WiFi transmission, the CCA sensing interval should have a length of a minimum defer duration $T_d$, which consists of duration $T_f$=16 us immediately followed by a slot duration of $T_{sl}$=9 us, and $T_f$ includes an idle slot duration $T_{sl}$ at start of $T_f$. A slot duration $T_{sl}$ is considered to be idle if the eNB 160 senses the channel during the slot duration, and the power detected by the eNB 160 for at least 4 us within the slot duration is less than energy detection threshold $X_{Thresh}$. Otherwise, the slot duration $T_{sl}$ is considered to be busy.

In the case where there is no other present unlicensed network (e.g., WiFi or LAA cells from other operators), this approach may be used. If no other unlicensed network is present, the LAA eNB 160 scheduler should ensure there is no conflict between a LAA DL transmission and a LAA UL transmission. A single CCA detection before UL transmission should be sufficient.

Furthermore, as in DL LBT, Cat-2 LBT with a 25 or 34 micro-second sensing interval (i.e., one shot sensing for channel access) may be used within either DL MCOT or UL MCOT, where the DL MCOT and the UL MCOT are MCOT following Cat-4 LBT at eNB 160 and UE 102 sides, respectively.

In a third approach (Approach 3), Category 4 LBT may be performed. With category 4 LBT, for a LAA uplink transmission, a UE 102 needs to perform CCA detection and a backoff process before transmission. The category 4 LBT includes a random backoff mechanism to give UE 102 chances for contention access.

A category 4 LBT with random backoff is suitable for WiFi and LAA DL transmissions because the scheduling and transmissions are flexible. In a backoff procedure, the backoff counter may be suspended if the channel is busy. The contention window size may be adjusted based on the feedback of previous transmissions in an exponential backoff algorithm.

Category 4 based UL LBT may use a smaller contention window size compared with DL LAA. Category 4 based UL LBT may also use an eNB 160 signaled counter value.

A LAA UL is scheduled in advance by a UL grant. The contention window size of a UL LBT can be much smaller than that of a DL LAA transmission. Furthermore, to support simultaneous UL transmissions from multiple UEs 102 in the same timeslot, the CCA detection timeslot of UEs 102 in the same LAA cell should be synchronized and aligned, and the same counter value has be used by these UEs 102. Thus, in UL LBT, the backoff counter may be generated by the eNB 160 and signaled to UEs 102.

The HARQ-ACK feedback for a previous UL transmission may not be available or applicable for UL LAA transmissions. A fixed contention window size may be used. And the contention window sizes may be much smaller than the contention window size of DL LAA. The eNB-signaled counter value is useful for simultaneous LAA UL transmissions from multiple UEs 102 in the same LAA cell.

UL subframe structure is also described herein. There are several options of UL subframe structure in an LAA carrier, where UL subframe structure is classified with respect to which (and/or how many) SC-FDMA symbols are occupied for transmissions of physical channels (e.g., PUSCH/PUCCH including the associated with DMRS). One option is a normal UL subframe which is the same structure as in non LAA carrier. Another option is a partial UL subframe (i.e., partial UL subframe type-1) in which the first one or more SC-FDMA symbols are not used for PUCCH/PUSCH/DMRS/SRS transmissions. Yet another option is a partial UL subframe (i.e., partial UL subframe type-2) in which the last one or more SC-FDMA symbols are not used for PUCCH/PUSCH/DMRS/SRS transmissions.

The normal subframe (also referred to as type-0 subframe) option is described in connection with FIG. 8. The partial UL subframe (type-1) option is described in connection with FIG. 9. The partial UL subframe (type-2) option is described in connection with FIG. 10.

A type 3 partial UL subframe may be formed by puncturing both the starting and ending symbol in a regular subframe. Alternatives of type 3 partial subframe may also be formed by puncturing the two symbols at the beginning of the regular UL subframe, or the two symbols at the end of a regular UL subframe.

A type 4 partial UL subframe may be a slot based short UL subframe with either the slot 0 or slot 1 punctured. In both cases, a large gap period is formed for channel access. This may be beneficial for Cat 4 channel access, especially when there are more unlicensed users contending for access.

In one case, only one of type 1, 2, 3 and 4 partial subframe is supported. In another case, if more than one type of partial subframe is supported, the type of subframe used in a UL LAA transmission should be signaled by the eNB 160. The signaling may be semi-statically configured by higher layer signaling, or dynamically indicated in physical layer with a DCI.

In the normal UL subframe with SRS and the partial UL subframes type-1a and type-2a, there might not be room to perform LBT. Therefore, the UE 102 transmitting the PUSCH may be able to transmit the SRS while the UE 102 not transmitting the PUSCH might not be able to transmit the SRS. In other words, the SRS may be always transmitted together with the PUSCH, and the SRS only transmission (i.e., without the PUSCH) might not be allowed.

On the other hand, in the partial UL subframes type-1b and type-2b, the SRS only transmission (i.e., without the PUSCH) may be allowed. For example, a first UE 102 (UE1) and a second UE 102 (UE2) may get the channel at the same time so that the UE1 transmits SRS only and the UE2 transmits SRS followed by PUSCH.

The SRS may be able to be transmitted without configuration of type-0/type-1 SRS. The above-described SRS may be referred to as type-2 SRS. The type-2 SRS may be transmitted using the same subcarriers as for the PUSCH when the SRS is transmitted together with PUSCH subject to an LBT.

PUSCH scheduling is also described herein. For UL LAA, flexible timing between a UL grant and the corresponding UL transmission may be supported. There are several options for PUSCH scheduling. In a first option (Option 1), a single UL grant in a subframe for a UE can schedule N (N≥1) PUSCH transmissions for the UE 102 in N subframes with single PUSCH per subframe, as described in connection with FIG. 11. In a second option (Option 2), a single UL grant in a subframe for a UE 102 can schedule a single PUSCH transmission in a single subframe while the UE 102 can receive multiple UL grants in a subframe for PUSCH transmissions in different subframes, as described in connection with FIG. 12. In a third option (Option 3), a single UL grant in a subframe for a UE 102 can enable the UE 102 to transmit a single PUSCH transmission among one of the multiple subframes depending on a UL LBT result, as described in connection with FIG. 13.

Combinations of the LBT scheme, UL subframe structure, and PUSCH scheduling scheme are also describe herein. There are several suitable combinations of the above-described LBT scheme, UL subframe structure and PUSCH scheduling scheme.

A first approach (Approach 1) is a combination of Cat-4 LBT, type-0/0a/2/2a UL subframe structure, and Option 1 multi-subframe scheduling. This approach is described in connection with FIG. 14.

A second approach (Approach 2) is a combination of Cat-4 LBT, type-0/0b/2/2b UL subframe structure, and Option 1 multi-subframe scheduling. This approach is described in connection with FIG. 15 and FIG. 16.

A third approach (Approach 3) is a combination of Cat-4 LBT and Cat-2 LBT, type-2/2b UL subframe structure, and Option 1 multi-subframe scheduling. This approach is described in connection with FIG. 17.

A fourth approach (Approach 4) is a combination of Cat-4 LBT, type-0/0a/1/1a UL subframe structure, and Option 1 multi-subframe scheduling. This approach is described in connection with FIG. 18 and FIG. 19.

A fifth approach (Approach 5) is a combination of Cat-4 LBT, type-0/0b/1/1b UL subframe structure, and Option 1 multi-subframe scheduling. This approach is described in connection with FIG. 20.

A sixth approach (Approach 6) is a combination of Cat-4 LBT and Cat-2 LBT, type-1/1a UL subframe structure, and Option 1 multi-subframe scheduling. This approach is described in connection with FIG. 21.

Approach 1-6 may also be performed with Option 2 scheduling. In the approach 1-6, Option 2 scheduling (i.e., multiple UL grants based multi-subframe scheduling) may be applied, instead of Option 1 multi-subframe scheduling. With Option 2 scheduling, even though the eNB 160 transmits m UL grants in downlink subframe n−4, the UE 102 might not successfully detect all of them. In addition, the multiple uplink subframes which are scheduled by the UL grants in downlink subframe n−4 might not be actually consecutive. In this case, the DCI format could contain the information field indicating a value k. The UE 102 may behave as described in the approach 1-6, recognizing an uplink subframe set starting subframe n and ending subframe n+k−1 as a virtual multiple k consecutive uplink subframes. The UE 102 may fill out REs for the PUSCH, for which a UL grant was not detected in subframe n, with a reservation signal.

A seventh approach (Approach 7) is a combination of Cat-4 LBT, type-1/1a UL subframe structure, and Option 2 multiple UL grants based multi-subframe scheduling. This approach is described in connection with FIG. 22.

An eighth approach (Approach 8) is a combination of Cat-4 LBT and Cat-2 LBT, type-1/1b UL subframe structure, and Option 2 multiple UL grants based multi-subframe scheduling. This approach is described in connection with FIG. 23.

A ninth approach (Approach 9) is a combination of Cat-4 LBT, type-1/1b UL subframe structure, and Option 3 scheduling. This approach is described in connection with FIG. 24.

A tenth approach (Approach 10) is a combination of Cat-4 LBT, type-0/0a/1/1a UL subframe structure, and Option 1 multi-subframe scheduling. This approach is described in connection with FIG. 24.

In the above-described approaches, it is assumed that the Cat-4 LBT is performed in a certain gap period. However, this limitation is not always necessary. Cat-4 LBT for a given subframe may be performed at any timing within the previous subframe of the given subframe. Once the UE 102 gets the channel at a given timing during the previous subframe, the UE 102 may have to transmit a reservation signal from the end of the sensing duration until the starting subframe boundary of the given subframe (i.e., the ending subframe boundary of the previous subframe).

In the above-described approaches, it is assumed that the Cat-4 LBT is performed before the first PUSCH transmission among the k scheduled PUSCHs. However, the channel access scheme may be indicated by the eNB 160 through either a DCI format or an RRC message. Therefore, "Cat-4 LBT" in the above-described approaches could be replaced by "the LBT scheme indicated by the eNB". On the other hand, even if the channel access scheme may be indicated by the eNB 160, Cat-2 LBT (e.g., channel access based on 34 micro-seconds single sensing duration) may be performed between consecutive PUSCHs, as described in connection with the above approaches.

Combinations of the above approaches also may be possible. For example, the eNB 160 may configure, in the UE 102, with one of possible approaches, and the UE 102 may perform UL transmission procedure based on the configured approach. In another example, the eNB 160 may indicate use of a feature out of the possible features that are related to the above approaches. More specifically, the DCI format may include the information field which indicates which type of UL subframe structure (e.g., one of type-0/0a/0b/1/1a/1b/2/2a/2b) is used for the corresponding PUSCH transmission.

SRS only transmission is also described herein. In an LAA SCell (i.e., frame structure type 3), SRS may be transmitted without the serving cell specific SRS subframes configuration by higher layers. This SRS may be referred to as type-2 SRS. The type-2 SRS may be triggered by using an SRS request field in the DCI format (e.g., UL grant, DL assignment, LAA common information).

DCI format 1C used for the LAA common information may include SRS requests including SRS request number 1, SRS request number 2, . . . , SRS request number J, where each SRS request is y bit(s), $J=floor((L_{format1C}-x)/y)$, x denotes the total number of bits for the other information field (e.g., the 4-bit subframe configuration field for LAA) than the SRS request field in this DCI format 1C, and $L_{format1C}$ is equal to the payload size of format 1C used for very compact scheduling of one PDSCH codeword. The value y may be 1 or 2.

The eNB 160 may send the UE 102 an RRC message specifying the index of the SRS (i.e., whether SRS request number 1, SRS request number 2, . . . , or SRS request number J). The parameter provided by higher layers determines the index of the SRS request for a serving cell. If the value y is 1, each of the SRS requests may indicate either one of 0 and 1, where 0 means SRS is not triggered and 1 means SRS is triggered. If the value y is 2, each of the SRS requests may indicate either one of 00, 01, 10, and 11, where 00 means SRS is not triggered, 01 means SRS using the first SRS parameter set is triggered, 10 means SRS using the second SRS parameter set is triggered, and 11 means SRS using the third SRS parameter set is triggered.

Those SRS parameter sets may include the length of a channel sensing duration (e.g., 25 micro-seconds, 34 micro-seconds) for the SRS transmission, an initial backoff counter value $N_{init}$, channel access priority class for the SRS transmission, and an index of the channel access slot (specifying starting and ending timing of the slot duration(s)).

Channel coding and physical resource mapping of PUSCH with blanked symbol(s) is also described herein. There are several aspects on handling of PUSCH with blanked symbol(s) (e.g., symbol #0 and/or symbol #13). One is channel coding and the other one is physical resource mapping. The blanked symbol(s) is not available for PUSCH transmission. Therefore, the PUSCH should not be mapped on that symbol eventually.

However, in terms of assumption for channel coding, there may be two hypotheses. A first hypothesis is that channel coding procedure is performed on the assumption that the PUSCH is not to be mapped on resource elements within the blank symbol. This scheme may be referred to as rate matching for PUSCH. A second hypothesis is that a channel coding procedure is performed on the assumption that the PUSCH is to be mapped on resource elements within the blank symbol, and then PUSCH RE symbols corresponding to the blanked symbol are overridden by null signals (i.e., zero power signals) and/or another signals (e.g., reservation signals) or are just dropped for PUSCH transmission. This scheme may be referred to as puncturing of PUSCH.

Preferably, for the blanking of symbol #0 the former way (i.e., the first hypothesis) is applied, while the latter way (i.e., the second hypothesis) applies to the blanking of symbol #13. In other words, the PUSCH mapping to resource elements (k,l) corresponding to the physical resource blocks assigned for transmission may be in increasing order of first the index k, then the index l, starting with the first slot in the subframe when the following conditions are met. (1) The resource element is not used for transmission of reference signals. (2) The resource element is not part of the last SC-FDMA symbol in a subframe, if the UE 102 transmits SRS in the same subframe in the same serving cell. (3) The resource element is not part of the last SC-FDMA symbol in a subframe configured with cell-specific SRS for non-Bandwidth reduced Low complexity/Coverage Enhancement (BL/CE) UEs 102 and BL/CE UEs 102 in Coverage Enhanced Mode A (CEModeA), if the PUSCH transmission partly or fully overlaps with the cell-specific SRS bandwidth. (4) The resource element is not part of an SC-FDMA symbol reserved for possible SRS transmission in a UE-specific aperiodic SRS subframe in the same serving cell. (5) The resource element is not part of an SC-FDMA symbol reserved for possible SRS transmission in a UE-specific periodic SRS subframe in the same serving cell when the UE 102 is configured with multiple TAGs. (6) The resource element is not part of an SC-FDMA symbol left empty for guard period for narrowband retuning for BL/CE UEs 102 in CEModeA. (7) The resource element is not part of the last SC-FDMA symbol in a subframe if the serving cell is an LAA secondary cell and if the last SC-FDMA in the subframe is indicated as a blanked SC-FDMA symbol (i.e., an unoccupied (empty) SC-FDMA symbol).

For an LAA secondary cell, if the first SC-FDMA in the subframe is indicated as a blanked SC-FDMA symbol or if the UE 102 performs channel access in the subframe, the first SC-FDMA symbol may be counted in the PUSCH mapping but not used for transmission of the PUSCH.

Alternatively, for the blanking of both symbol #0 and #13 the former way (i.e., the first hypothesis) may be applied. In other words, the PUSCH mapping to resource elements (k,l) corresponding to the physical resource blocks assigned for transmission may be in increasing order of first the index k, then the index l, starting with the first slot in the subframe when the following conditions are met. (1) The resource element is not used for transmission of reference signals. (2) The resource element is not part of the last SC-FDMA symbol in a subframe, if the UE 102 transmits SRS in the same subframe in the same serving cell. (3) The resource element is not part of the last SC-FDMA symbol in a subframe configured with cell-specific SRS for non-BL/CE UEs 102 and BL/CE UEs 102 in CEModeA, if the PUSCH transmission partly or fully overlaps with the cell-specific SRS bandwidth. (4) The resource element is not part of an SC-FDMA symbol reserved for possible SRS transmission in a UE-specific aperiodic SRS subframe in the same serving cell. (5) The resource element is not part of an SC-FDMA symbol reserved for possible SRS transmission in a UE-specific periodic SRS subframe in the same serving cell when the UE 102 is configured with multiple TAGs. (6) The resource element is not part of an SC-FDMA symbol left empty for guard period for narrowband retuning for BL/CE UEs in CEModeA.

For an LAA secondary cell, if the first SC-FDMA in the subframe is indicated as a blanked SC-FDMA symbol or if the UE 102 performs channel access in the subframe, the first SC-FDMA symbol may be counted in the PUSCH mapping but not used for transmission of the PUSCH. For an LAA secondary cell, if the last SC-FDMA in the subframe is indicated as a blanked SC-FDMA symbol, the last SC-FDMA symbol shall be counted in the PUSCH mapping but not used for transmission of the PUSCH.

In either approach, the UE 102 and the eNB 160 may assume the same hypothesis so that they share the same knowledge about the correspondence between PUSCH coded bits and PUSCH resource elements.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB uplink LAA module 194.

The eNB uplink LAA module 194 may perform UL LAA operations. In an implementation, the eNB uplink LAA module 194 may transmit to the UE 102 a PDCCH with a downlink control information (DCI) format. The PDCCH may schedule multiple PUSCHs in consecutive subframes. The DCI format may include an information field for indicating a first channel access procedure.

The eNB uplink LAA module 194 may attempt to detect an earliest PUSCH among the multiple PUSCHs. The eNB uplink LAA module 194 may also attempt to detect an n+1-th PUSCH among the multiple PUSCHs in case when an n-th PUSCH among the multiple PUSCHs was successfully detected.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2A:
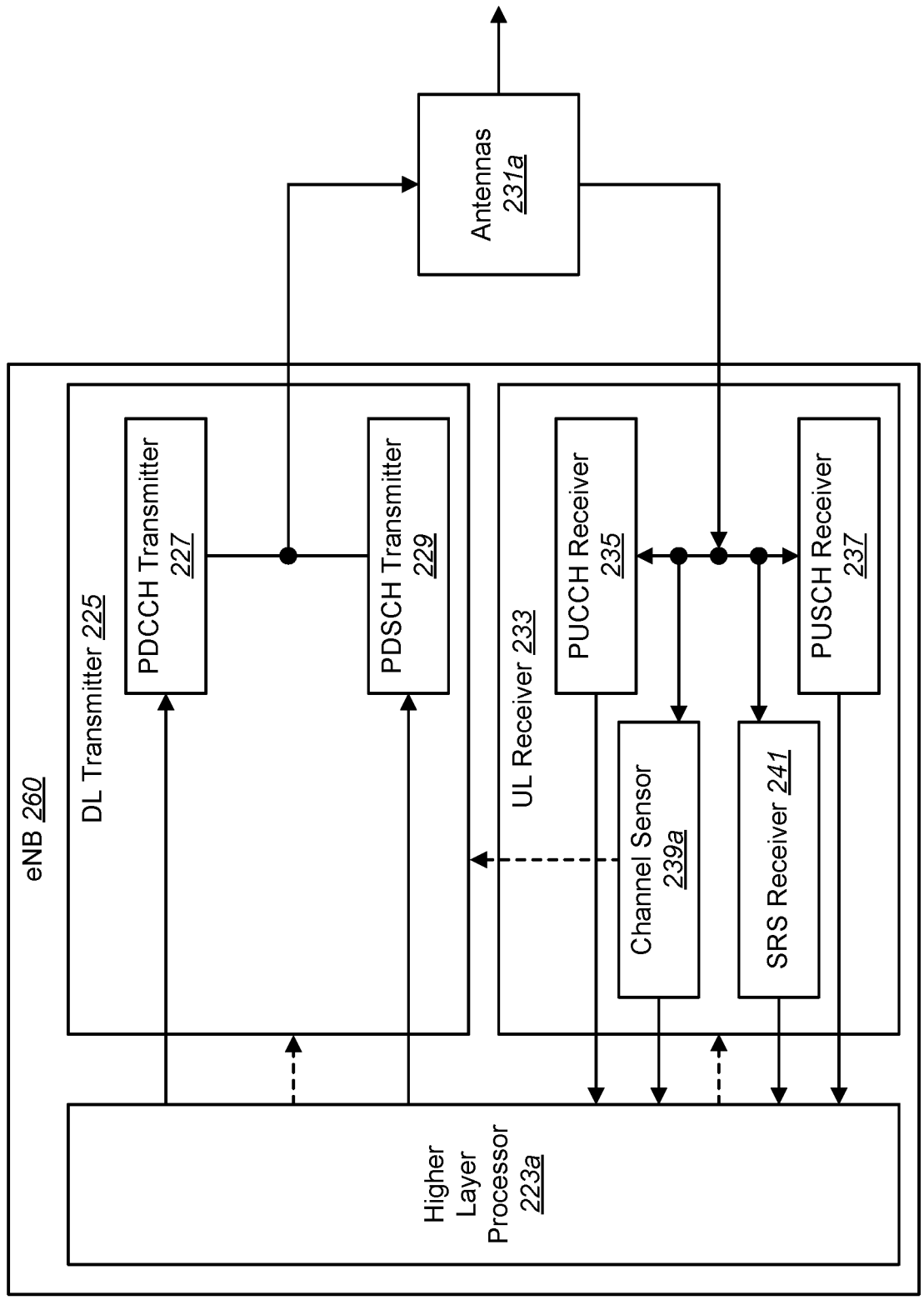
FIGS. 2A and 2B are block diagrams illustrating a detailed configuration of an eNB and a UE in which systems and methods for uplink LAA operations may be implemented.
Figure 2B:
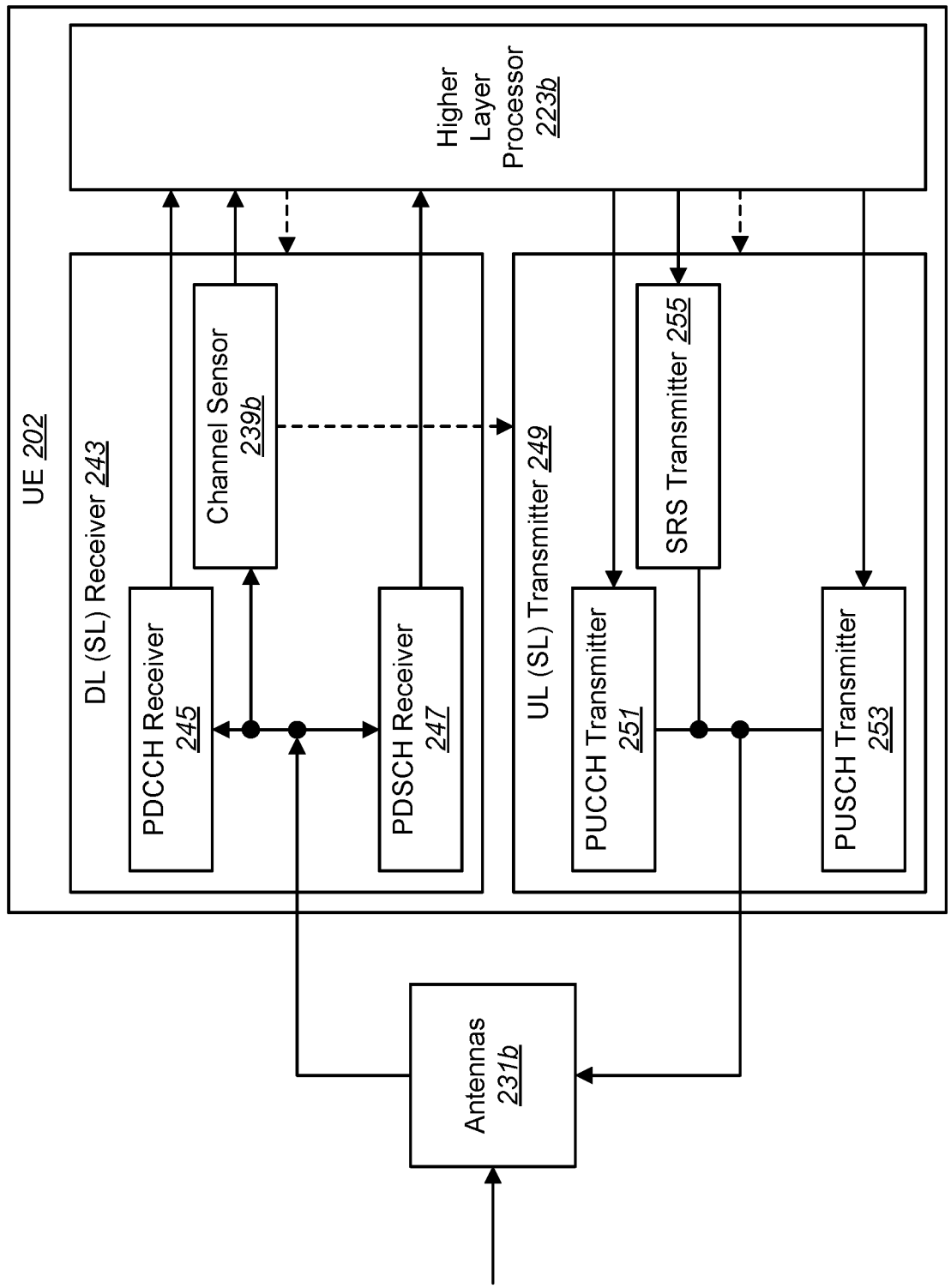

FIGS. 2A and 2B are block diagrams illustrating a detailed configuration of an eNB 260 and a UE 202 in which systems and methods for uplink LAA operations may be implemented. In FIG. 2A, the eNB 260 may include a higher layer processor 223a a DL transmitter 225 and a UL receiver 233. The higher layer processor 223a may communicate with the DL transmitter 225, UL receiver 233 and subsystems of each.

The DL transmitter 225 may include a PDCCH transmitter 227 and a PDSCH transmitter 229. The DL transmitter 225 may transmit signals/channels to a UE 202 using a one or more antennas 231a.

The UL receiver 233 may include a PUCCH receiver 235, a PUSCH receiver 237, a channel sensor 239a and an SRS receiver 241. The UL receiver 233 may receive signals/channels from the UE 202 using one or more antenna 231a.

The higher layer processor 223a may manage a physical layer's behaviors (e.g., the behaviors of the DL transmitter 225 and the UL receiver 233) and provide higher layer parameters to the physical layer. The higher layer processor 223a may obtain transport blocks from the physical layer.

The higher layer processor 223a may send/acquire higher layer messages such as an RRC message and MAC message to/from a UE's 202 higher layer. The higher layer processor 223a may provide the PDSCH transmitter transport blocks and provide the PDCCH transmitter transmission parameters related to the transport blocks.

The DL transmitter 225 may multiplex downlink physical channels and downlink physical signals (including reservation signal) and transmit them via transmission antennas 231a. The UL receiver 233 may receive multiplexed uplink physical channels and uplink physical signals via receiving antennas and de-multiplex them. The PUCCH receiver 235 may provide uplink control information (UCI) to the higher layer processor 223a. The PUSCH receiver 241 may provide the higher layer processor 223a received transport blocks.

The SRS receiver 241 may receive SRS and perform uplink channel measurement by using the SRS. The SRS receiver 241 may provide the higher layer processor 223a the channel measurement results.

The channel sensor 239a may measure uplink reception signal power and perform channel access procedures. The channel sensor 239a may control the DL transmitter 225 with respect to downlink transmission timing and provide channel access results to the higher layer processor 223a.

In FIG. 2B, the UE 202 may include a higher layer processor 223b a DL (SL) receiver 243 and a UL (SL) transmitter 249. The higher layer processor 223b may communicate with the DL (SL) receiver 243, UL (SL) transmitter 259 and subsystems of each.

The DL (SL) receiver 243 may include a PDCCH receiver 245, a PDSCH receiver 247 and a channel sensor 239b. The DL (SL) receiver 243 may receive signals/channels from the eNB 260 using a receiving antenna 231b.

The UL (SL) transmitter 249 may include a PUCCH transmitter 251, a PUSCH transmitter 253 and an SRS transmitter 255. The UL (SL) transmitter 249 may send signals/channels to the eNB 260 using a transmission antenna 231b.

The higher layer processor 223b may manage physical layer's behaviors (e.g., the behaviors of the UL (SL) transmitter 249 and the DL (SL) receiver 243) and provide higher layer parameters to the physical layer. The higher layer processor may obtain transport blocks from the physical layer.

The higher layer processor 223b may send/acquire higher layer messages such as an RRC message and MAC message to/from a UE 202 higher layer. The higher layer processor 223b may provide the PUSCH transmitter 253 transport blocks and provide the PUCCH transmitter 251 UCI.

The UL (SL) transmitter 249 may multiplex uplink physical channels and uplink physical signals (including reservation signal) and transmit them via transmission antennas 231b. The DL (SL) receiver 243 may receive multiplexed downlink physical channels and downlink physical signals via receiving antennas 231b and de-multiplex them.

The PDCCH receiver 245 may provide DCI to the higher layer processor 223b. The PDSCH receiver 247 may provide the higher layer processor 223b received transport blocks.

The SRS transmitter 255 may transmit the SRS. The channel sensor 239b may measure uplink reception signal power and perform channel access procedure. The channel sensor 239b may control the UL (SL) transmitter 249 with respect to downlink transmission timing and provide channel access results to the higher layer processor 223b.

FIG. 3 is a flow diagram illustrating a method 300 by a UE 102. The UE 102 may communicate with one or more eNBs 160 in a wireless communication network. In one implementation, the wireless communication network may include an LTE network.

The UE 102 may receive 302 receive a PDCCH with a downlink control information (DCI) format. The PDCCH may schedule at least one physical uplink shared channel (PUSCH) in a subframe. The subframe may include 14 single carrier-frequency domain multiple access (SC-FDMA) symbols. The DCI format may include an information field for indicating (1) whether the first SC-FDMA symbol in the subframe is to be used for the PUSCH or not and (2) whether the last SC-FDMA symbol in the subframe is to be used for the PUSCH or not.

The information field may also indicate whether the PUSCH transmission in the subframe is granted or not. The information field may further indicate a channel access scheme for the subframe.

The UE 102 may transmit 304 the PUSCH. In a case that the information field indicates the first SC-FDMA symbol in the subframe is not to be used for the PUSCH, the first SC-FDMA symbol is rate-matched 306. In a case that the information field indicates the last SC-FDMA symbol in the subframe is not to be used for the PUSCH, the last SC-FDMA symbol is punctured 308.

Figure 4:
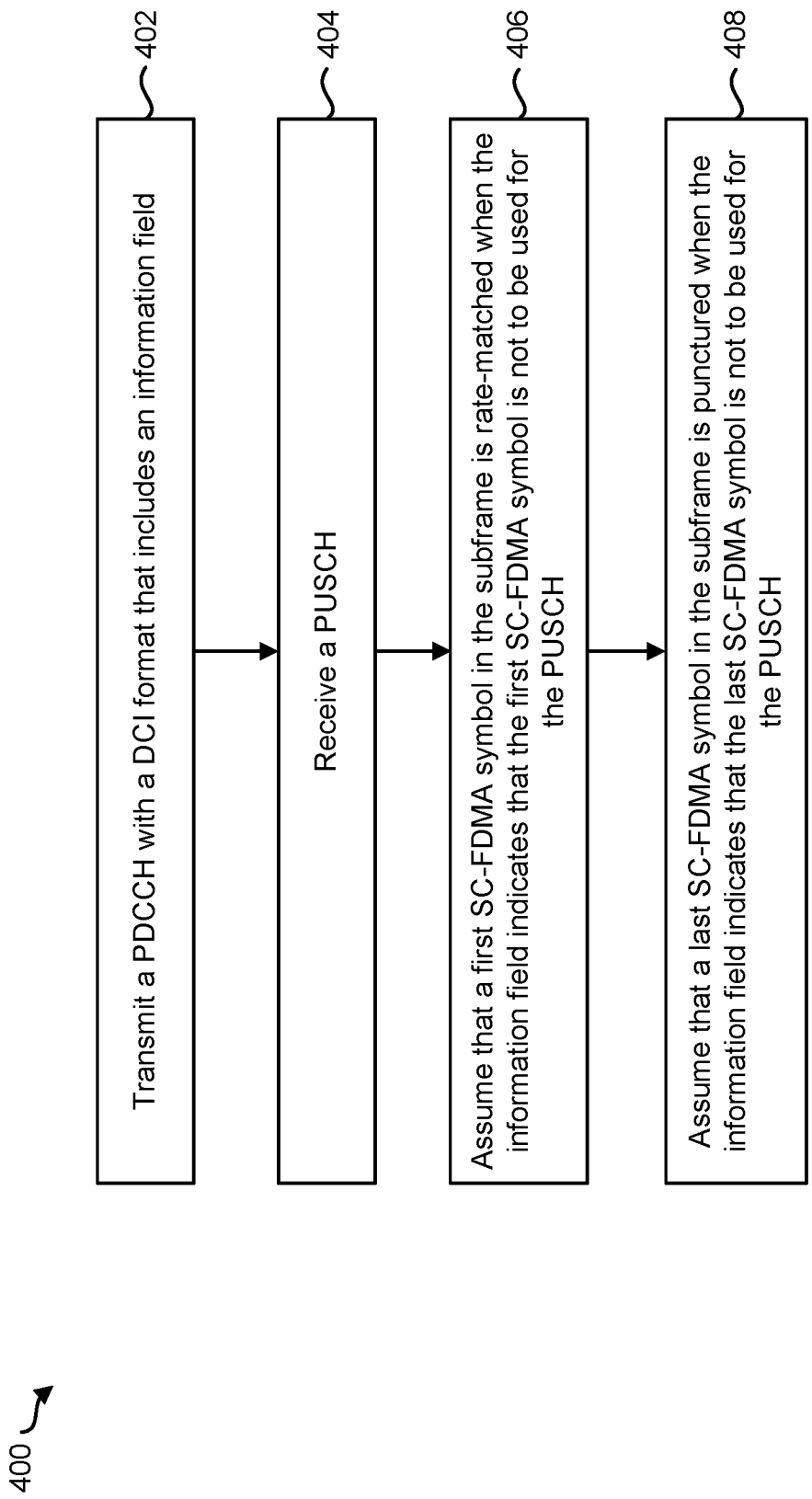
FIG. 4 is a flow diagram illustrating a method by an eNB.

FIG. 4 is a flow diagram illustrating a method 400 by an eNB 160. The eNB 160 may communicate with one or more UEs 102 in a wireless communication network. In one implementation, the wireless communication network may include an LTE network.

The eNB 160 may transmit 402 a PDCCH with a downlink control information (DCI) format. The PDCCH may schedule at least one physical uplink shared channel (PUSCH) in a subframe. The subframe may include 14 single carrier-frequency domain multiple access (SC-FDMA) symbols. The DCI format may include an information field for indicating (1) whether the first SC-FDMA symbol in the subframe is to be used for the PUSCH or not and (2) whether the last SC-FDMA symbol in the subframe is to be used for the PUSCH or not.

The information field may also indicate whether the PUSCH transmission in the subframe is granted or not. The information field may further indicate a channel access scheme for the subframe.

The eNB 160 may receive 404 a PUSCH. In a case that the information field indicates the first SC-FDMA symbol in the subframe is not to be used for the PUSCH, the eNB 160 may assume 406 that the first SC-FDMA symbol is rate-matched. In a case that the information field indicates the last SC-FDMA symbol in the subframe is not to be used for the PUSCH, the eNB 160 may assume 408 that last SC-FDMA symbol is punctured.

Figure 5:
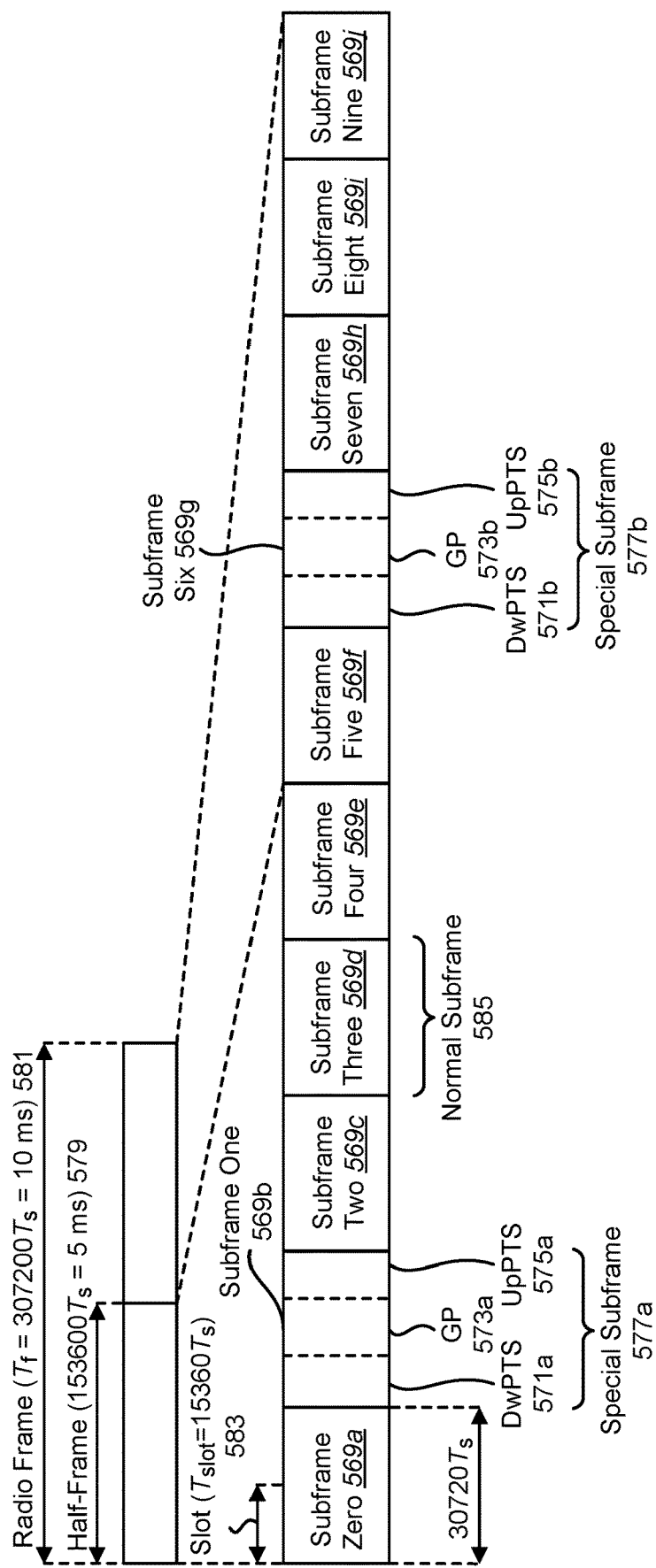
FIG. 5 is a diagram illustrating one example of a radio frame that may be used in accordance with the systems and methods disclosed herein.

FIG. 5 is a diagram illustrating one example of a radio frame 581 that may be used in accordance with the systems and methods disclosed herein. This radio frame 581 structure illustrates a TDD structure. Each radio frame 581 may have a length of $T_f = 307200 \cdot T_s = 10$ ms, where $T_f$ is a radio frame 581 duration and $T_s$ is a time unit equal to $$\frac{1}{(15000 \times 2048)} \text{ seconds.}$$

seconds. The radio frame 581 may include two half-frames 579, each having a length of $153600 \cdot T_s = 5$ ms. Each half-frame 579 may include five subframes 569a-e, 569f-j each having a length of $30720 \cdot T_s = 1$ ms. Each subframe 569 may include two slots 583 each having a length of $15360 \cdot T_s = \frac{1}{2}$ ms.

TDD UL/DL configurations 0-6 are given below in Table 11 (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table 11 below. In Table 11, "D" denotes a downlink subframe, "S" denotes a special subframe and "U" denotes a UL subframe.

TABLE 11

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 11 above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table 12 (from Table 4.2-1 of 3GPP TS 36.211) subject to the total length of DwPTS, GP and UpPTS being equal to $30720 \cdot T_s = 1$ ms. In Table 12, "cyclic prefix" is abbreviated as "CP" and "configuration" is abbreviated as "Config" for convenience.

TABLE 12

| Special Subframe Config | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |

TABLE 12-continued

| | Normal CP in downlink | | | Extended CP in downlink | | |
| | | UpPTS | | | UpPTS | |
| Special Subframe Config | DwPTS | Normal CP in uplink | Extended CP in uplink | DwPTS | Normal CP in uplink | Extended CP in uplink |
|---|---|---|---|---|---|---|
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 569 that may be used include a downlink subframe, an uplink subframe and a special subframe 577. In the example illustrated in FIG. 5, which has a 5 ms periodicity, two standard special subframes 577a-b are included in the radio frame 581. The remaining subframes 569 are normal subframes 585.

The first special subframe 577a includes a downlink pilot time slot (DwPTS) 571a, a guard period (GP) 573a and an uplink pilot time slot (UpPTS) 575a. In this example, the first standard special subframe 577a is included in subframe one 569b. The second standard special subframe 577b includes a downlink pilot time slot (DwPTS) 571b, a guard period (GP) 573b and an uplink pilot time slot (UpPTS) 575b. In this example, the second standard special subframe 577b is included in subframe six 569g. The length of the DwPTS 571a-b and UpPTS 575a-b may be given by Table 4.2-1 of 3GPP TS 36.211 (illustrated in Table 12 above) subject to the total length of each set of DwPTS 571, GP 573 and UpPTS 575 being equal to 30720·$T_s$=1 ms.

Each subframe i 569a-j (where i denotes a subframe ranging from subframe zero 569a (e.g., 0) to subframe nine 569j (e.g., 9) in this example) is defined as two slots, 2i and 2i+1 of length $T_{slot}$=15360·$T_s$=0.5 ms in each subframe 569. For example, subframe zero (e.g., 0) 569a may include two slots, including a first slot.

UL/DL configurations with both 5 ms and 10 ms downlink-to-uplink switch-point periodicity may be used in accordance with the systems and methods disclosed herein. FIG. 5 illustrates one example of a radio frame 581 with 5 ms switch-point periodicity. In the case of 5 ms downlink-to-uplink switch-point periodicity, each half-frame 579 includes a standard special subframe 577a-b. In the case of 10 ms downlink-to-uplink switch-point periodicity, a special subframe 577 may exist in the first half-frame 579 only.

Subframe zero (e.g., 0) 569a and subframe five (e.g., 5) 569f and DwPTS 571a-b may be reserved for downlink transmission. The UpPTS 575a-b and the subframe(s) immediately following the special subframe(s) 577a-b (e.g., subframe two 569c and subframe seven 569h) may be reserved for uplink transmission. It should be noted that, in some implementations, special subframes 577 may be considered DL subframes in order to determine a set of DL subframe associations that indicate UCI transmission uplink subframes of a UCI transmission cell.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS consists of 3 OFDM symbols. UpPTS consists of 1 single carrier frequency-division multiple access (SC-FDMA) symbol.

2) Special subframe configuration 1: DwPTS consists of 9 OFDM symbols for normal CP and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 can be configured only for normal CP 10) Special subframe configuration 9: DwPTS consists of 6 OFDM symbols. UpPTS consists of 2 SC-FDMA symbols. Special subframe configuration 9 can be configured only for normal CP.

Figure 6:
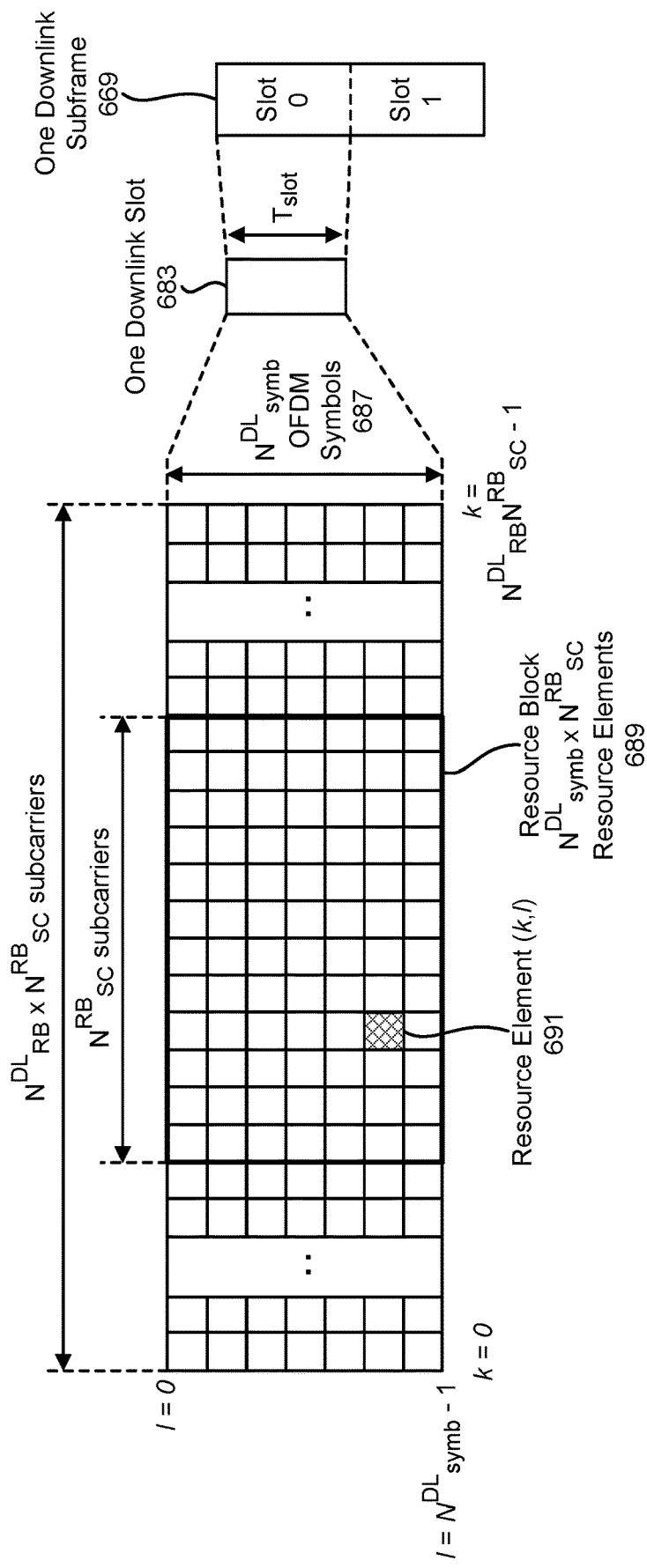
FIG. 6 is a diagram illustrating one example of a resource grid for the downlink.

FIG. 6 is a diagram illustrating one example of a resource grid for the downlink. The resource grid illustrated in FIG. 6 may be utilized in some implementations of the systems and methods disclosed herein. More detail regarding the resource grid is given in connection with FIG. 1.

In FIG. 6, one downlink subframe 669 may include two downlink slots 683. $N^{DL}_{RB}$ is downlink bandwidth configuration of the serving cell, expressed in multiples of $N^{RB}_{sc}$, where $N^{RB}_{sc}$ is a resource block 689 size in the frequency domain expressed as a number of subcarriers, and $N^{DL}_{symb}$ is the number of OFDM symbols 687 in a downlink slot 683. A resource block 689 may include a number of resource elements (RE) 691.

For a PCell, $N^{DL}_{RB}$ is broadcast as a part of system information. For an SCell (including an LAA SCell), $N^{DL}_{RB}$ is configured by a RRC message dedicated to a UE 102. For PDSCH mapping, the available RE 691 may be the RE 691 whose index 1 fulfils $1 \geq 1_{data,start}$ and/or $1_{data,end} \geq 1$ in a subframe.

Figure 7:
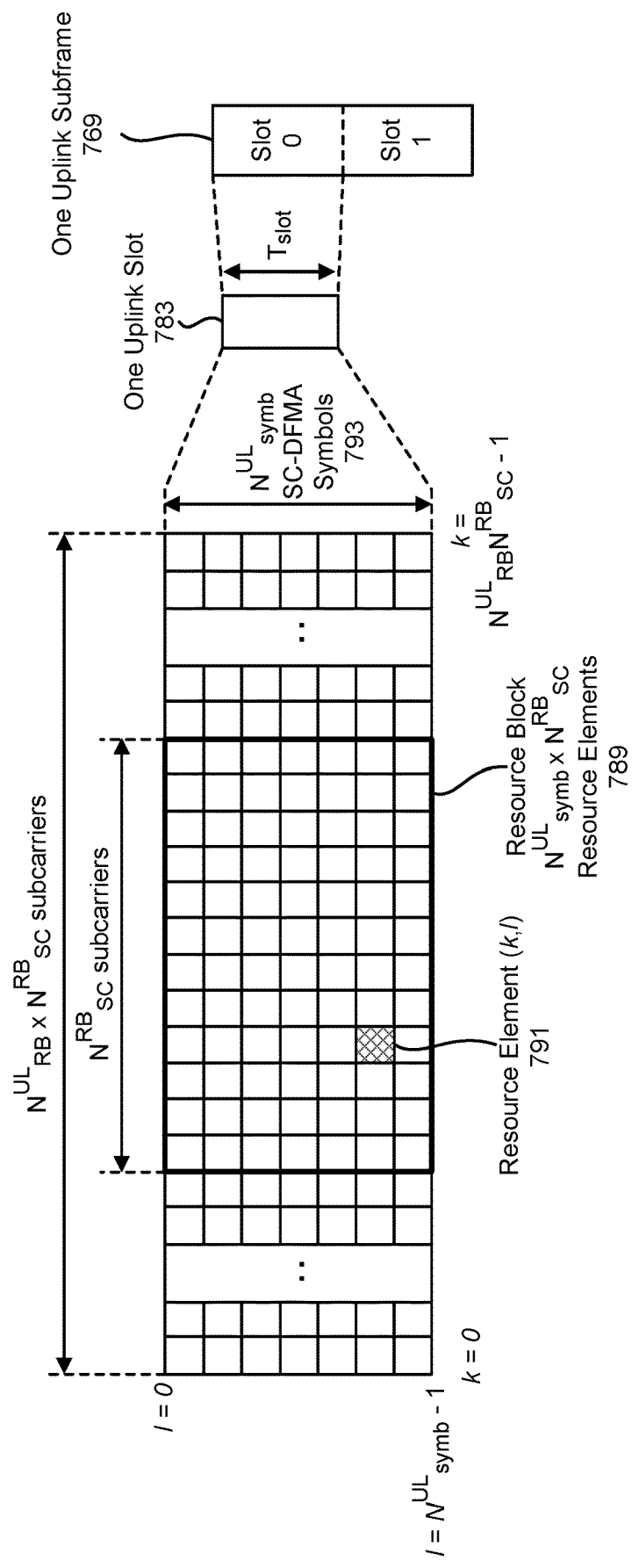
FIG. 7 is a diagram illustrating one example of a resource grid for the uplink.

FIG. 7 is a diagram illustrating one example of a resource grid for the downlink. The resource grid illustrated in FIG. 7 may be utilized in some implementations of the systems and methods disclosed herein. More detail regarding the resource grid is given in connection with FIG. 1.

In FIG. 7, one uplink subframe 769 may include two uplink slots 783. $N^{UL}_{RB}$ is uplink bandwidth configuration of the serving cell, expressed in multiples of $N^{RB}_{sc}$, where $N^{RB}_{sc}$ is a resource block 789 size in the frequency domain expressed as a number of subcarriers, and $N^{UL}_{symb}$ is the number of SC-FDMA symbols 793 in an uplink slot 783. A resource block 789 may include a number of resource elements (RE) 791.

For a PCell, $N^{UL}_{RB}$ is broadcast as a part of system information. For an SCell (including an LAA SCell), $N^{UL}_{RB}$ is configured by a RRC message dedicated to a UE 102.

Figure 8:
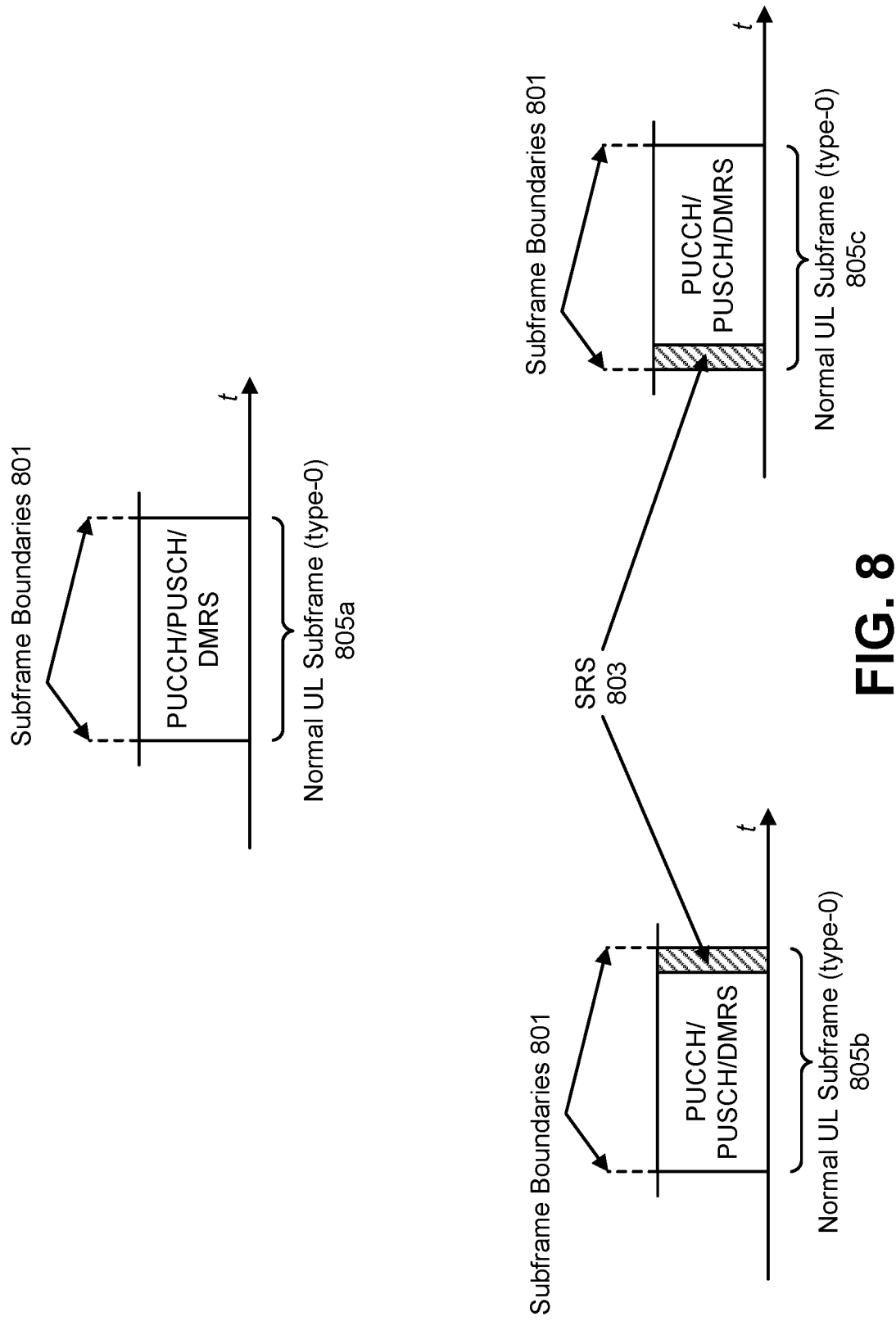
FIG. 8 illustrates examples of a normal uplink (UL) subframe (type-0) option.

FIG. 8 illustrates examples of a normal UL subframe (type-0) option. These examples use an option for a UL subframe structure in an LAA carrier where a normal UL subframe may have the same structure as a non-LAA carrier. Subframe boundaries are shown for three examples of normal UL subframes.

In the normal subframe (also referred to as type-0 subframe 805*a*), If the subframe is not an SRS subframe, PUSCH and PUCCH may be mapped on all SC-FDMA symbols in the subframe except for the SC-FDMA symbol(s) on which DMRS is mapped.

If the subframe is an SRS subframe, PUSCH and PUCCH may be mapped on all SC-FDMA symbols in the subframe except for the SC-FDMA symbol(s) for DMRS and the last SC-FDMA symbol in the subframe. SRS 803 may be mapped on the last SC-FDMA symbol in the SRS subframe. This subframe is referred to as type-0a subframe 805*b*.

As an enhanced subframe structure, type-0b subframe 805*c* can be considered. In the type-0b subframe, PUSCH and PUCCH are mapped on all SC-FDMA symbols in the subframe except for the SC-FDMA symbol(s) for DMRS and the first SC-FDMA symbol which is used for SRS 803 transmission.

Figure 9:
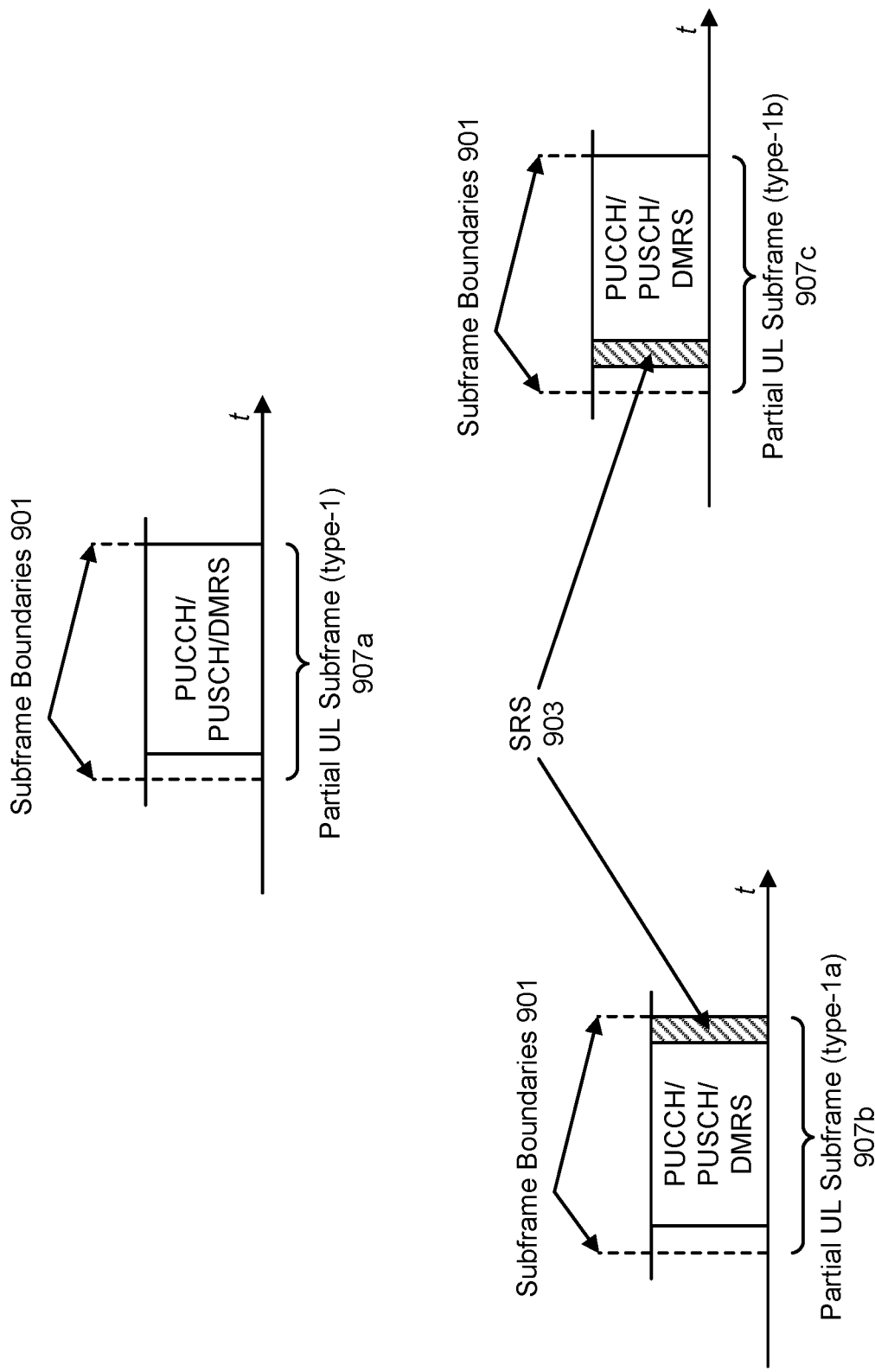
FIG. 9 illustrates examples of a partial UL subframe (type-1) option.

FIG. 9 illustrates examples of a partial UL subframe (type-1) option. The examples in FIG. 9 use an option for a partial UL subframe (i.e., partial UL subframe type-1) in which the first one or more SC-FDMA symbols are not used for PUCCH/PUSCH/DMRS/SRS transmissions. Subframe boundaries are shown for three examples of partial UL subframes.

In the partial UL subframe (type-1) 907*a*, if the subframe is not an SRS subframe, PUSCH and PUCCH may be mapped on all SC-FDMA symbol(s) from n-th SC-FDMA symbol to the last SC-FDMA symbol in the subframe except for the SC-FDMA symbol(s) on which DMRS is mapped.

If the subframe is an SRS subframe, PUSCH and PUCCH may be mapped on all SC-FDMA symbols n-th SC-FDMA symbol to the last SC-FDMA symbol in the subframe except for the SC-FDMA symbol(s) for DMRS and the last SC-FDMA symbol in the subframe. SRS 903 may be mapped on the last SC-FDMA symbol in the SRS subframe. This option is shown in the example of the partial UL subframe (type-1a) 907*b*. In another option, the SRS 903 may be mapped on the second SC-FDMA symbol in the SRS subframe, as shown in the example of the partial UL subframe (type-1b) 907*c*.

The value n may be fixed or may be configurable by the eNB 160. Alternatively, the value n may be determined according to the LBT performed by the UE 102. In a CCA slot in the first n−1 SC-FDMA symbol(s) in the subframe, the UE 102 may sense the channel for channel access. Once the UE 102 gets the channel, the UE 102 may have to start to transmit a reservation signal immediately if there is still some remaining time until the starting timing of the n-th SC-FDMA symbol in the subframe. The reservation signal could be cyclic prefix like signal.

Figure 10A:
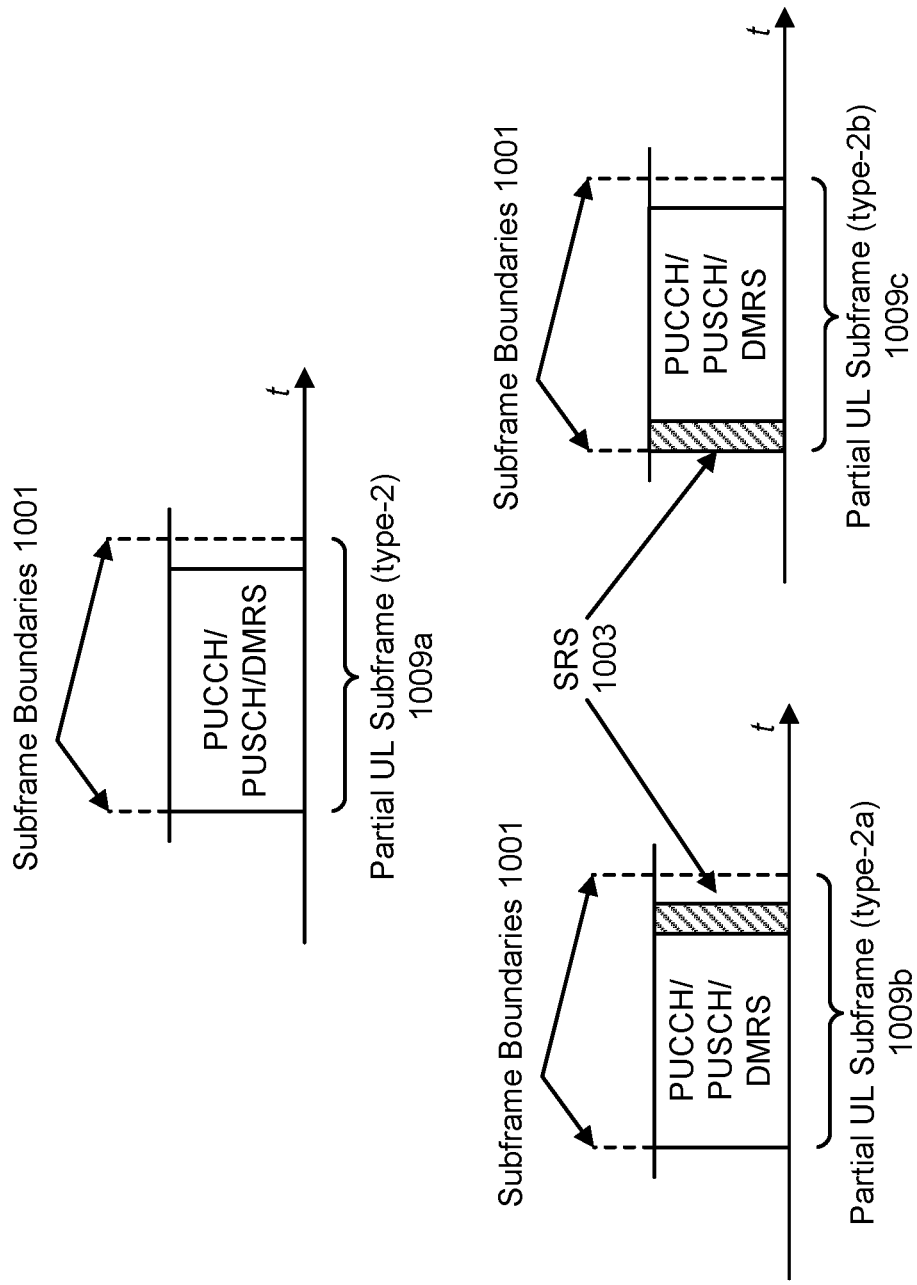
FIG. 10A illustrates examples of a partial UL subframe (type-2) option.

FIG. 10A illustrates examples of a partial UL subframe (type-2) option. These examples use an option for a partial UL subframe (i.e., partial UL subframe type-2) in which the last one or more SC-FDMA symbols are not used for PUCCH/PUSCH/DMRS/SRS transmissions. Subframe boundaries 1001 are shown for three examples of partial UL subframes.

In the partial UL subframe (type-2) 1009*a*, if the subframe is not an SRS subframe, PUSCH and PUCCH may be mapped on all SC-FDMA symbol(s) from the first SC-FDMA symbol to the n-th SC-FDMA symbol from the last in the subframe except for the SC-FDMA symbol(s) on which DMRS is mapped.

If the subframe is an SRS subframe, PUSCH and PUCCH are mapped on all SC-FDMA symbols n+1-th SC-FDMA symbol to the last SC-FDMA symbol in the subframe except for the SC-FDMA symbol(s) for DMRS. SRS 1003 may be mapped on the n-th SC-FDMA symbol from the last in the SRS subframe. This option is shown in the example of the partial UL subframe (type-2a) 1007*b*. In another option, the SRS 903 may be mapped on the first SC-FDMA symbol in the SRS subframe, as shown in the example of the partial UL subframe (type-2b) 1007*c*.

The value n may be fixed or may be configurable by the eNB 160. Alternatively, the value n may be determined according to the LBT performed by the UE 102. In a CCA slot in the last n−1 SC-FDMA symbol(s) in the subframe, the UE 102 may sense the channel for channel access for the next subframe. From another perspective, for channel access for the subframe, the UE 102 may sense the channel in a CCA slot in the last n−1 SC-FDMA symbol(s) of the previous subframe. Once the UE 102 gets the channel, the UE 102 may have to start to transmit a reservation signal immediately if there is still some remaining time until the starting timing of the first SC-FDMA symbol of the next subframe. The reservation signal could be cyclic prefix like signal.

Figure 10B:
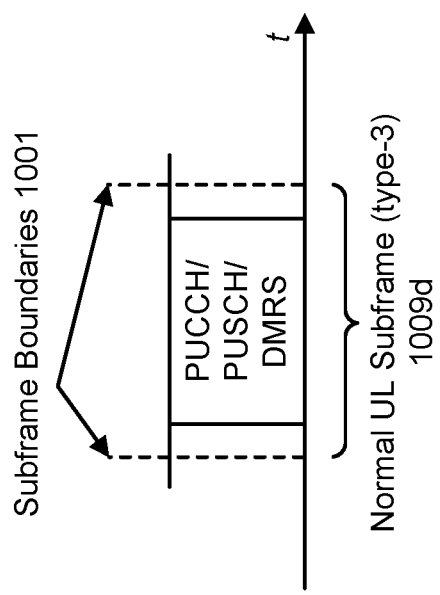
FIG. 10B illustrates an example of a type-3 partial UL subframe.

FIG. 10B illustrates an example of a type-3 partial UL subframe 1007*d*. In this example, the first symbol(s) and the last symbol(s) might not be available for PUSCH/SRS transmission. Subframe boundaries 1001 are shown for this example of a partial UL subframe.

Figure 11:
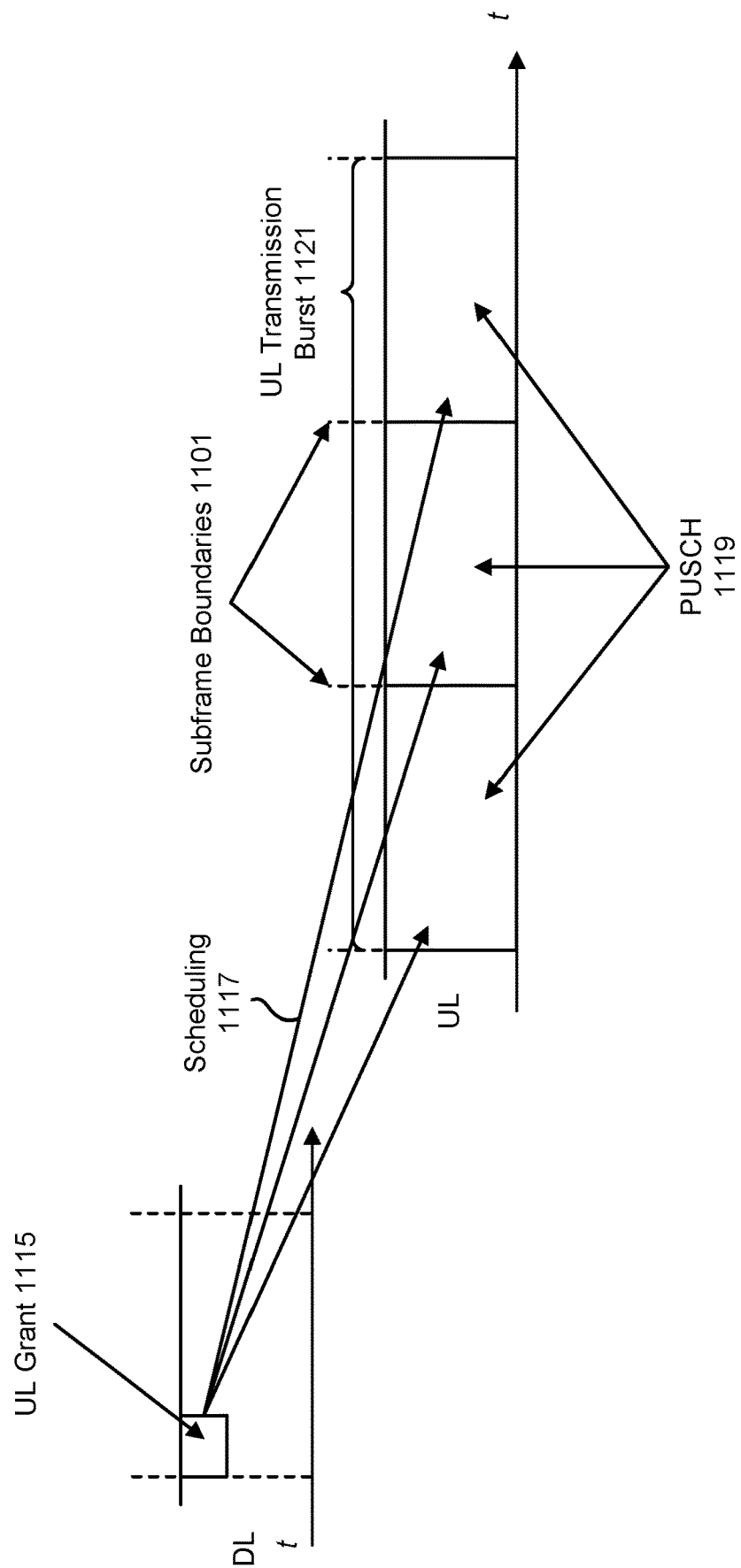
FIG. 11 illustrates an example of multiple physical uplink shared channel (PUSCH) scheduling from a single UL grant.

FIG. 11 illustrates an example of multiple PUSCH 1119 scheduling from a single UL grant 1115. This example corresponds to the first option (Option 1) for PUSCH scheduling described above. A DL subframe and corresponding UL subframes are depicted.

In Option 1, the UE 102 may attempt blind decoding of (E)PDCCH with DCI format for the UL grant 1115. The detection of the (E)PDCCH may indicate multiple PUSCHs 1119 that are contained in different subframes. The subframes may be consecutive subframes. The number of subframes may be configured by higher layer signaling. Alternatively, it may be indicated by using an information field in the DCI format.

For Option 1, DCI format may be different from the normal UL grant. Possible enhancements are listed below. A single (E)PDCCH may contain concatenated DCI formats. Each of the DCI format may be the same as for the normal UL grant. In this example, the scheduling 1117 for each PUSCH 1119 in a UL transmission burst 1121 may come from a single UL grant 1115. The subframes in the UL transmission burst 1121 may be separated at subframe boundaries 1101.

A single (E)PDCCH may contain the new DCI formats which can indicate more than one PDSCH in different subframes. The new DCI format may have one or more information fields applying all of the scheduled PDSCHs and one or more information fields applying one of the scheduled PDSCHs. When the multiple fields for the same assumption per PUSCH 1119 are included in the DCI format, the number of the fields for the assumption may be the same as the maximum number (e.g., 4) of the PUSCHs 1119 which can be scheduled by a single UL grant 1115. In another example, the number of the fields for the assumption may be equal to the number (e.g., 4) of the actual PUSCHs 1119 which are scheduled by the concerned UL grant 1115.

A single new field for indicating the number of actual scheduled PUSCHs 1119 may be included in the DCI format. The number of actual scheduled PUSCHs 1119 may have to be less than or equal to the maximum number of the PUSCHs 1119 which can be scheduled by a single UL grant 1115. $N_{max}$, the maximum number of the scheduled PUSCHs 1119, could be either a constant (e.g., a pre-defined fixed value) or a configurable value based on a higher layer parameter. In an example, the actual scheduled PUSCHs 1119 may be indicated by using a bitmap scheme. To be more specific, this field may consist of $N_{max}$ bits and the n-th bits indicates whether the n-th subframe among $N_{max}$ subframes carries PUSCH 1119 or not. If the n-th bits are set to 0, the UE 102 may attempt a channel access for the n-th PUSCH 1119 subframe and/or may transmit PUSCH 1119 in the n-th PUSCH subframe. In another example, the bit size of this field may depend on the value of $N_{max}$. In another example, this field may be jointly coded with the other information field such as an uplink subframe structure field and/or a channel access scheme field.

A single CIF field may be included in the DCI format, and the CIF field may be common among the PDSCHs scheduled by the (E)PDCCH. The (E)PDCCH may be able to schedule multiple PDSCH only on the same scheduled cell.

A single resource block assignment field may be included in the DCI format, and the resource block assignment field may be common among the PDSCHs scheduled by the (E)PDCCH. The same set of the PRB pairs may be used for the PDSCHs. For another example, although the resource block assignment field may be commonly used, subframe hopping may be applied based on system subframe number. In other words, actual sets of the PRB pair may be derived by using the value of the resource block assignment and system subframe number so that the actual sets of the PRB pairs may change subframe-by-subframe. Alternatively, multiple resource block assignment fields may be included in the DCI format, and each of the resource block assignment fields may indicate PRB pairs allocated for each of the PUSCHs 1119. Note that bit size of the resource block assignment may be the same as in the DCI format for a non-LAA cell. Alternatively, bit size of the resource block assignment may be smaller than the one in the DCI format for a non-LAA cell.

A single TPC command for scheduled PUSCH 1119 may be included in the DCI format, and the TPC command field for scheduled PUSCH 1119 may be common among the PDSCHs scheduled by the (E)PDCCH. The TPC command field for scheduled PUSCH 1119 may be used (e.g., accumulated) for derivation of PUSCH transmission power $P_{PUSCH,c}$ for the first (e.g., earliest) PUSCH 1119 among the multiple PUSCHs 1119 scheduled by the (E)PDCCH. The $P_{PUSCH,c}$ may be used for the remaining PUSCHs 1119. Note that power scaling (including a non-power scaling case) may apply to each of the PUSCHs 1119 independently.

A single modulation and coding scheme (MCS) field may be included in the DCI format, and the MCS field may be common among the PDSCHs scheduled by the (E)PDCCH. Alternatively, multiple MCS fields may be included in the DCI format, and each of the MCS fields may indicate modulation scheme and transport block size for each of the PUSCHs 1119. In addition, the MCS field may be separately included per transport block.

A single downlink assignment index (DAI) field may be included in the DCI format, and the DAI field may be common among the PDSCHs scheduled by the (E)PDCCH. To be more specific, the value of DAI is used as a DAI value for the first PUSCH 1119 among the scheduled PUSCHs 1119. The DAI value for the n-th PUSCH 1119 among the scheduled PUSCHs 1119 may be calculated by using the value of the DAI field x. The DAI value for the m-th PUSCH 1119 may be (x+m) mod 4. Alternatively, multiple DAI fields may be included in the DCI format, and each of the DAI fields may indicate the DAI value for each of the PUSCHs 1119.

A single CSI request field may be included in the DCI format. Upon the CSI triggering using the CSI request field, aperiodic CSI may have to be contained in the first PUSCH 1119. For another example, aperiodic CSI may have to be contained in every PUSCH 1119. Alternatively, multiple CSI request fields may be included in the DCI format, and each of the CSI request fields may indicate the CSI reporting in each of the PUSCHs 1119. In yet another example, the CSI request field may also indicate one of the potentially scheduled PUSCH 1119 subframes, and then the CSI may be contained in the indicated subframe. Alternatively, this could be indicated via a different field (e.g., a new field for indicating aperiodic CSI reporting subframe) on top of the CSI request field.

A single SRS request field may be included in the DCI format. Upon the SRS triggering using the SRS request field, SRS may have to be contained in the first PUSCH 1119. For another example, SRS may have to be contained in every PUSCH 1119. For yet another example, the SRS request field may also indicate one of the potentially scheduled PUSCH 1119 subframes, and then SRS may be contained in the indicated subframe. Alternatively, this could be indicated via a different field (e.g., a new field for indicating aperiodic SRS subframe) on top of the SRS request field.

A single HARQ-ACK request field may be included in the DCI format. Upon the HARQ-ACK triggering using the HARQ-ACK request field, HARQ-ACKs of some HARQ processes (e.g., all HARQ-ACK processes on LAA SCells) may have to be contained in the first PUSCH 1119. For another example, HARQ-ACKs may have to be contained in every PUSCH 1119. For yet another example, the HARQ-ACK request field may also indicate one of the potentially scheduled PUSCH 1119 subframes, and then HARQ-ACKs may be contained in the indicated subframe. Alternatively, this could be indicated via a different field (e.g., a new field for indicating aperiodic HARQ-ACK subframe or may be shared with the field for indicating the CSI or SRS subframe) on top of the HARQ-ACK request field.

Multiple new data indicator fields may be included in the DCI format, and each of the new data indicator fields may indicate whether each of the PUSCHs 1119 is for an initial transmission or an re-transmission. In addition, the new data indicator field may be separately included per transport block.

Multiple HARQ process number fields may be included in the DCI format. Each of the new data indicator fields may indicate the HARQ process number of each of the PUSCHs 1119. Alternatively, a single HARQ process number field may be included in the DCI format, and the HARQ process number of each PUSCH 1119 may be derived by using the value of this field.

Multiple redundancy version fields may be included in the DCI format. Each of the redundancy version fields may indicate the redundancy version of each of the PUSCHs 1119. Alternatively, a single redundancy version field may be included in the DCI format, and the redundancy version of each PUSCH 1119 may be derived by using the value of this field.

A single precoding information field may be included in the DCI format. In this case, the same precoding matrix is used for all of the scheduled PUSCH 1119. Alternatively, multiple precoding information fields may be included in the DCI format, and each of the precoding information fields may indicate the precoding matrix for each of the PUSCHs 1119.

A single uplink subframe structure (e.g., the number of occupied SC-FDMA symbols) field may be included in the DCI format. In this case, the uplink subframe structure is basically used for all of the scheduled PUSCH 1119. Alternatively, multiple uplink subframe structure fields may be included in the DCI format, and each of the uplink subframe structure fields may indicate the uplink subframe structure for each of the $N_{max}$ PUSCHs 1119.

One example may be that each of the uplink subframe structure fields consists of 2 bits. One of the 2 bits for the n-th subframe may indicate whether or not the first symbol of the n-th subframe is available for PUSCH 1119 transmission while the other one may indicate whether or not the last symbol of the n-th subframe is available for PUSCH/SRS transmission. In other words, the 2 bits for the n-th subframe may indicate one state out of the four states. State (1) may be both the first and the last symbols are available for PUSCH/SRS transmission (i.e., symbol #0 to #13 are occupied). State (2) may be the first symbol is available for PUSCH 1119 transmission but the last symbol is not available for PUSCH/SRS transmission (i.e., symbol #0 to #12 are occupied and symbol #13 might not be occupied). State (3) may be the first symbol is not available for PUSCH 1119 transmission but the last symbol is available for PUSCH/SRS transmission (i.e., symbol #1 to #13 are occupied and symbol #0 might not be occupied). State (4) may be neither the first nor the last symbols are available for PUSCH/SRS transmission (i.e., symbol #1 to #12 are occupied and symbols #0 and #13 might not be occupied).

In this case, each bit has its own information (i.e., the availability of symbol #0 and the one of symbol #13) and could be recognized as a different field. In another example, this field may be jointly coded with a channel access scheme field. A more specific example is that 3 bits may indicate a combination of available symbols (also referred to as occupied symbols) and a channel access scheme as shown in Table 13 or Table 14. Moreover, this field may indicate subframe configuration of the previous subframe in addition to the current subframe as shown in Table 15 or Table 16. In case of Table 16, each bit has its own information (i.e., availability of symbol #0 and the one of symbol #13 in the n-th subframe and availability of symbol #13 in the n−1-th subframe) and could be recognized as a different field.

TABLE 13

| Value | Configuration of occupied symbols | Channel access scheme |
|---|---|---|
| 0 | #0-#13 | — |
| 1 | #1-#13 | Cat-4 |
| 2 | #1-#13 | Single 25 μs slot |
| 3 | #0-#12 | — |
| 4 | #1-#12 | Cat-4 |
| 5 | #1-#12 | Single 25 μs slot |
| 6 | reserved | reserved |
| 7 | reserved | reserved |

Note:
"—" means that channel access might not be needed.

TABLE 14

| Value | Configuration of occupied symbols in the n-th subframe | Occupancy of the last symbol of the n − 1-th subframe | Channel access scheme |
|---|---|---|---|
| 0 | #0-#13 | — | — |
| 1 | #1-#13 | — | Cat-4 |
| 2 | #1-#13 | Not occupied | Cat-4 |
| 3 | #1-#13 | — | Single 25 μs slot |
| 4 | #0-#12 | — | — |
| 5 | #1-#12 | — | Cat-4 |
| 6 | #1-#12 | Not occupied | Cat-4 |
| 7 | #1-#12 | — | Single 25 μs slot |

Note:
"—" in occupancy of the last symbol of the n − 1-th subframe means that last symbol of the n − 1-th subframe may or may not be occupied.
Note:
"—" in channel access scheme means that channel access might not be needed.

TABLE 15

| Value | Configuration of occupied symbols in the n-th subframe | Occupancy of the last symbol of the n − 1-th subframe |
|---|---|---|
| 0 | #0-#13 | — |
| 1 | #1-#13 | — |
| 2 | #1-#13 | Not occupied |
| 3 | #0-#12 | — |
| 4 | #1-#12 | — |
| 5 | #1-#12 | Not occupied |
| 6 | reserved | reserved |
| 7 | reserved | reserved |

Note:
"—" in occupancy of the last symbol of the n − 1-th subframe means that last symbol of the n-1-th subframe may or may not be occupied.

TABLE 16

| Value | Configuration of occupied symbols in the n-th subframe | Occupancy of the last symbol of the n − 1-th subframe |
|---|---|---|
| 0 | #0-#13 | Occupied |
| 1 | #1-#13 | Occupied |
| 2 | #0-#12 | Occupied |
| 3 | #1-#12 | Occupied |
| 4 | #0-#13 | Not occupied |

TABLE 16-continued

| Value | Configuration of occupied symbols in the n-th subframe | Occupancy of the last symbol of the n − 1-th subframe |
| --- | --- | --- |
| 5 | #1-#13 | Not occupied |
| 6 | #0-#12 | Not occupied |
| 7 | #1-#12 | Not occupied |

A single channel access scheme field may be included in the DCI format. In this case, the UE 102 may perform the indicated channel access scheme (e.g., Cat-4 channel access or channel access based on one shot 34 micro second channel sensing duration) once before starting multiple PUSCH transmissions in consecutive multiple uplink subframes. Alternatively, multiple channel access scheme fields may be included in the DCI format, and each of the channel access scheme fields may indicate the channel access scheme for each of the PUSCHs 1119.

One example may be that each of the uplink subframe structure fields consist of 2 bits. The 2 bits may express one of at least 3 states: (1) Cat-4 channel access, (2) sensing with a single 25 μs slot duration, and (3) no channel access may be needed. In another example, this field may be jointly coded with the information indicating the actual scheduled PUSCH 1119 subframe(s). More specifically, 2 bits for the n-th subframe may indicate a combination of the channel access scheme for the n-th subframe and whether or not PUSCH 1119 is to be transmitted in the n-th subframe as shown in Table 17. In yet another example, this field may be jointly coded with the information indicating the uplink subframe structure as shown in Table 13 and 14. In yet another example, this field may be jointly coded with the information indicating the uplink subframe structure as well as the information indicating the actual scheduled PUSCH 1119 subframe(s) as shown in Table 18.

TABLE 17

| Value | PUSCH transmission | Channel access scheme |
| --- | --- | --- |
| 0 | Not granted | — |
| 1 | Granted | — |
| 2 | Granted | Cat-4 |
| 3 | Granted | Single 25 μs slot |

Note:
"—" means that channel access might not be needed.

TABLE 18

| Value | PUSCH transmission | Channel access scheme | Configuration of occupied symbols in the n-th subframe |
| --- | --- | --- | --- |
| 0 | Not granted | — | — |
| 1 | Granted | — | #0-#13 |
| 2 | Granted | — | #0-#12 |
| 3 | Granted | Cat-4 | #1-#13 |
| 4 | Granted | Cat-4 | #1-#12 |
| 5 | Granted | Single 25 μs slot | #1-#13 |
| 6 | Granted | Single 25 μs slot | #1-#12 |
| 7 | reserved | reserved | reserved |

Note:
"—" for channel access scheme means that channel access might not be needed.
Note:
"—" for configuration of occupied symbols means that symbols might not be occupied.

If the scheduling cell is FDD, the association timing between the UL grant 1115 and the first potentially scheduled PUSCH 1119 may follow the association timing derivation mechanism for non-LAA carriers with FDD. More specifically, the UL grant 1115 in subframe n−4 may be able to schedule multiple PUSCH 1119 in multiple subframes starting at subframe n and ending at subframe n+M−1, where M is the maximum number of multiple PUSCH 1119 subframes associated with the UL grant 1115. Time duration based on the consecutive uplink subframes may be recognized as uplink maximum occupancy time (UL MCOT).

Figure 12:
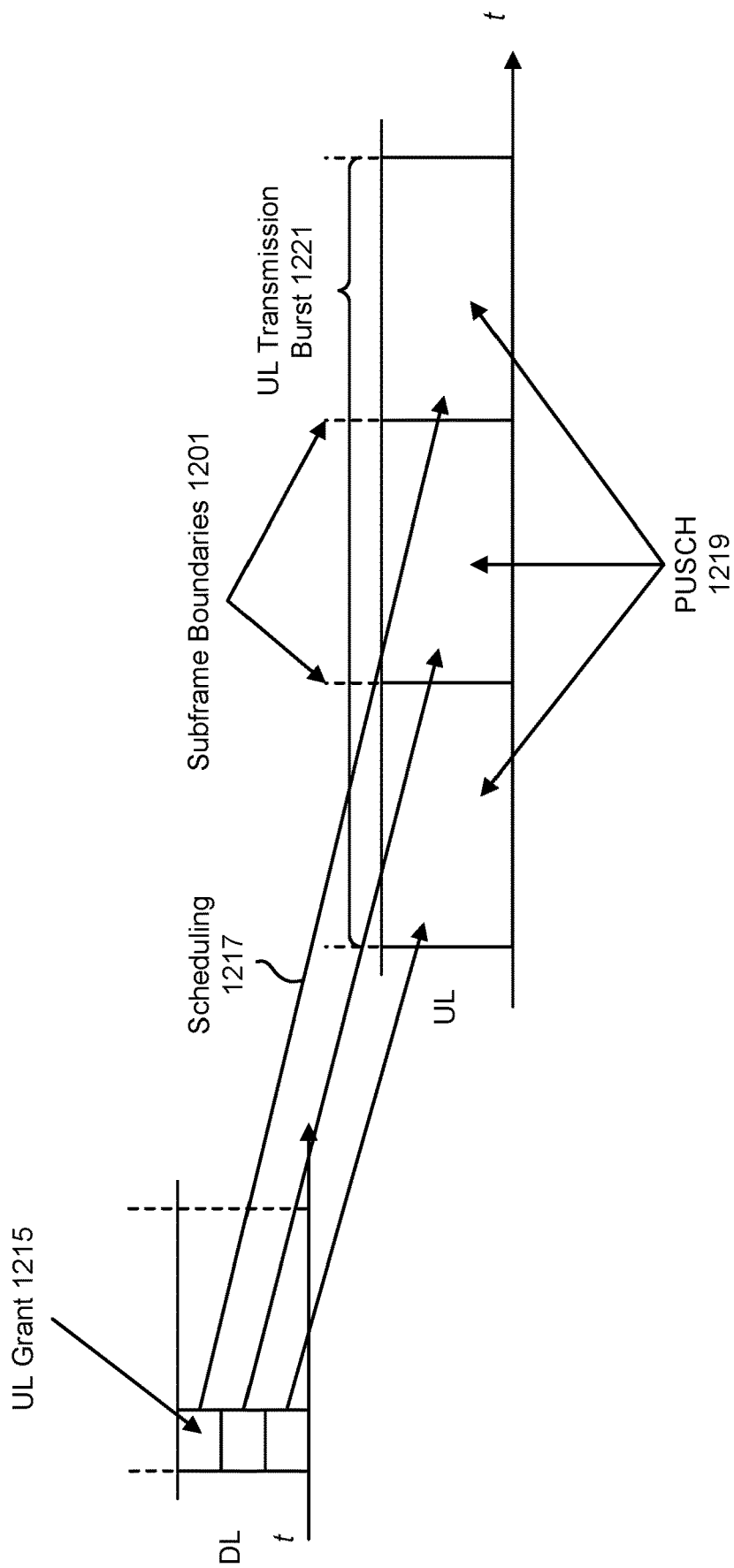
FIG. 12 illustrates an example of multiple PUSCH scheduling from multiple UL grants in a single downlink (DL) subframe.

FIG. 12 illustrates an example of multiple PUSCH 1219 scheduling from multiple UL grants 1215 in a single DL subframe. This example corresponds to the second option (Option 2) for PUSCH scheduling described above. A DL subframe and corresponding UL subframes are depicted.

In Option 2, the UE 102 may attempt blind decoding of multiple (E)PDCCHs with DCI format for the UL grant(s) 1215. The detection of each of the (E)PDCCHs may indicate each of the multiple PUSCHs 1219 which are contained in different subframes. The subframes may or may not be consecutive subframes. The maximum number of (E)PDCCHs which the UE 102 should monitor in a subframe may be either a constant or a configurable value based on a higher layer parameter. In this example, the scheduling 1217 for each PUSCH 1219 in a UL transmission burst 1221 may come from a multiple UL grants 1215. The subframes in the UL transmission burst 1221 may be separated at subframe boundaries 1201.

There are several approaches to define the association timing between UL grant 1215 and the corresponding PUSCH 1219 subframe. In a first approach (Approach 1), CRC bits attached to (E)PDCCHs may be scrambled by a Cell Radio Network Temporary Identifier (C-RNTI) of the serving cell. DCI format may include an information field for indicating the corresponding PUSCH 1219 subframe. The corresponding PUSCH 1219 subframe may be expressed by using a subframe offset from the association timing for non LAA carriers with FDD. For example, the 2-bit information field may be set to either one of 0 to 3.

Each of the field values corresponds to one of offset (also referred to as shift) values 0 to 3. For detection of (E)PDCCH in subframe n−4, if the value of the information field of the (E)PDCCH is equal to k, the (E)PDCCH schedules PUSCH 1219 in subframe n+k.

In addition to this information field, the DCI format may include the information field indicating the number of the actual PUSCHs 1219 scheduled from the DL subframe (i.e., the number of actually transmitted UL grants 1215 intended for the UE 102 in the DL subframe). The value of this field may have to be the same across the multiple (E)PDCCH in the subframe.

In a second approach (Approach 2), CRC bits attached to (E)PDCCH may be scrambled by using RNTI which is tied to a UL subframe. For example, in subframe n−4, the UE 102 may monitor (E)PDCCH with CRC scrambled by RNTI1, (E)PDCCH with CRC scrambled by RNTI2, and (E)PDCCH with CRC scrambled by RNTI3. Upon the detection of the (E)PDCCH with CRC scrambled by RNTI1, the UE 102 may transmit the corresponding PUSCH 1219 in subframe n. Upon the detection of the (E)PDCCH with CRC scrambled by RNTI2, the UE 102 may transmit the corresponding PUSCH 1219 in subframe n+1. Upon the detection of the (E)PDCCH with CRC scrambled by RNTI3, the UE 102 may transmit the corresponding PUSCH 1219 in subframe n+2.

The eNB 160 may configure, in the UE 102, with multiple RNTIs. The eNB 160 may send an RRC message indicating the multiple RNTIs. Alternatively, the eNB 160 may send an RRC message indicating RNTI1 (e.g., C-RNTI), and then the UE 102 may derive the remaining RNTI(s) by using the RNTI1. For example, RNTI2 may be RNTI1+1, RNTI3 may be RNTI1+2, and so on.

In a third approach (Approach 3), CRC bits attached to (E)PDCCH may be masked by using the binary sequence which is tied to a UL subframe. For example, in subframe n−4, the UE 102 may monitor (E)PDCCH with CRC masked by the first binary sequence (e.g., "0000000000000000"), (E)PDCCH with CRC masked by the second binary sequence (e.g., "0000000000000001"), and (E)PDCCH with CRC masked by the third binary sequence (e.g., "0000000000000010") in subframe n. Upon the detection of the (E)PDCCH with CRC masked by the first binary sequence (or not masked), the UE 102 may transmit the corresponding PUSCH 1219 in subframe n. Upon the detection of the (E)PDCCH with CRC masked by the second binary sequence, the UE 102 may transmit the corresponding PUSCH in subframe n+1. Upon the detection of the (E)PDCCH with CRC masked by the third binary sequence, the UE may transmit the corresponding PUSCH in subframe n+2.

Figure 13:
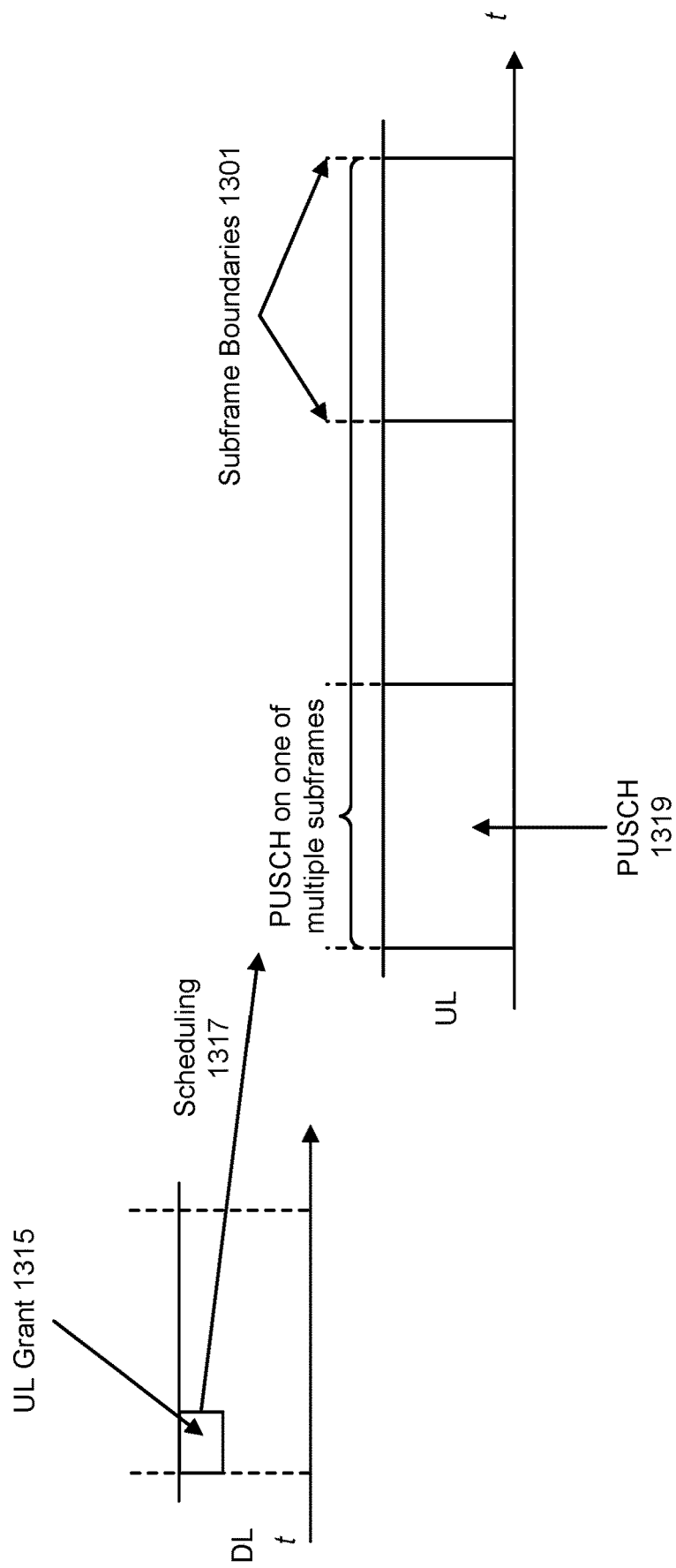
FIG. 13 illustrates an example of multiple possible subframes for one PUSCH scheduled by a single UL grant.

FIG. 13 illustrates an example of multiple possible subframes for one PUSCH 1319 scheduled by a single UL grant 1315. This example corresponds to the third option (Option 3) for PUSCH scheduling described above. In this example, the scheduling 1317 for a PUSCH 1219 in a UL transmission may come from a single UL grant 1315.

In Option 3, the UE 102 may attempt blind decoding of (E)PDCCH with DCI format for a UL grant 1315. The detection of each of the (E)PDCCHs may indicate a single PUSCH 1319 which can be contained in one of multiple subframes. The multiple subframes may be consecutive subframes separated by subframe boundaries 1301.

The number of the subframes which potentially contains the scheduled PUSCH 1319 may be either a constant or a configurable value based on a higher layer parameter. Or, the value may be indicated in an information field in the DCI format.

The UE 102 can attempt to get the channel more than once for transmission of the scheduled PUSCH 1319. Once the UE 102 gets the channel and transmits the scheduled PUSCH 1319 in a given subframe, the UE 102 might not be allowed to transmit the PUSCH 1319 in a later subframe. Hence, the number of the subframes which potentially contains the scheduled PUSCH 1319 may be equivalent to the maximum number of LBT attempts based on the single UL grant 1315. The parameter set indicated by the (E)PDCCH may apply to the scheduled PUSCH 1319 regardless of which subframe contains the PUSCH 1319.

Figure 14:
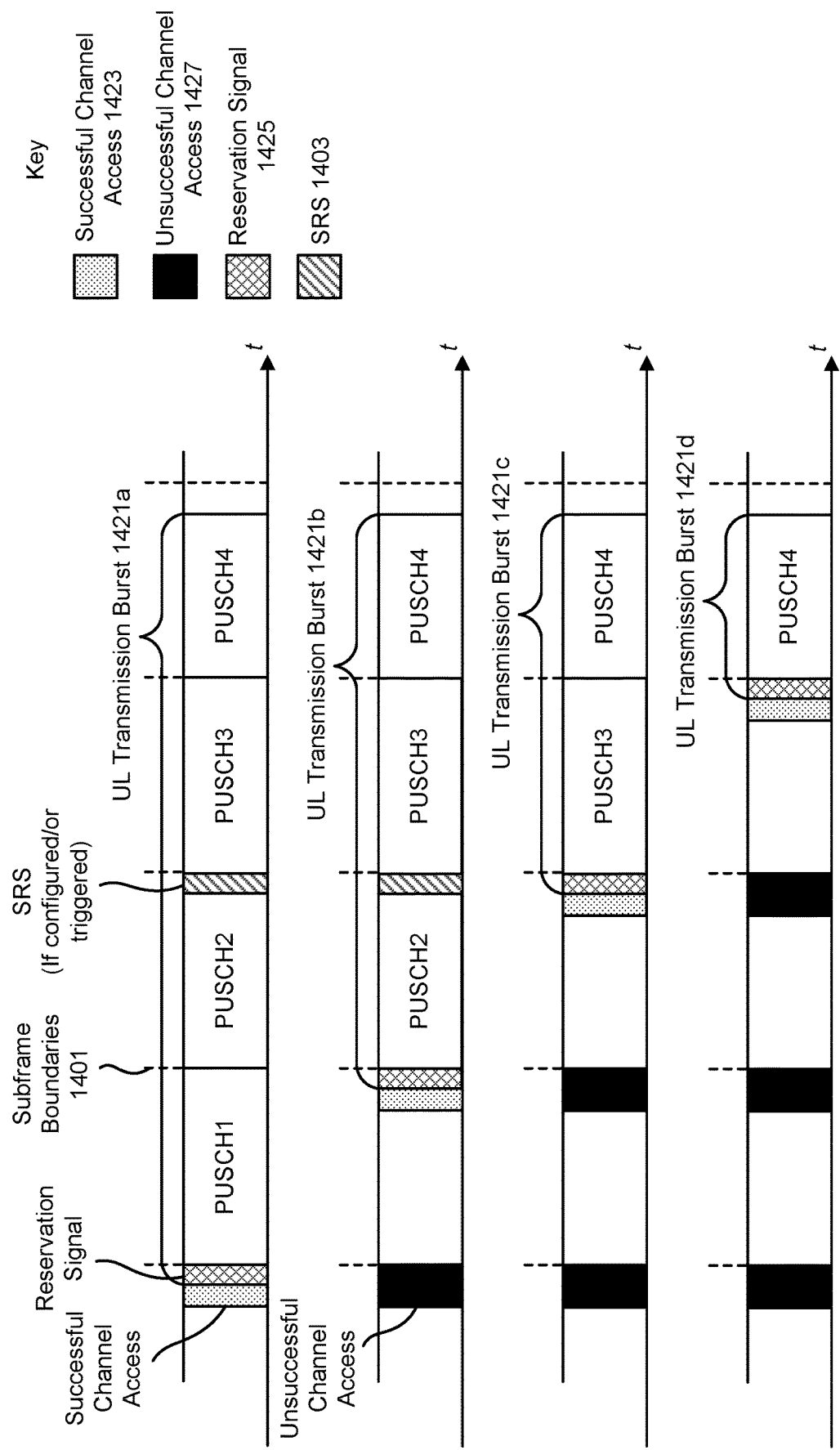
FIG. 14 illustrates a first approach (Approach 1) of a listen before talk (LBT) scheme, UL subframe structure, and PUSCH scheduling scheme combination.

FIG. 14 illustrates a first approach (Approach 1) of an LBT scheme, UL subframe structure, and PUSCH scheduling scheme combination. In particular, Approach 1 includes a Cat-4 LBT, type-0/0a/2/2a UL subframe structure, and Option 1 multi-subframe scheduling. The timing for successful channel access 1423, unsuccessful channel access 1427, a reservation signal(s) 1425 and SRS 1403 is shown for multiple UL transmission bursts 1421a-d.

In this approach, the eNB 160 may transmit (E)PDCCH carrying a UL grant in downlink subframe n−4, where the UL grant schedules k PUSCHs in different uplink subframes. If the UE detects the (E)PDCCH in the downlink subframe n, the UE 102 may start to prepare the corresponding PUSCH transmissions based on the information provided by the DCI format. For example, for all of the PUSCH HARQ processes of which new data indicators indicate initial transmissions, the UE 102 may flush buffers and store new bits for the initial transmissions.

The UE 102 may perform Cat-4 LBT in the last one or two SC-FDMA symbol(s) of uplink subframe n−1 in order to get the channel for a PUSCH transmission in uplink subframe n. If the UE 102 gets the channel, the UE 102 may start to transmit a reservation signal 1425 (e.g., CP) immediately and keep transmitting it until the starting subframe boundary 1401 of the uplink subframe n. Then, the UE may transmit the scheduled PUSCHs from the uplink subframe n to subframe n+k−1. For the first k−1 uplink subframes, the type-0 subframe structure may be used, while the k-th (i.e., last) uplink subframe may have the type-2 UL subframe structure.

If the uplink subframe is a SRS 1403 subframe, the type-0a UL subframe structure with SRS 1403 may be used for the subframe n to the subframe n+k−2, and the type-2a UL subframe structure may be used for the subframe n+k−1. Therefore, the UE 102 may be able to transmit PUSCHs in consecutive uplink subframes without any gap (non-occupied) duration.

If the UE 102 fails to get the channel in the last one or two SC-FDMA symbol(s) of the uplink subframe n−1, the UE 102 may drop the transmission of the PUSCH (i.e., the first PUSCH among the k PUSCHs) for the uplink subframe n and may perform Cat-4 LBT in the last one or two SC-FDMA symbol(s) of uplink subframe n in order to get the channel for the PUSCH transmission in uplink subframe n+1. If the UE 102 gets the channel, the UE 102 may transmit a reservation signal 1425 followed by the scheduled PUSCHs (i.e., from the second PUSCH to the last PUSCH among the k PUSCHs) for the uplink subframe n+1 to the uplink subframe n+k−1.

Similarly to the previous case, the last uplink subframe may have the type-2/2a UL subframe structure, while the remaining uplink subframes may have the type-0/0a UL subframe structure. Although subframe structures may change depending on the subframe position within the k consecutive subframes, the position of the last uplink subframe does not change regardless of when the UE 102 gets the channel. Therefore, the eNB 160 knows the subframe structures of all uplink subframes.

The eNB 160 may always attempt to detect an earliest PUSCH among the multiple PUSCHs if scheduling. The eNB 160 may attempt to detect an n+1-th PUSCH among the multiple PUSCHs only when an n-th PUSCH among the multiple PUSCHs was successfully detected. Alternatively, the eNB 160 may always attempt to detect all of the scheduled PUSCHs.

In this approach, if the CCA is performed before the subframe boundary 1401, regular PUSCH subframe may be used for consecutive UL transmissions. The last PUSCH in the UL transmission burst 1421 may be a full subframe if it is within the MCOT of the LAA UE 102. The last PUSCH in the UL transmission burst 1421 may be a partial subframe to give CCA gap for contention access of the next subframe.

Figure 15:
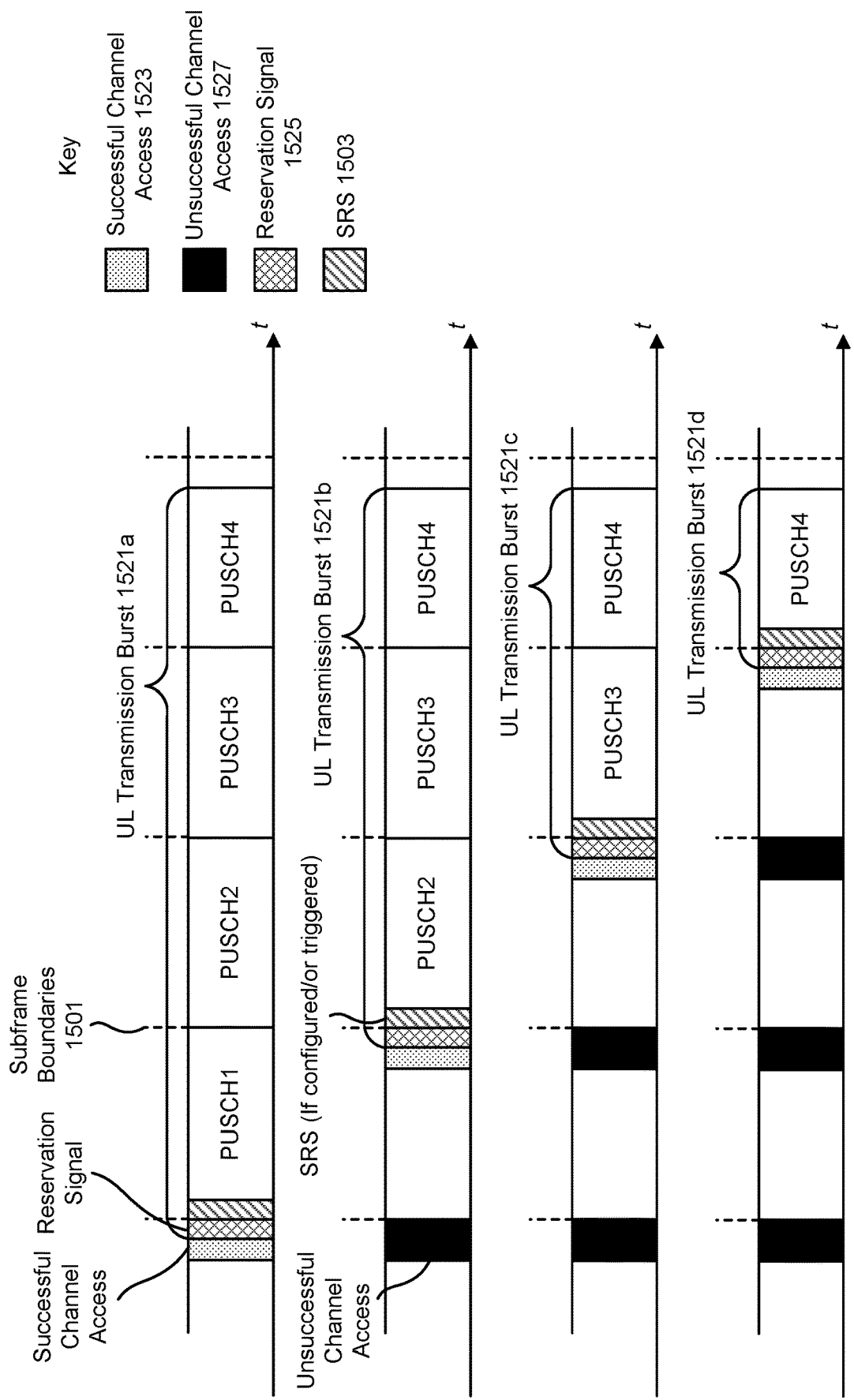
FIG. 15 illustrates a second approach (Approach 2) of an LBT scheme, UL subframe structure, and PUSCH scheduling scheme combination.

FIG. 15 illustrates a second approach (Approach 2) of an LBT scheme, UL subframe structure, and PUSCH scheduling scheme combination. In particular, Approach 2 includes a Cat-4 LBT, type-0/0b/2/2b UL subframe structure, and Option 1 multi-subframe scheduling. The timing for successful channel access 1523, unsuccessful channel access 1527, reservation signal(s) 1525 and SRS 1503 is shown for multiple UL transmission bursts 1521a-d.

In this approach, most of the procedures are the same as in the first approach (Approach 1) described in connection with FIG. 14. A difference may be SRS 1503 transmissions. Upon the indication by SRS request field in the (E)PDCCH, the UE 102 may transmit SRS 1503 just after the starting subframe boundary 1501 of the first subframe after a successful channel access. The SRS 1503 transmission may be allowed only before the transmission of the first PUSCH. This may allow that the UE's SRS 1503 transmission is multiplexed with the other UEs SRS only (SRS 1503 without PUSCH) transmission.

To achieve such SRS 1503 transmission, the first uplink subframe after the successful channel access 1523 may have to be the type-2b UL subframe structure. As in Approach 1, the last uplink subframe may have to have the type-2 UL subframe structure. The remaining uplink subframe could have the type-0 UL subframe structure. In this instance, the eNB 160 may perform blind detections of subframe structure to successfully decode PUSCH, since the eNB 160 does not know when the UE 102 got the channel and started to transmit the UL signal.

Figure 16:
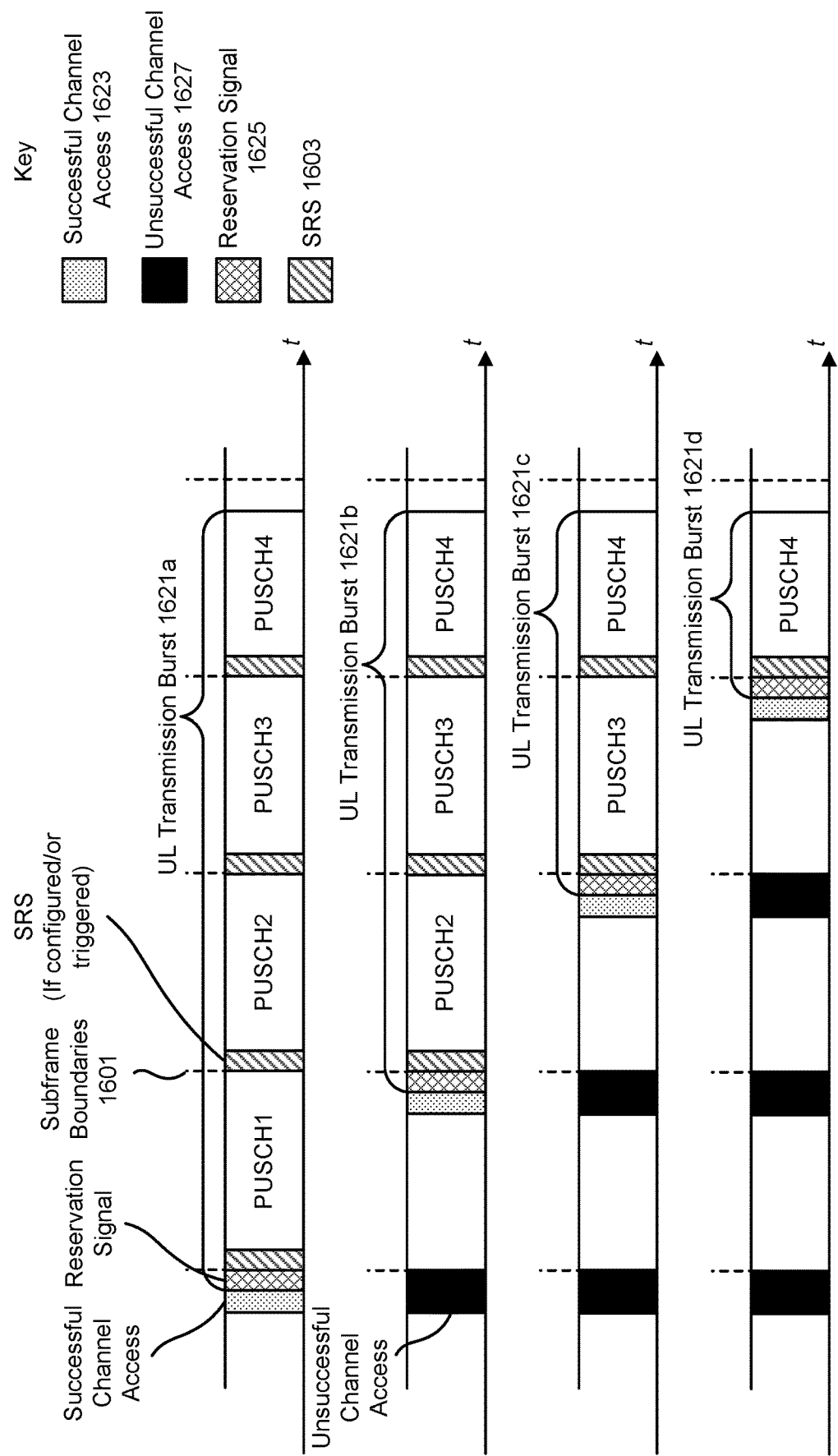
FIG. 16 illustrates the second approach (Approach 2) with a clear channel assessment (CCA) gap in every uplink subframe.

To reduce the eNB 160 processing on the PUSCH detection, type-0b UL subframe structure could also be used for the remaining uplink subframes, as shown in FIG. 16. In these remaining subframes, the UE 102 may transmit SRSs 1503 on SC-FDMA symbols reserved for SRS transmission or may transmit reservation signals on those symbols.

FIG. 16 illustrates the second approach (Approach 2) with a CCA gap in every uplink subframe. In particular, FIG. 16 shows a Cat-4 LBT, type-0/0b/2/2b UL subframe structure, and Option 1 multi-subframe scheduling as described in connection with FIG. 15. The timing for successful channel access 1623, unsuccessful channel access 1627, reservation signal(s) 1625 and SRS 1603 is shown for multiple UL transmission bursts 1621a-d. Subframe boundaries 1601 are also shown. However, to reduce the eNB 160 processing on the PUSCH detection, type-0b UL subframe structure may be used for the remaining uplink subframes upon successful channel access 1623.

Figure 17:
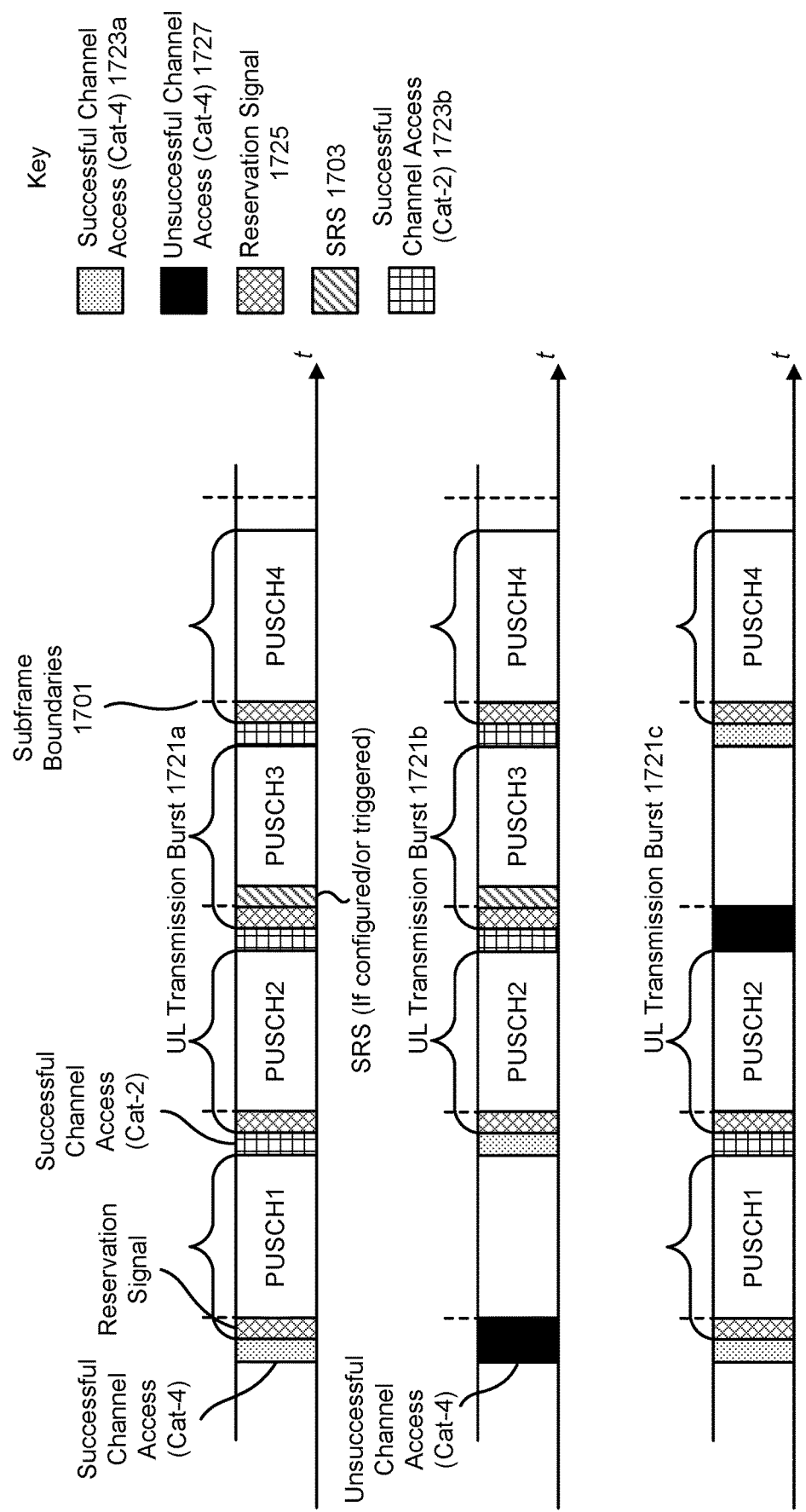
FIG. 17 illustrates a third approach (Approach 3) of an LBT scheme, UL subframe structure, and PUSCH scheduling scheme combination.

FIG. 17 illustrates a third approach (Approach 3) of an LBT scheme, UL subframe structure, and PUSCH scheduling scheme combination. In particular, Approach 3 includes Cat-4 LBT and Cat-2 LBT, type-2/2b UL subframe structure, and Option 1 multi-subframe scheduling. The timing for successful channel access (Cat-4) 1723a, successful channel access (Cat-2) 1723b, unsuccessful channel access (Cat-4) 1727, reservation signal(s) 1725 and SRS 1703 is shown for multiple UL transmission bursts 1721a-c.

In this approach, the eNB 160 may transmit (E)PDCCH carrying a UL grant in downlink subframe n−4, where the UL grant schedules k PUSCHs in different uplink subframes. If the UE 102 detects the (E)PDCCH in the downlink subframe n, the UE 102 may start to prepare the corresponding PUSCH transmissions based on the information provided by the DCI format.

The UE 102 may perform Cat-4 LBT in the last one or two SC-FDMA symbol(s) of uplink subframe n−1 in order to get the channel for a PUSCH transmission in uplink subframe n. If the UE gets the channel, the UE 102 may start to transmit a reservation signal 1725 (e.g., CP) immediately and keep transmitting it until the starting subframe boundary 1701 of the uplink subframe n. In the uplink subframe n, either the subframe structure type-2 or type-2b may be used depending on whether or not the subframe is a SRS subframe.

The UE 102 may stop the transmission at the beginning boundary 1701 of the gap in the uplink subframe n and then, the UE 102 may perform Cat-2 LBT within 34 micro-second duration. If the UE 102 gets the channel, the UE 102 may transmit a reservation signal 1725 until the starting subframe boundary 1701 of the uplink subframe n+1, followed by the second PUSCH in the subframe n+1.

As long as the UE gets the channel successfully, the UE 102 may repeat this procedure until the end of the uplink subframe n+k−1. If the UE 102 fails to get the channel in the gap of a given subframe, the UE 102 may drop the PUSCH transmission in the next subframe. After the dropping, the UE 102 may perform Cat-4 LBT in the gap of the next subframe of the given subframe, as long as the next subframe is a part of the k consecutive uplink subframes.

For every uplink subframe, either the subframe structure type-2 or type-2b may be used depending on whether or not the subframe is a SRS 1703 subframe. In this approach, the UE 102 may have to perform LBT for every uplink subframe. This may enable flexible UE multiplexing due to simultaneous channel acquisition by multiple UEs 102.

As an alternative way, the type 2-a UL subframe structure could be used instead of the type 2-b UL subframe structure. Note that, the UE 102 may perform Cat-2 LBT at the end part of the gap, instead of the beginning part of the gap. In this case, the UE 102 can transmit a reservation signal 1725 following the previous PUSCH transmission until the Cat-2 LBT starts.

In another implementation, the UE 102 may perform the first channel access procedure at least before a transmission of an earliest PUSCH among the multiple PUSCHs and may perform the second channel access procedure between transmissions of two consecutive PUSCHs among the multiple PUSCHs. The UE 102 may transmit the earliest PUSCH in a case that the first channel access procedure before the transmission of the earliest PUSCH is successful, and to transmit the second PUSCH of the two consecutive PUSCHs in a case that the second channel access procedure between the transmissions of the two consecutive PUSCHs is successful. Moreover, the UE 102 may transmit the second or later PUSCH in a case that the first channel access procedure just before the transmission of the PUSCH is successful.

Figure 18:
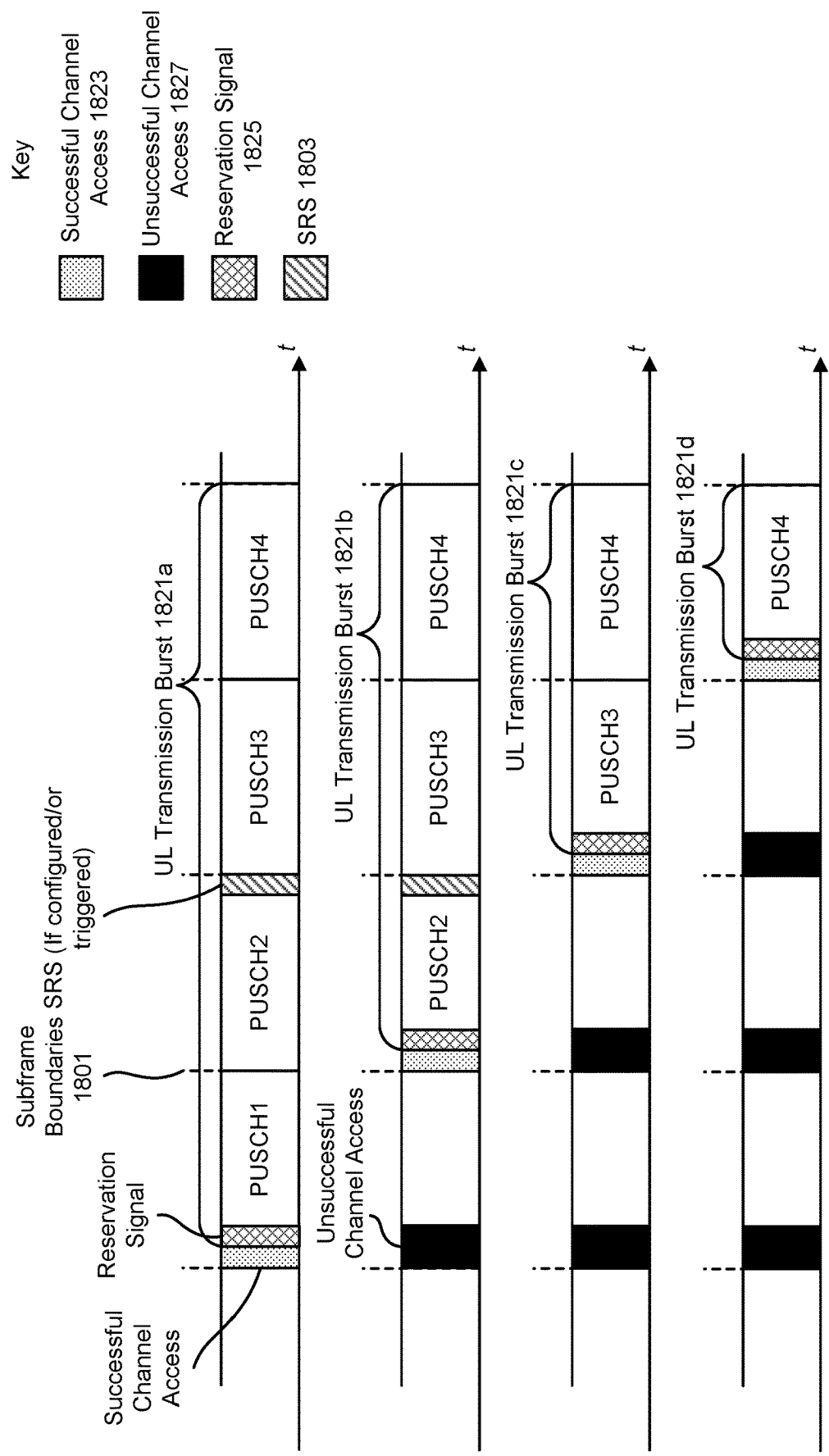
FIG. 18 illustrates a fourth approach (Approach 4) of an LBT scheme, UL subframe structure, and PUSCH scheduling scheme combination.

FIG. 18 illustrates a fourth approach (Approach 4) of an LBT scheme, UL subframe structure, and PUSCH scheduling scheme combination. In particular, Approach 4 includes Cat-4 LBT, type-0/0a/1/1a UL subframe structure, and Option 1 multi-subframe scheduling. The timing for successful channel access 1823, unsuccessful channel access 1827, reservation signal(s) 1825 and SRS 1803 is shown for multiple UL transmission bursts 1821a-d. The subframe boundaries 1801 are also shown.

In this approach, the eNB 160 may transmit (E)PDCCH carrying a UL grant in downlink subframe n−4, where the UL grant schedules k PUSCHs in different uplink subframes. If the UE 102 detects the (E)PDCCH in the downlink subframe n, the UE 102 may start to prepare the corresponding PUSCH transmissions based on the information provided by the DCI format.

The UE 102 may perform Cat-4 LBT in the first one or two SC-FDMA symbol(s) of uplink subframe n in order to get the channel for a PUSCH transmission in uplink subframe n. If the UE 102 gets the channel, the UE 102 may start to transmit a reservation signal 1825 (e.g., CP) immediately and keep transmitting it until the end of the gap in the uplink subframe n. Then, the UE 102 may transmit the scheduled PUSCHs from the uplink subframe n to subframe n+k−1.

For the first uplink subframes, the type-1/1a subframe structure may be used depending on whether the subframe is a SRS subframe. On the other hand, the remaining uplink subframes may have the type-0/0a UL subframe structure. Therefore, like approach 1, the UE 102 may be able to transmit PUSCHs in consecutive uplink subframes without any gap duration.

If the UE 102 fails to get the channel in the first one or two SC-FDMA symbol(s) of the uplink subframe n, the UE 102 may drop the transmission of the PUSCH (i.e., the first PUSCH among the k PUSCHs) for the uplink subframe n and may perform Cat-4 LBT in the first one or two SC-FDMA symbol(s) of the uplink subframe n+1 in order to get the channel for the PUSCH transmission in the uplink subframe n+1.

If the UE 102 gets the channel, the UE 102 may transmit a reservation signal 1825, followed by the scheduled PUSCHs (i.e., from the second PUSCH to the last PUSCH among the k PUSCHs) for the uplink subframe n+1 to the uplink subframe n+k−1.

Similar to the previous case, the first uplink subframe after getting the channel may have the type-2/2a UL subframe structure, while the remaining uplink subframes may have the type-0/0a UL subframe structure.

Figure 19:
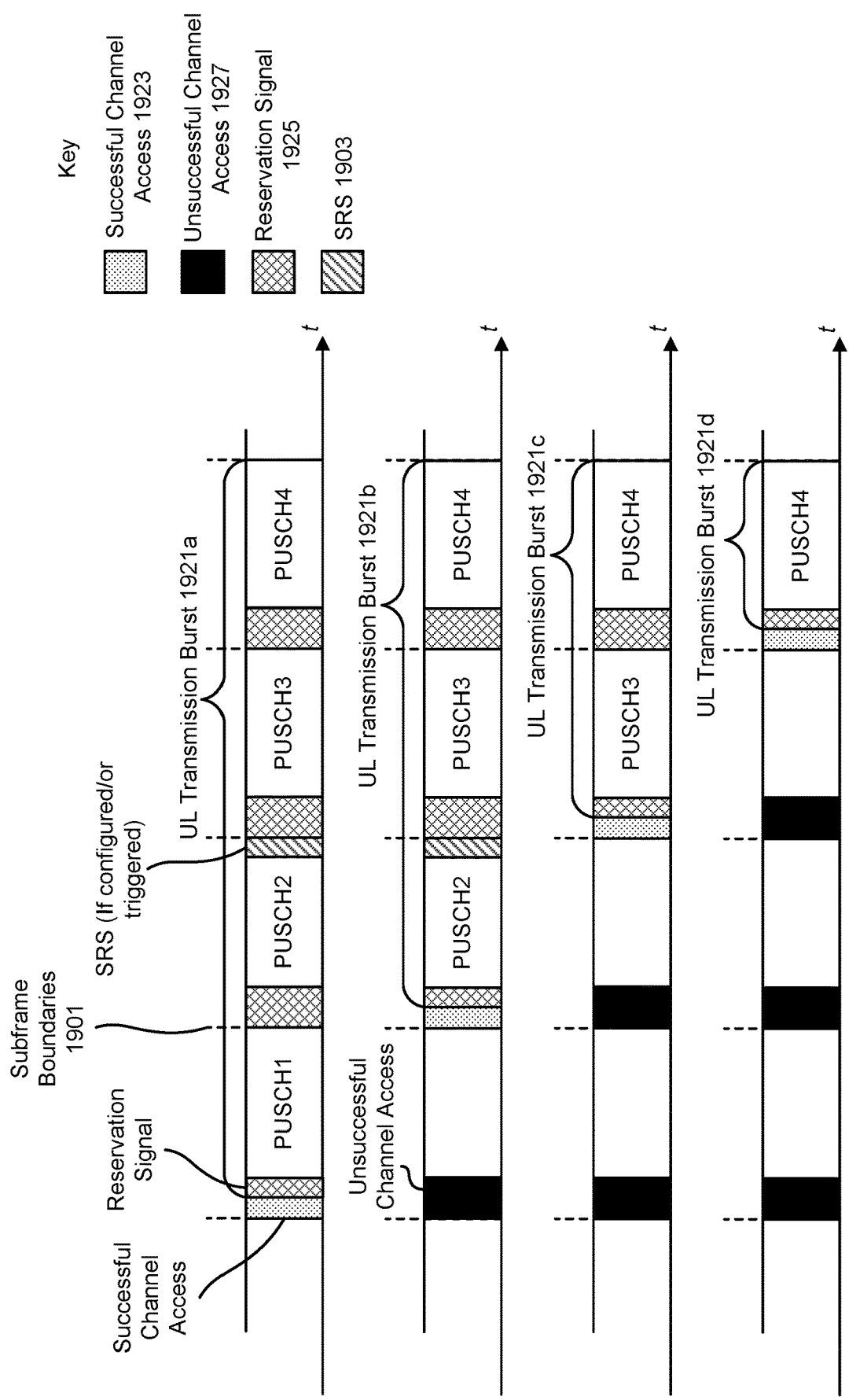
FIG. 19 illustrates the fourth approach (Approach 2) with reservation signal transmission in every uplink subframe.

FIG. 19 illustrates the fourth approach (Approach 2) with reservation signal transmission in every uplink subframe. In particular, FIG. 19 shows a Cat-4 LBT, type-0/0a/1/1a UL subframe structure, and Option 1 multi-subframe scheduling as described in connection with FIG. 18. The timing for successful channel access 1923, unsuccessful channel access 1927, a reservation signal(s) 1925 and SRS 1903 is shown for multiple UL transmission bursts 1921a-d. The subframe boundaries 1901 are also shown.

As is in approach 2, the eNB 160 may have to perform blind detections of the subframe structure. To reduce processing load for the PUSCH detection, type-1/1a UL subframe structure could also be used for all uplink subframes. In this case, it is preferable that the UE 102 transmits reservation signals 1925 to fill out the gaps that are located at the beginning SC-FDMA symbol(s) in each of the remaining uplink subframes.

Figure 20:
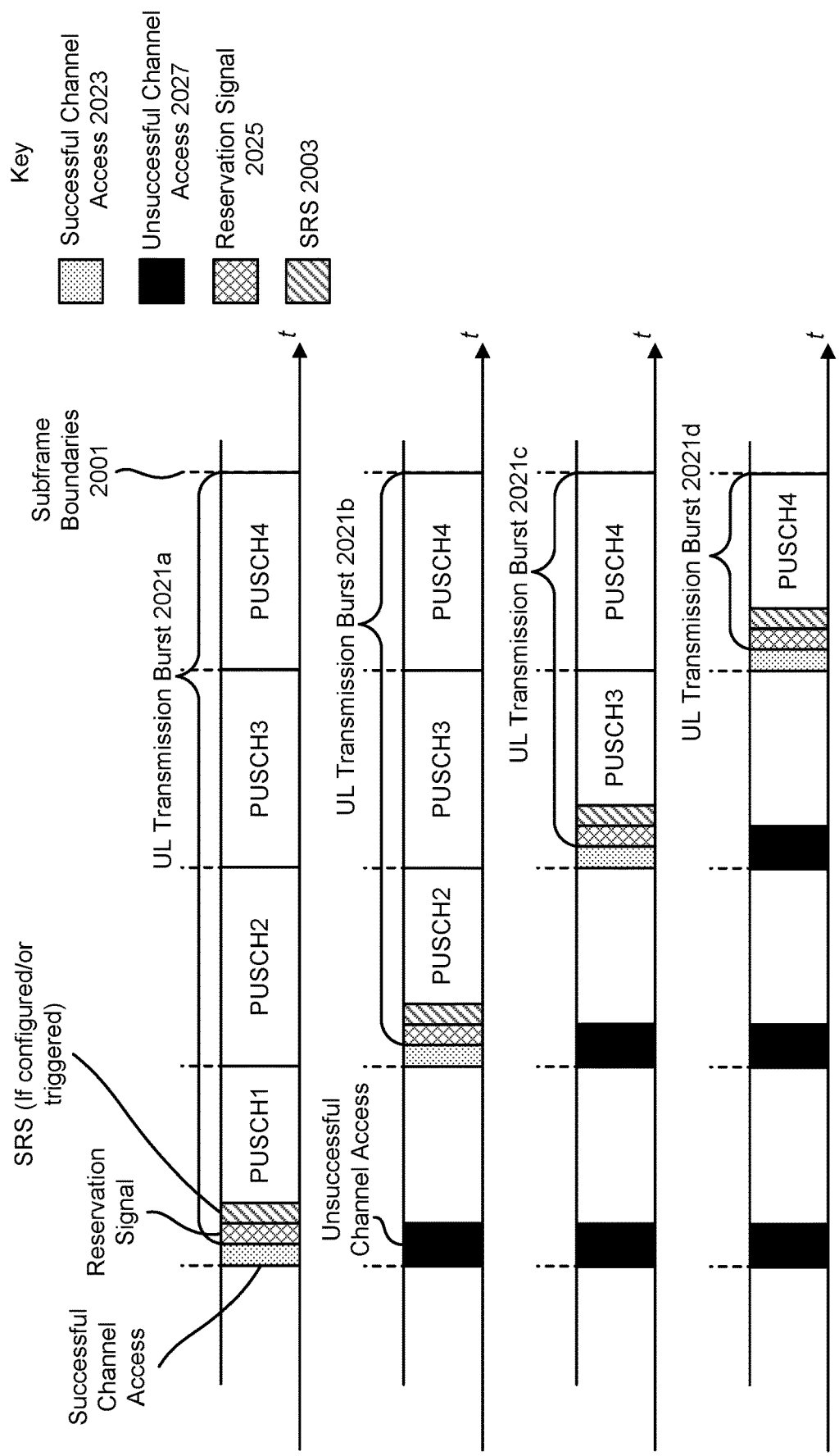
FIG. 20 illustrates a fifth approach (Approach 5) of an LBT scheme, UL subframe structure, and PUSCH scheduling scheme combination.

FIG. 20 illustrates a fifth approach (Approach 5) of an LBT scheme, UL subframe structure, and PUSCH scheduling scheme combination. In particular, Approach 5 includes Cat-4 LBT, type-0/0b/1/1b UL subframe structure, and Option 1 multi-subframe scheduling. The timing for successful channel access 2023, unsuccessful channel access 2027, reservation signal(s) 2025 and SRS 2003 is shown for multiple UL transmission bursts 2021a-d. The subframe boundaries 2001 are also shown.

In this approach, most of the procedures are the same as in the first approach described in connection with FIG. 14. A difference may be SRS 2003 transmissions as the difference between approach 1 and 5.

Upon the indication by SRS request field in the (E)PDCCH, the UE 102 may transmit SRS 2003 just after the end of the gap in the first subframe after a successful channel access. In this instance, the eNB 160 may perform blind detections of subframe structure and/or SRS 2003 presence in each of the k uplink subframes until it finds the uplink subframe containing the SRS 2003, since the eNB 160 does not know when the UE 102 got the channel and started to transmit the UL signal.

To avoid this problem, type-1b UL subframe structure may be used for the remaining uplink subframes. In this case, it is preferable that the UE 102 transmits reservation signals 2025 to fill out the gaps that are located at the last SC-FDMA symbol(s) in each of the remaining uplink subframes. Otherwise, another node may take over the channel.

Figure 21:
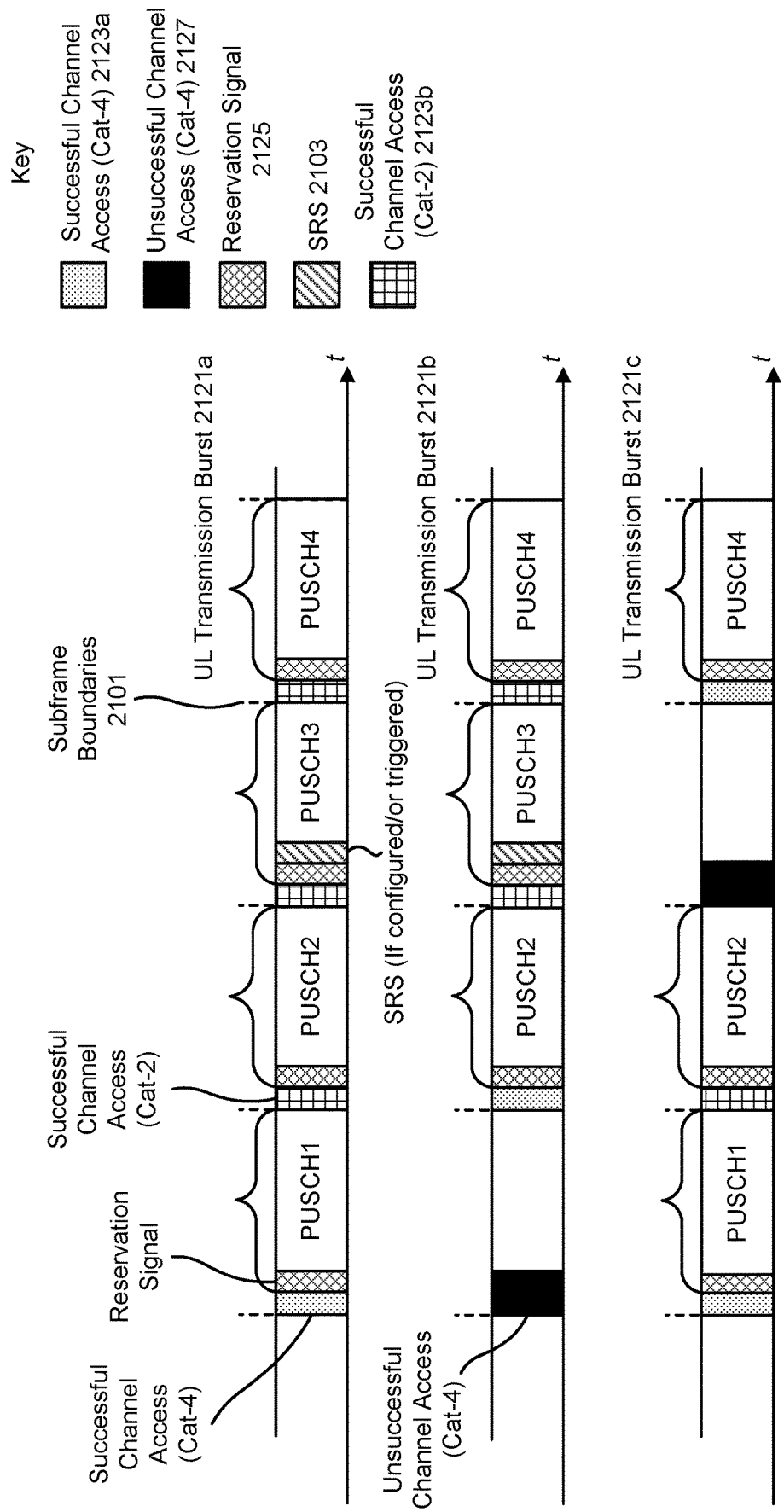
FIG. 21 illustrates a sixth approach (Approach 6) of an LBT scheme, UL subframe structure, and PUSCH scheduling scheme combination.

FIG. 21 illustrates a sixth approach (Approach 6) of an LBT scheme, UL subframe structure, and PUSCH scheduling scheme combination. In particular, Approach 6 includes Cat-4 LBT and Cat-2 LBT, type-1/1a UL subframe structure, and Option 1 multi-subframe scheduling. The timing for successful channel access (Cat-4) 2123a, successful channel access (Cat-2) 2123b, unsuccessful channel access (Cat-4) 2127, reservation signal(s) 2125 and SRS 2103 is shown for multiple UL transmission bursts 2121a-c. The subframe boundaries 2101 are also shown.

In this approach, the eNB 160 may transmit (E)PDCCH carrying a UL grant in downlink subframe n−4, where the UL grant schedules k PUSCHs in different uplink subframes. If the UE 102 detects the (E)PDCCH in the downlink subframe n, the UE 102 may start to prepare the corresponding PUSCH transmissions based on the information provided by the DCI format.

The UE 102 may perform Cat-4 LBT in the first one or two SC-FDMA symbol(s) of uplink subframe n in order to get the channel for a PUSCH transmission in uplink subframe n. If the UE 102 gets the channel, the UE 102 may start to transmit a reservation signal 2125 (e.g., CP) immediately and keep transmitting it until the starting boundary 2101 of the PUSCH symbols in the uplink subframe n. In the uplink subframe n, either the subframe structure type-2 or type-2b may be used depending on whether or not the subframe is a SRS 2103 subframe. The UE 102 may stop the transmission at the ending subframe boundary 2101 of the uplink subframe n, and then the UE 102 may perform Cat-2 LBT within 34 micro-second duration at the beginning part of the uplink subframe n+1.

If the UE 102 gets the channel, the UE 102 may transmit a reservation signal 2125 until the starting boundary 2101 of the PUSCH symbols in the uplink subframe n+1, followed by the second PUSCH in the subframe n+1. As long as the UE 102 gets the channel successfully, the UE 102 may repeat this procedure until the end of the uplink subframe n+k−1.

If the UE 102 fails to get the channel in the gap of a given subframe, the UE 102 may drop the PUSCH transmission in the same subframe. After the dropping, the UE 102 may perform Cat-4 LBT in the gap of the next subframe of the given subframe, as long as the next subframe is a part of the k consecutive uplink subframes.

For every uplink subframe, either the subframe structure type-1 or type-1b may be used depending on whether or not the subframe is a SRS 2103 subframe. In this approach, the UE 102 may have to perform LBT for every uplink subframe. This may enable flexible UE 102 multiplexing due to simultaneous channel acquisition by multiple UEs 102.

As an alternative implementation, the type-1a UL subframe structure could be used instead of the type-1b UL subframe structure. Note that, the UE 102 may perform Cat-2 LBT at the end part of the gap, instead of the beginning part of the gap. In this case, the UE 102 can transmit a reservation signal 2125 following the previous PUSCH transmission until the Cat-2 LBT starts.

Figure 22:
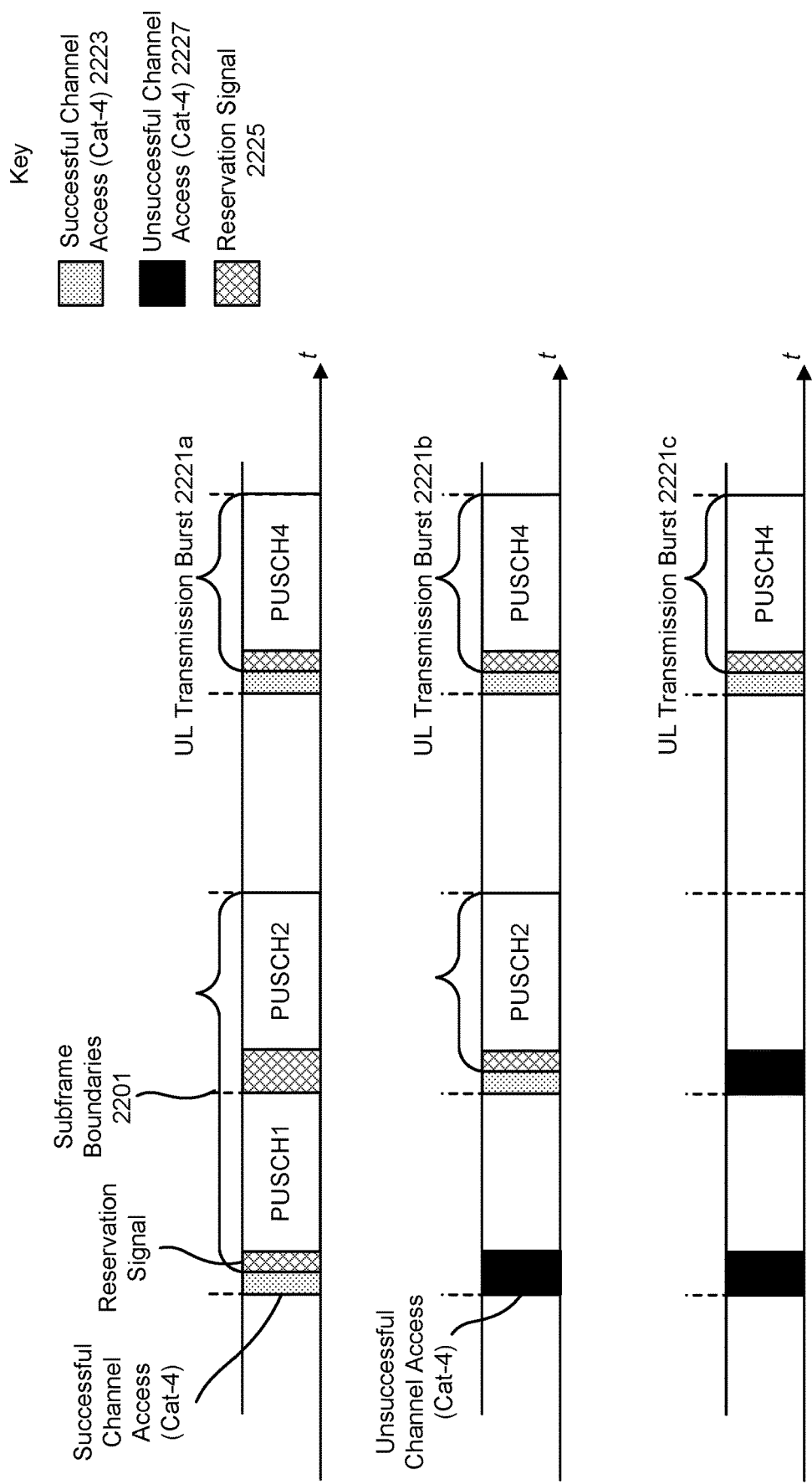
FIG. 22 illustrates a seventh approach (Approach 7) of an LBT scheme, UL subframe structure, and PUSCH scheduling scheme combination.

FIG. 22 illustrates a seventh approach (Approach 7) of an LBT scheme, UL subframe structure, and PUSCH scheduling scheme combination. In particular, Approach 7 includes Cat-4 LBT, type-1/1a UL subframe structure, and Option 2 multiple UL grants based multi-subframe scheduling. The timing of successful channel access 2223, unsuccessful channel access 2227 and reservation signal(s) 2225 is shown for multiple UL transmission bursts 2221a-c. The subframe boundaries 2201 are also shown.

In this approach, the eNB 160 may transmit m (E)PDCCHs in downlink subframe n−4, each of (E)PDCCHs carrying a UL grant, where the UL grant schedules one of k PUSCHs in different uplink subframes. If the UE 102 detects the (E)PDCCHs in the downlink subframe n, the UE 102 may start to prepare the corresponding PUSCH transmissions based on the information provided by the (E)PDCCHs. If the UE 102 detects the UL grant scheduling a PUSCH in the uplink subframe n, the UE 102 may perform Cat-4 LBT in the first one or two SC-FDMA symbol(s) of the uplink subframe n.

If the UE 102 gets the channel, the UE 102 may start to transmit a reservation signal 2225 (e.g., CP) immediately and keep transmitting it until the starting boundary 2201 of the PUSCH symbols in the uplink subframe n. In the uplink subframe n, the UE 102 may transmit the scheduled PUSCH using either the subframe structure type-1 or type-1a (or type-1b) depending on whether or not the subframe is a SRS subframe.

If the UE 102 also detects the UL grant scheduling a PUSCH in the uplink subframe n+1, the UE 102 can contiguously transmit a reservation signal 2225 followed by the scheduled PUSCH in the uplink subframe n+1. Similarly, as long as multiple PUSCHs in the consecutive subframes are scheduled, the UE 102 may keep transmitting UL signals.

If the UE 102 fails to get the channel or PUSCH is not scheduled in the next uplink subframe, the UE 102 may perform Cat-4 LBT in the first one or two SC-FDMA symbol(s) of the uplink subframe which potentially carries the next earliest PUSCH scheduled by any one of the m (E)PDCCHs.

Figure 23:
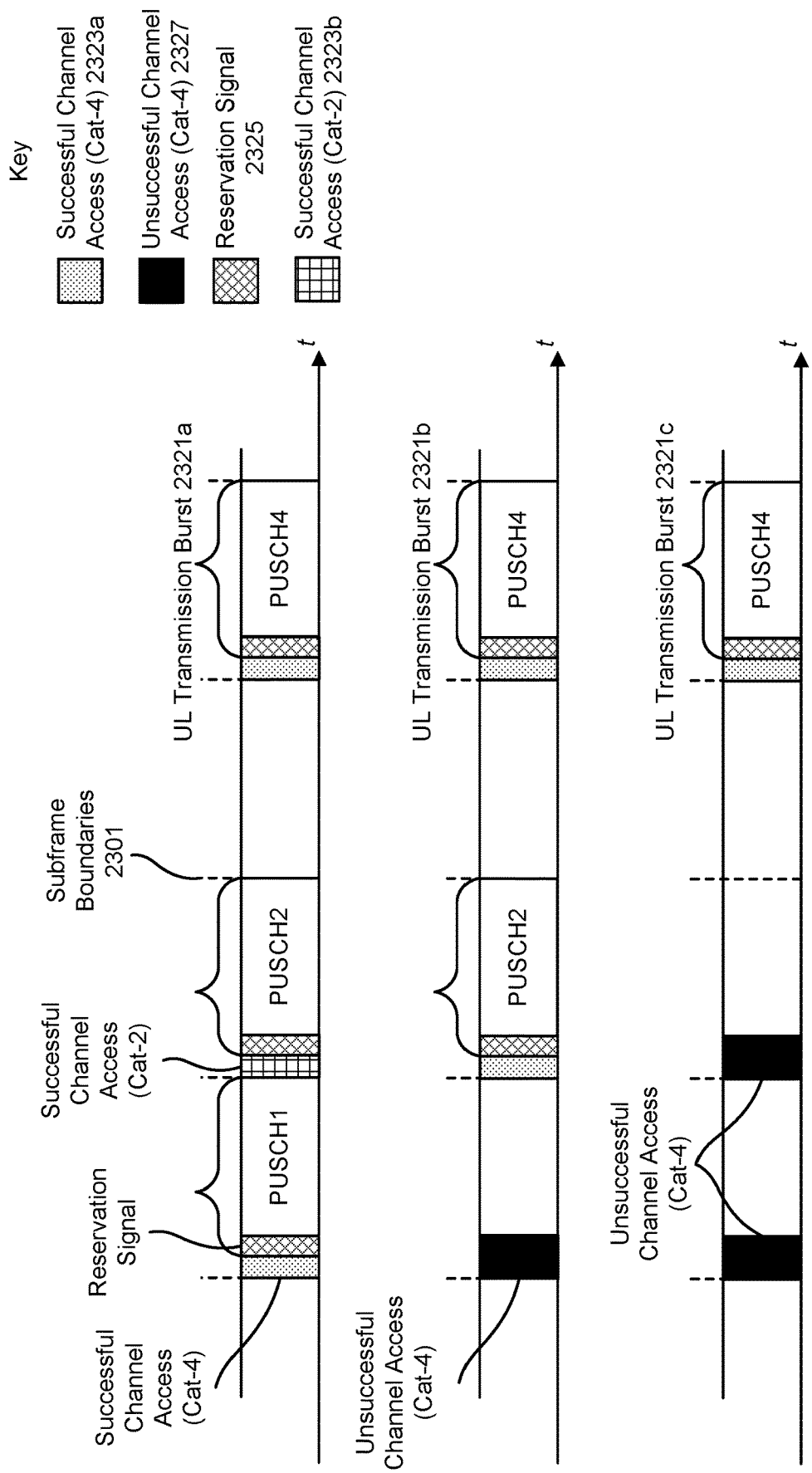
FIG. 23 illustrates an eight approach (Approach 8) of an LBT scheme, UL subframe structure, and PUSCH scheduling scheme combination.

FIG. 23 illustrates an eight approach (Approach 8) of an LBT scheme, UL subframe structure, and PUSCH scheduling scheme combination. In particular, Approach 8 includes Cat-4 LBT and Cat-2 LBT, type-1/1b UL subframe structure, and Option 2 multiple UL grants based multi-subframe scheduling. The timing of successful channel access 2323, unsuccessful channel access 2327 and reservation signal(s) 2325 is shown for multiple UL transmission bursts 2321a-c. The subframe boundaries 2301 are also shown.

In this approach, the eNB 160 may transmit m (E)PDCCHs in downlink subframe n−4, each of (E)PDCCHs carrying a UL grant, where the UL grant schedules one of k PUSCHs in different uplink subframes. If the UE 102 detects the (E)PDCCHs in the downlink subframe n, the UE 102 may start to prepare the corresponding PUSCH transmissions based on the information provided by the (E)PDCCHs.

If the UE 102 detects the UL grant scheduling a PUSCH in the uplink subframe n, the UE 102 may perform Cat-4 LBT in the first one or two SC-FDMA symbol(s) of the uplink subframe n. If the UE 102 gets the channel, the UE 102 may start to transmit a reservation signal 2325 (e.g., CP) immediately and keep transmitting it until the starting boundary 2301 of the PUSCH symbols in the uplink subframe n.

In the uplink subframe n, the UE 102 may transmit the scheduled PUSCH using either the subframe structure type-1 or type-1b depending on whether or not the subframe is a SRS subframe. If the UE 102 also detects the UL grant scheduling a PUSCH in the uplink subframe n+1, the UE 102 may perform Cat-2 LBT in the first one or two SC-FDMA symbol(s) of the uplink subframe n+1.

If the UE 102 gets the channel, the UE 102 may start to transmit a reservation signal 2325 immediately and keep transmitting it until the starting boundary 2301 of the PUSCH symbols in the uplink subframe n+1 and then transmit the scheduled PUSCH. Similarly, as long as multiple PUSCHs in the consecutive subframes are scheduled, the UE 102 may perform Cat-2 LBT for the channel access.

If the UE 102 fails to get the channel or PUSCH is not scheduled in the next uplink subframe, the UE 102 may perform Cat-4 LBT in the first one or two SC-FDMA symbol(s) of the uplink subframe which potentially carries the next earliest PUSCH scheduled by any one of the m (E)PDCCHs.

Figure 24:
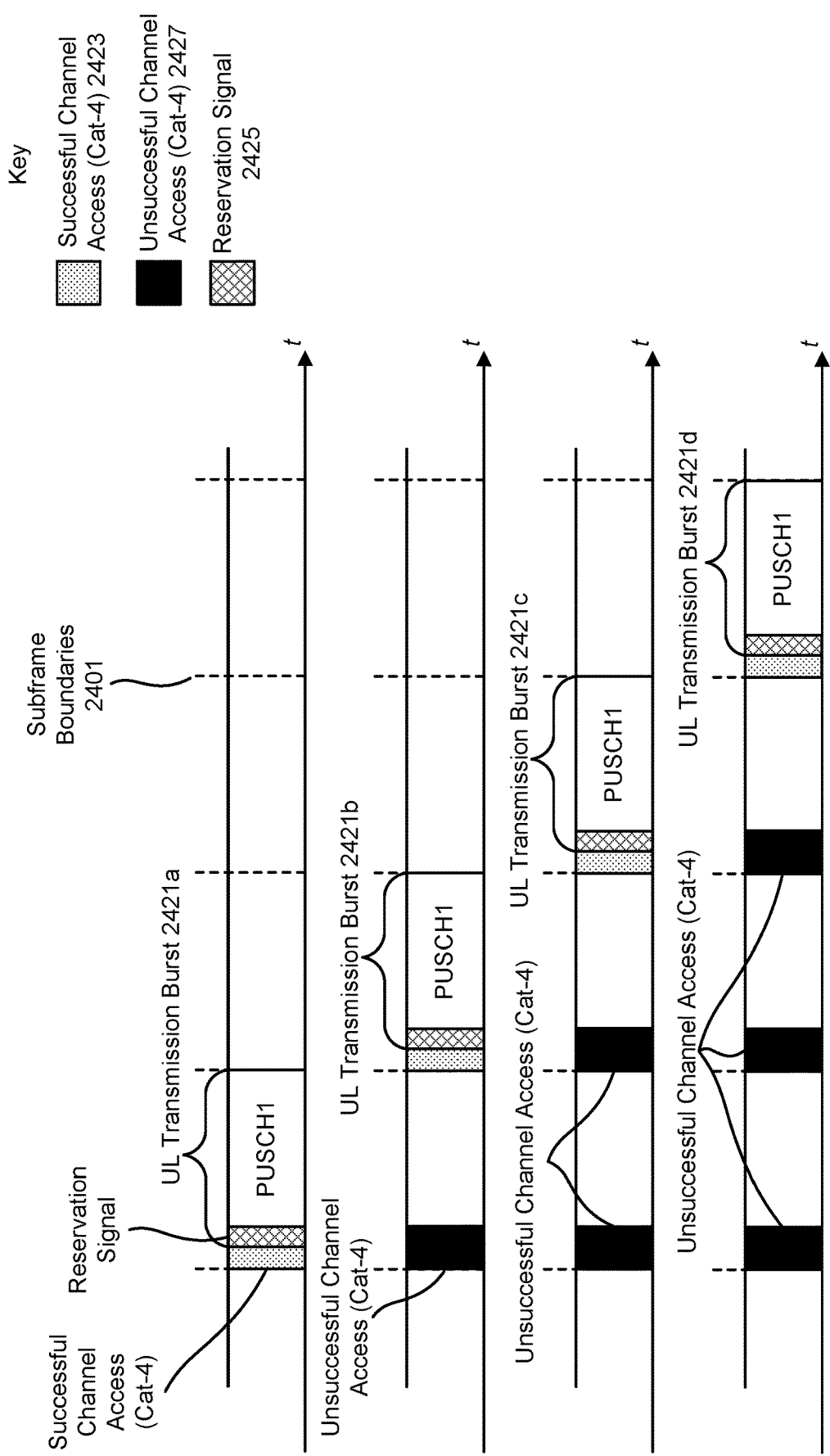
FIG. 24 illustrates a ninth approach (Approach 9) of an LBT scheme, UL subframe structure, and PUSCH scheduling scheme combination.

FIG. 24 illustrates a ninth approach (Approach 9) of an LBT scheme, UL subframe structure, and PUSCH scheduling scheme combination. In particular, Approach 9 includes Cat-4 LBT, type-1/1b UL subframe structure, and Option 3 scheduling. The timing of successful channel access (Cat-4) 2423a, successful channel access (Cat-2) 2423b, unsuccessful channel access (Cat-4) 2427 and reservation signal(s) 2425 is shown for multiple UL transmission bursts 2421a-d. The subframe boundaries 2401 are also shown.

In this approach, the eNB 160 may transmit (E)PDCCH in downlink subframe n−4, the (E)PDCCHs carrying a UL grant, which schedules a single PUSCH (PUSCH1). If the UE 102 detects the (E)PDCCH in the downlink subframe n−4, the UE 102 may start to prepare the corresponding PUSCH transmissions based on the information provided by the (E)PDCCHs. The UE 102 detecting the (E)PDCCH may be allowed to attempt channel accesses for k consecutive uplink subframes (uplink subframe n to uplink subframe n+k−1) for the single corresponding PUSCH.

If the UE 102 detects the UL grant scheduling a PUSCH in the uplink subframe n, the UE 102 may perform Cat-4 LBT in the first one or two SC-FDMA symbol(s) of the uplink subframe n. If the UE 102 gets the channel, the UE 102 may start to transmit a reservation signal 2425 (e.g., CP) immediately and keep transmitting it until the starting boundary 2401 of the PUSCH symbols in the uplink subframe n. Then, PUSCH may be transmitted in the uplink subframe n. Type-1/1b may be used depending on whether or not an SRS transmission in the uplink subframe is configured.

If the UE 102 fails to get the channel for the PUSCH transmission in this subframe, the UE 102 may perform Cat-4 LBT for the subframe n+1. Unless the scheduled PUSCH is transmitted or the k consecutive uplink subframe is exceeded, the UE 102 may attempt the channel access in the next subframe.

After receiving the (E)PDCCH in the downlink subframe n−4, the UE 102 may receive another (E)PDCCH carrying a UL grant in downlink subframe n−3. Based on the latter (E)PDCCH detection, the UE 102 may be allowed to attempt channel accesses for k consecutive uplink subframes (uplink subframe n+1 to uplink subframe n+k) for the corresponding PUSCH. In this case, if the UE 102 gets the channel for PUSCH1 transmission in the uplink subframe n, the UE 102 may be allowed to contiguously transmit the scheduled PUSCH (PUSCH2) without performing additional channel access procedures.

If type-1/1a/1b UL subframe structure is used, the reservation signal 2425 may be transmitted to fill out the gap at the beginning of that subframe. Alternatively, even when the PUSCH1 is transmitted in the uplink subframe n, the UE 102 may have to perform either Cat-4 or Cat-2 LBT for the PUSCH2 transmission in the uplink subframe n+1.

If the UE 102 failed to get the channel for the PUSCH1 transmission in the uplink subframe n, and if the channel access for the PUSCH1 transmission in the uplink subframe n+1 was successful, the uplink subframe for the PUSCH2 transmission collides with the PUSCH1 transmission. There are several solutions for this problem.

In a first solution (Solution 1), the PUSCH1 (i.e., the PUSCH corresponding to the earliest (E)PDCCH) may be transmitted in the uplink subframe and the PUSCH2 (i.e., the remaining PUSCHs) transmission may be postponed to the next or later uplink subframe.

In a second solution (Solution 2), if the PRBs assigned for the PUSCH1 overlap the PRBs assigned for the PUSCH2, the PUSCH1 (i.e., the PUSCH corresponding to the earliest (E)PDCCH) may be transmitted in the uplink subframe and the PUSCH2 (i.e., the remaining PUSCHs) transmission may be postponed to the next or later uplink subframe. Otherwise (i.e., in the case when the PRBs assigned for the PUSCH1 do not overlap the PRBs assigned for the PUSCH2), both of the PUSCH1 and the PUSCH2 may be transmitted in the subframe. In this case, PUSCH transmission power of the serving cell, $P_{PUSCH,c}$, may be equally shared between the multiplexed PUSCHs. Alternatively, $P_{PUSCH,c}$ may apply to each of the multiplexed PUSCHs.

Figure 25:
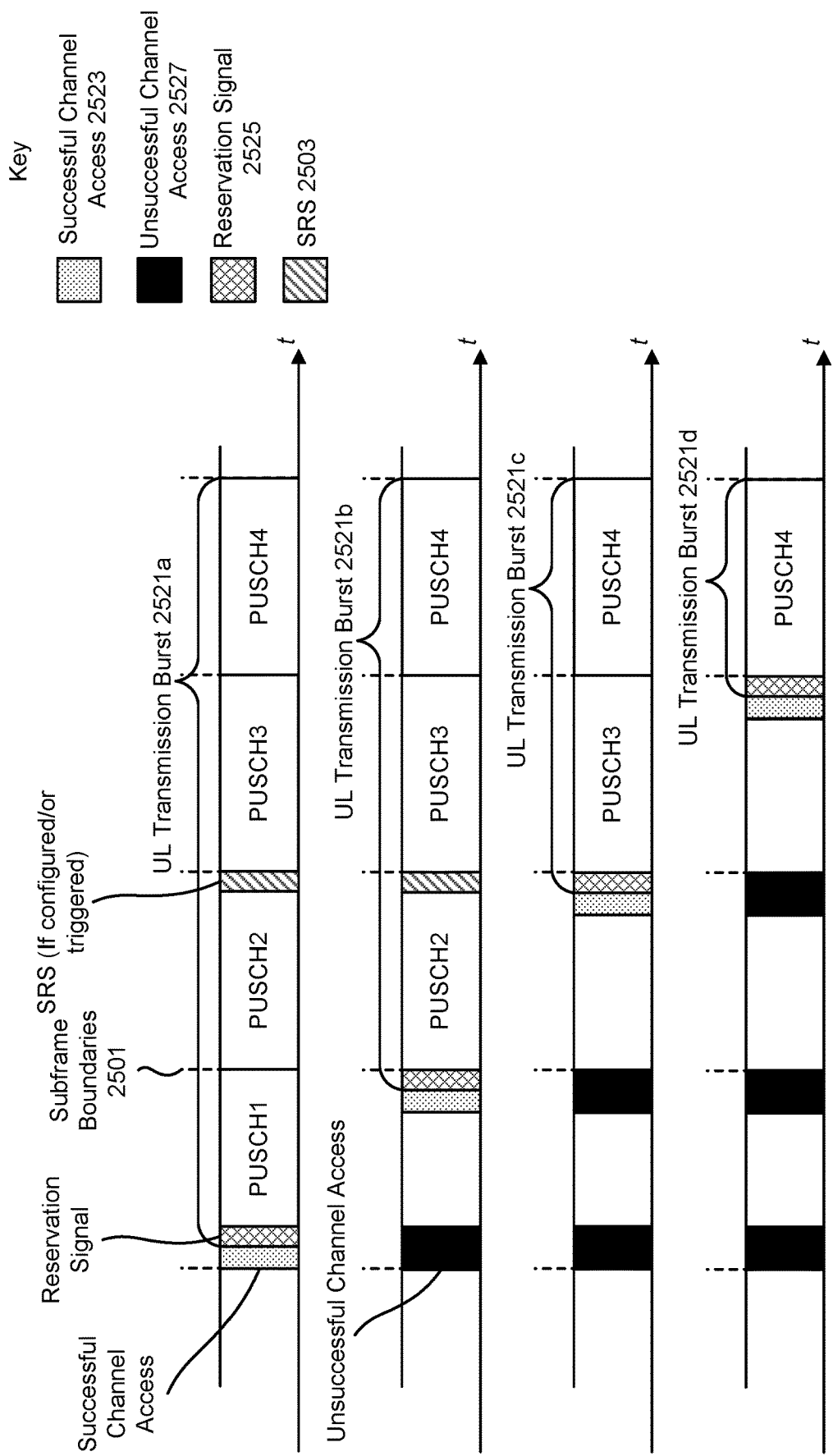
FIG. 25 illustrates a tenth approach (Approach 10) of an LBT scheme, UL subframe structure, and PUSCH scheduling scheme combination.

FIG. 25 illustrates a tenth approach (Approach 10) of an LBT scheme, UL subframe structure, and PUSCH scheduling scheme combination. In particular, Approach 10 includes Cat-4 LBT, type-0/0a/1/1a UL subframe structure, and Option 1 multi-subframe scheduling. The timing of successful channel access 2523, unsuccessful channel access 2527, reservation signal(s) 2525 and SRS 2503 is shown for multiple UL transmission bursts 2521a-d. The subframe boundaries 2501 are also shown.

In this approach, the eNB 160 may transmit (E)PDCCH carrying a UL grant in downlink subframe n−4, where the UL grant schedules k PUSCHs in different uplink subframes. If the UE 102 detects the (E)PDCCH in the downlink subframe n, the UE 102 may start to prepare the corresponding PUSCH transmissions based on the information provided by the DCI format.

The UE 102 may perform Cat-4 LBT in the first one or two SC-FDMA symbol(s) of uplink subframe n in order to get the channel for a PUSCH transmission in uplink subframe n. If the UE 102 gets the channel, the UE 102 may start to transmit a reservation signal 2525 (e.g., CP) immediately and keep transmitting it until the end of the gap in the uplink subframe n. Then, the UE 102 may transmit the scheduled PUSCHs from the uplink subframe n to subframe n+k−1.

For the first uplink subframes, the type-1/1a subframe structure may be used depending on whether the subframe is a SRS 2503 subframe. On the other hand, the remaining uplink subframes may have the type-0/0a UL subframe structure. Therefore, like approach 1, the UE 102 may be able to transmit PUSCHs in consecutive uplink subframes without any gap duration.

If the UE 102 fails to get the channel in the first one or two SC-FDMA symbol(s) of the uplink subframe n, the UE 102 may drop the transmission of the PUSCH (i.e., the first PUSCH among the k PUSCHs) for the uplink subframe n and may perform Cat-4 LBT in the last one or two SC-FDMA symbol(s) of the uplink subframe n in order to get the channel for the PUSCH transmission in the uplink subframe n+1.

If the UE 102 gets the channel, the UE 102 may transmit a reservation signal 2525, followed by the scheduled PUSCHs (i.e., from the second PUSCH to the last PUSCH among the k PUSCHs) for the uplink subframe n+1 to the uplink subframe n+k−1. Similar to the case of the second PUSCH, the later uplink subframes may have the type-0/0a UL subframe structure regardless of when the UE 102 grabs the channel, and if needed, the LBT for subframe i may be performed in the last one or two SC-FDMA symbol(s) of subframe i−1.

As is in approach 2, the eNB 160 may have to perform blind detections of the subframe structure. With this approach, the eNB 160 does not have to perform detection of PUSCH structures, since the structures do not depend on LBT timing. The structures are deterministic, since only the position (e.g., index) within the consecutive subframes affects to the structures. Alternatively, the eNB 160 may indicate the subframe structure of each uplink subframe to the UE 102 by using the scheduling (E)PDCCH.

Figure 26:
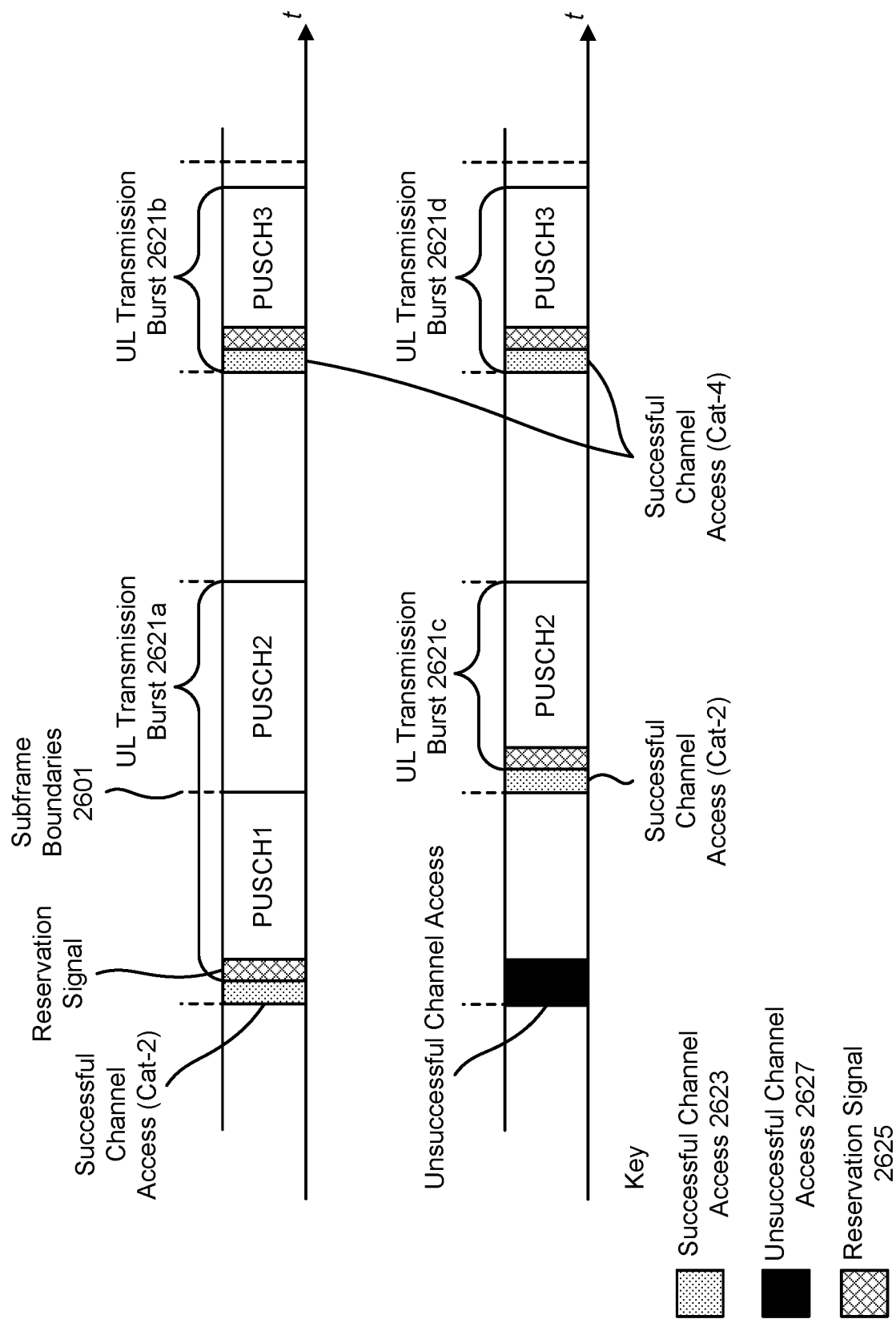
FIG. 26 illustrates an eleventh approach (Approach 11) of an LBT scheme, UL subframe structure, and PUSCH scheduling scheme combination.

FIG. 26 illustrates an eleventh approach (Approach 11) of an LBT scheme, UL subframe structure, and PUSCH scheduling scheme combination. In particular, Approach 11 is a combination of a Cat-4 LBT/Cat-2 LBT, type-0/0a/1/1a/2/3 UL subframe structure, and Option 1 multi-subframe scheduling with consecutive/non-consecutive scheduled subframes. The eNB 160 may send an UL grant to schedule N PUSCH subframes out of $N_{max}$ subframes. The timing of successful channel access 2623, unsuccessful channel access 2627 and reservation signal(s) 2625 is shown for multiple UL transmission bursts 2621a-d. The subframe boundaries 2601 are also shown.

In the example shown in FIG. 26, the UL grant schedules PUSCH1, PUSCH2 and PUSCH3. The UL grant also indicates a subframe configuration and channel access scheme for each scheduled PUSCH subframe. In this example, the UL grant indicates that the first SC-FDMA symbols are blanked in PUSCH1 and PUSCH3, and that the last SC-FDMA symbol is blanked in PUSCH3. Moreover, the UL grant indicates 25 μs CCA and Cat 4 LBT for PUSCH 1 and PUSCH3, respectively. The UL grant may also indicate that channel access might not be needed for PUSCH2, since PUSCH2 is transmitted continuously after PUSCH1 transmission.

Upon the detection of the UL grant, the UE 102 may perform 25 μs CCA in the first SC-FDMA symbol in the subframe which potentially contains PUSCH1. The UE 102 may also perform Cat-4 CCA in the first SC-FDMA symbol in the subframe which potentially contains PUSCH3.

If the UE 102 gets a successful channel access for PUSCH1, the UE 102 may transmit PUSCH1 using SC-FDMA symbols #1-#13 followed by PUSCH2 using SC-FDMA symbols #0-#13. If the UE 102 gets a successful channel access for PUSCH3, the UE 102 may transmit PUSCH3 using SC-FDMA symbols #1-#12.

If the UE 102 fails to get a channel access for PUSCH 1, the UE 102 may perform 25 μs CCA in the first SC-FDMA symbol in the subframe that potentially contains PUSCH2. In other words, if consecutive subframes are scheduled without a blanked SC-FDMA symbol in between and if the UE 102 fails channel access for the first subframe of the consecutive subframes, the UE 102 may be allowed, in the second subframe, to perform a channel access using the channel access scheme that is indicated for the first subframe. Similarly, if the UE 102 fails channel access for subframe k−1, the UE 102 may be allowed, in subframe k, to perform a channel access using the same channel access scheme as for subframe k−1.

The eNB 160 may indicate 25 μs CCA for a given subframe only if all following consecutive subframes without blanked SC-FDMA symbol are within DL MCOT. Even when a given subframe is inside of the DL MCOT, the eNB 160 may have to indicate Cat-4 CCA for the subframe if at least one of the following consecutive subframes exceeds the DL MCOT.

In another approach, the UL grant may indicate possible channel access schemes for all scheduled PUSCH subframe. In this case, if the UE 102 transmits PUSCH subframe k−1 and if there is no blanked symbol between PUSCH subframes k−1 and k, the UE 102 might not be required to perform the indicate channel access. On the other hand, if the UE 102 does not transmit PUSCH subframe k−1 or if there is no blanked symbol between PUSCH subframes k−1 and k, the UE 102 may be required to perform the indicate channel access in the first symbol of subframes k.

As described above, if the UL grant schedules PUSCHs in consecutive subframes k−1 and k and if the UE 102 does not have a successful channel access for subframe k−1, the UE 102 may perform, in the first symbol of subframe k, the channel access attempt for PUSCH in subframe k and may puncture the first symbol of subframe k for the PUSCH transmission even if the UL grant indicates the first symbol of subframe k is not blanked. Similarly, if the UL grant schedules PUSCHs in consecutive subframes k−1 and k, and if the UL grant indicates the last symbol of subframe k−1 is blanked and if the UL grant indicates the first symbol of subframe k is not blanked, the UE 102 may perform, in the first symbol of subframe k, the channel access attempt for PUSCH in subframe k and may puncture the first symbol of subframe k for the PUSCH transmission.

Figure 27:
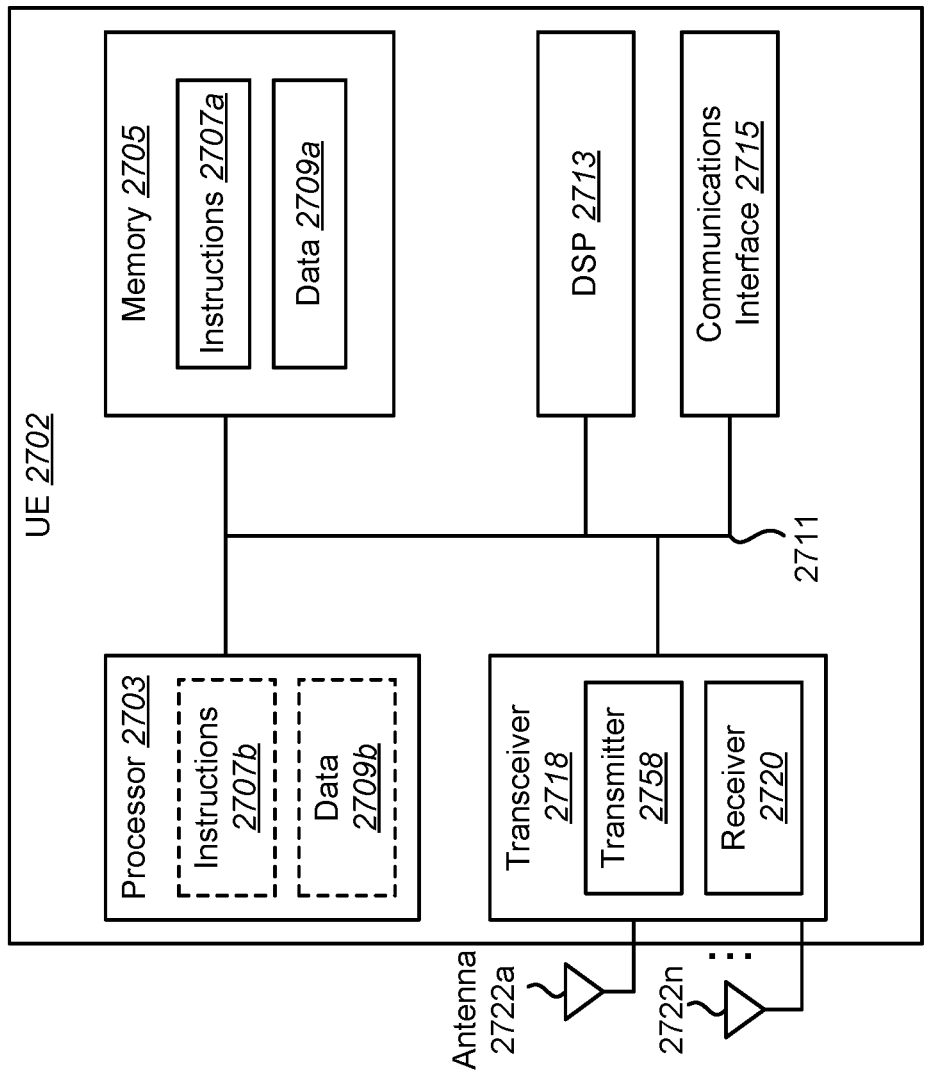
FIG. 27 illustrates various components that may be utilized in a UE.

FIG. 27 illustrates various components that may be utilized in a UE 2702. The UE 2702 described in connection with FIG. 27 may be implemented in accordance with the UE 102 described in connection with FIG. 1. The UE 2702 includes a processor 2703 that controls operation of the UE 2702. The processor 2703 may also be referred to as a central processing unit (CPU). Memory 2705, which may include read-only memory (ROM), random access memory (RAM), a combination of the two or any type of device that may store information, provides instructions 2707*a* and data 2709*a* to the processor 2703. A portion of the memory 2705 may also include non-volatile random access memory (NVRAM). Instructions 2707*b* and data 2709*b* may also reside in the processor 2703. Instructions 2707*b* and/or data 2709*b* loaded into the processor 2703 may also include instructions 2707*a* and/or data 2709*a* from memory 2705 that were loaded for execution or processing by the processor 2703. The instructions 2707*b* may be executed by the processor 2703 to implement the method 300 described above.

The UE 2702 may also include a housing that contains one or more transmitters 2758 and one or more receivers 2720 to allow transmission and reception of data. The transmitter(s) 2758 and receiver(s) 2720 may be combined into one or more transceivers 2718. One or more antennas 2722*a-n* are attached to the housing and electrically coupled to the transceiver 2718.

The various components of the UE 2702 are coupled together by a bus system 2711, which may include a power bus, a control signal bus and a status signal bus, in addition to a data bus. However, for the sake of clarity, the various buses are illustrated in FIG. 27 as the bus system 2711. The UE 2702 may also include a digital signal processor (DSP) 2713 for use in processing signals. The UE 2702 may also include a communications interface 2715 that provides user access to the functions of the UE 2702. The UE 2702 illustrated in FIG. 27 is a functional block diagram rather than a listing of specific components.

Figure 28:
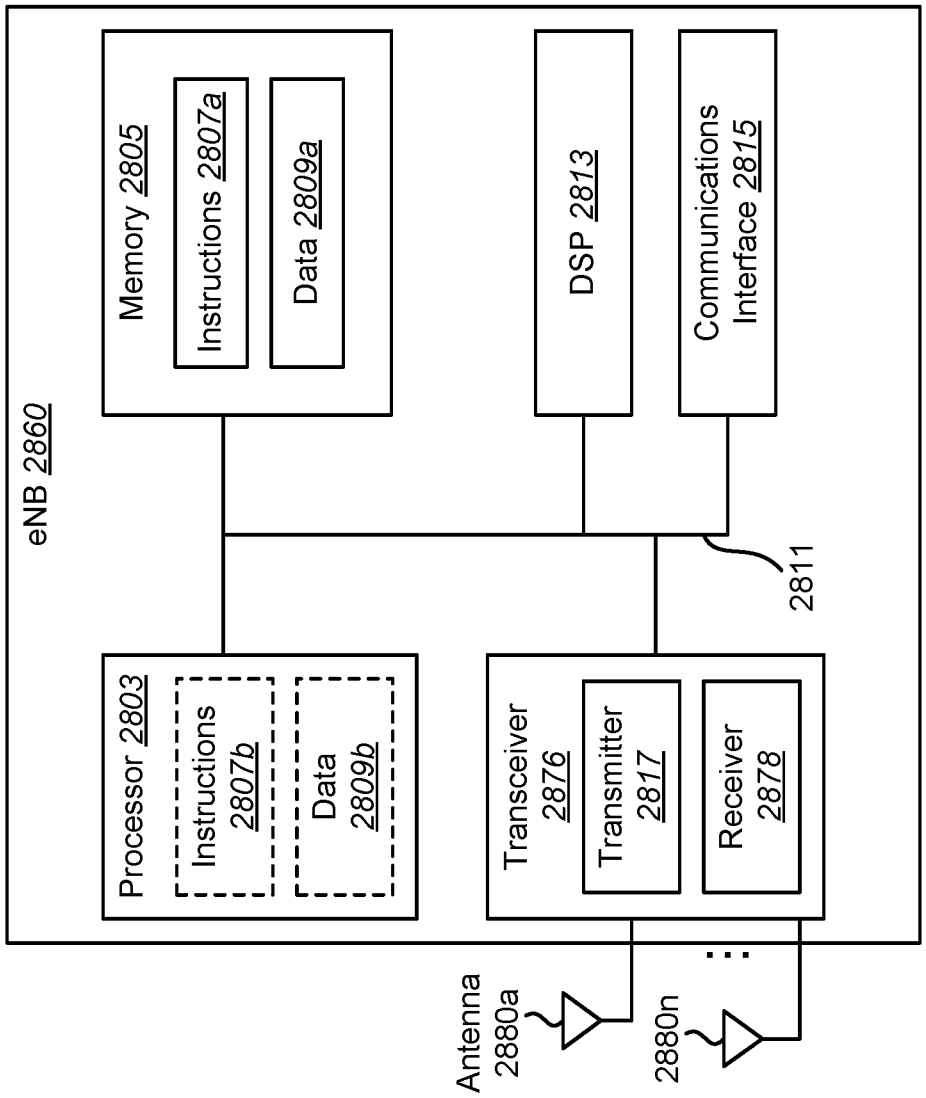
FIG. 28 illustrates various components that may be utilized in an eNB.

FIG. 28 illustrates various components that may be utilized in an eNB 2860. The eNB 2860 described in connection with FIG. 28 may be implemented in accordance with the eNB 160 described in connection with FIG. 1. The eNB 2860 includes a processor 2803 that controls operation of the eNB 2860. The processor 2803 may also be referred to as a central processing unit (CPU). Memory 2805, which may include read-only memory (ROM), random access memory (RAM), a combination of the two or any type of device that may store information, provides instructions 2807*a* and data 2809*a* to the processor 2803. A portion of the memory 2805 may also include non-volatile random access memory (NVRAM). Instructions 2807*b* and data 2809*b* may also reside in the processor 2803. Instructions 2807*b* and/or data 2809*b* loaded into the processor 2803 may also include instructions 2807*a* and/or data 2809*a* from memory 2805 that were loaded for execution or processing by the processor 2803. The instructions 2807*b* may be executed by the processor 2803 to implement the method 400 described above.

The eNB 2860 may also include a housing that contains one or more transmitters 2817 and one or more receivers 2878 to allow transmission and reception of data. The transmitter(s) 2817 and receiver(s) 2878 may be combined into one or more transceivers 2876. One or more antennas 2880*a-n* are attached to the housing and electrically coupled to the transceiver 2876.

The various components of the eNB 2860 are coupled together by a bus system 2811, which may include a power bus, a control signal bus and a status signal bus, in addition to a data bus. However, for the sake of clarity, the various buses are illustrated in FIG. 28 as the bus system 2811. The eNB 2860 may also include a digital signal processor (DSP) 2813 for use in processing signals. The eNB 2860 may also include a communications interface 2815 that provides user access to the functions of the eNB 2860. The eNB 2860 illustrated in FIG. 28 is a functional block diagram rather than a listing of specific components.

Figure 29:
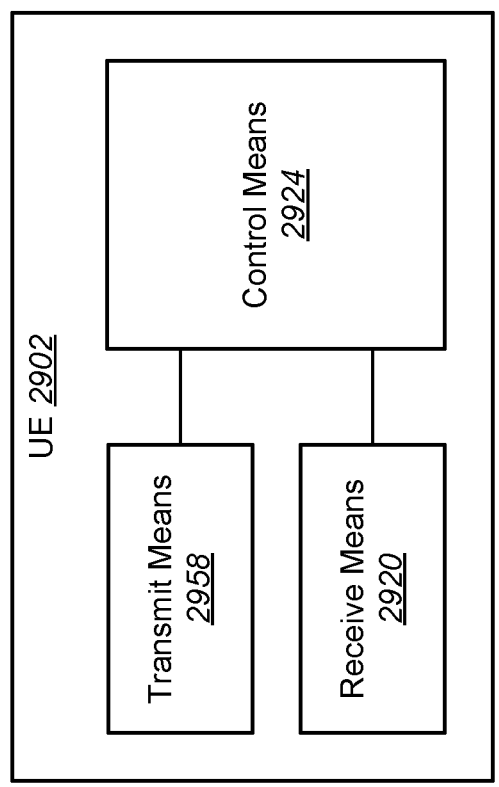
FIG. 29 is a block diagram illustrating one implementation of a UE in which systems and methods for uplink LAA operations may be implemented.

FIG. 29 is a block diagram illustrating one implementation of a UE 2902 in which systems and methods for uplink LAA operations may be implemented. The UE 2902 includes transmit means 2958, receive means 2920 and control means 2924. The transmit means 2958, receive means 2920 and control means 2924 may be configured to perform one or more of the functions described in connection with FIG. 1 above. FIG. 27 above illustrates one example of a concrete apparatus structure of FIG. 29. Other various structures may be implemented to realize one or more of the functions of FIG. 1. For example, a DSP may be realized by software.

Figure 30:
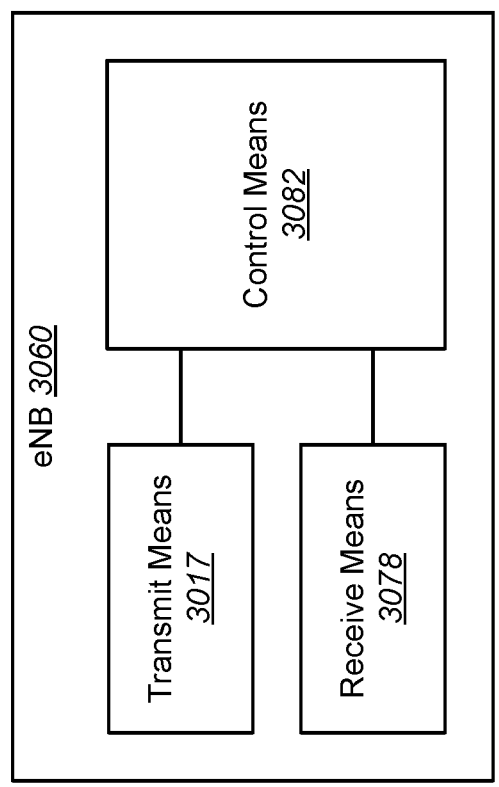
FIG. 30 is a block diagram illustrating one implementation of an eNB in which systems and methods for uplink LAA operations may be implemented.

FIG. 30 is a block diagram illustrating one implementation of an eNB 3060 in which systems and methods for uplink LAA operations may be implemented. The eNB 3060 includes transmit means 3017, receive means 3078 and control means 3082. The transmit means 3017, receive means 3078 and control means 3082 may be configured to perform one or more of the functions described in connection with FIG. 1 above. FIG. 28 above illustrates one example of a concrete apparatus structure of FIG. 30. Other various structures may be implemented to realize one or more of the functions of FIG. 1. For example, a DSP may be realized by software.

Figure 31:
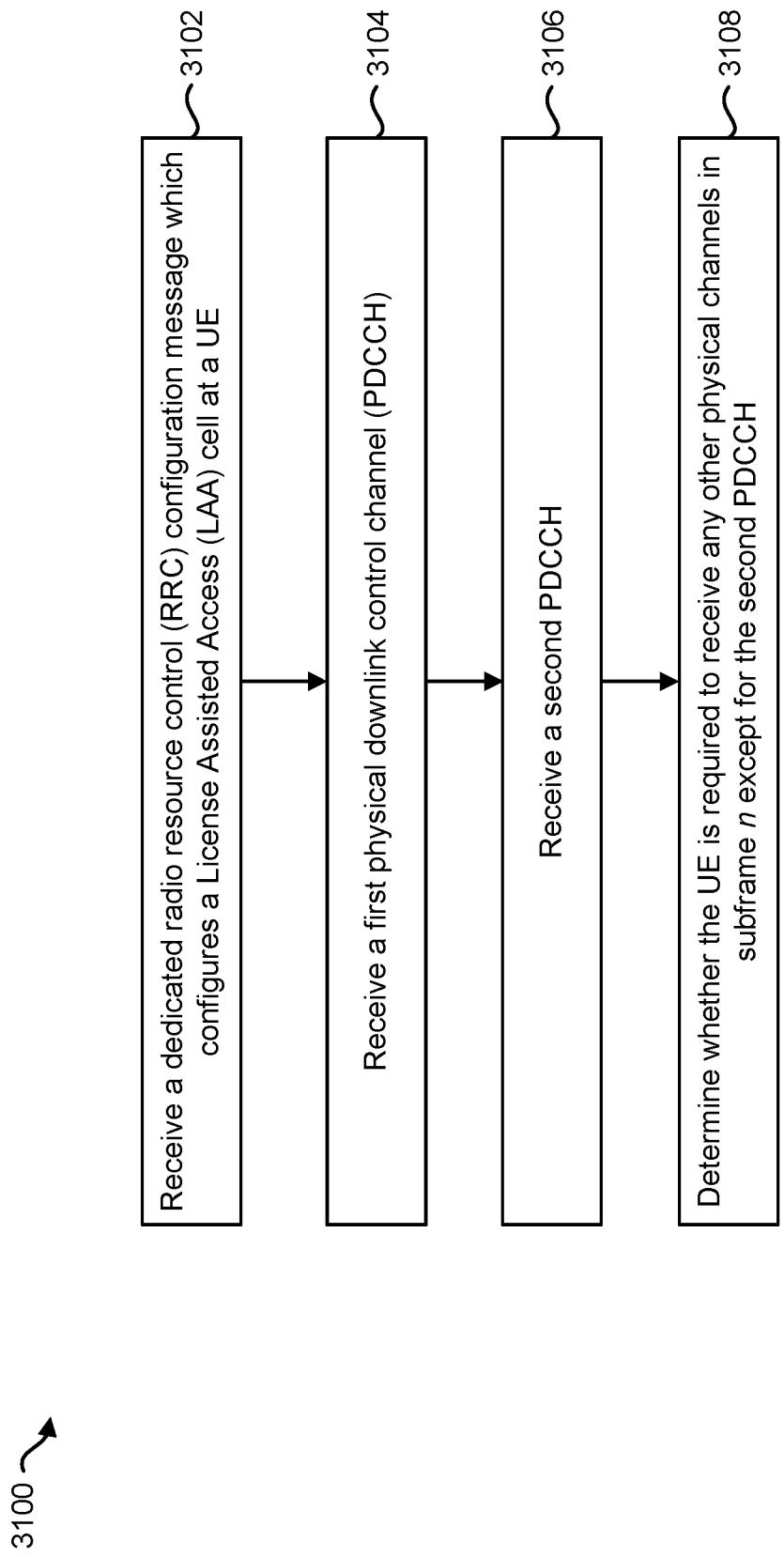
FIG. 31 is a flow diagram illustrating a method by a UE.

FIG. 31 is a flow diagram illustrating a method 3100 by a UE 102. The UE 102 may communicate with one or more eNBs 160 in a wireless communication network. In one implementation, the wireless communication network may include an LTE network.

The UE 102 may receive 3102 a dedicated radio resource control (RRC) configuration message which configures a License Assisted Access (LAA) cell. For example, the eNB 160 may send the RRC configuration message to configure an LAA secondary cell for the UE 102.

The UE 102 may receive 3104 a first physical downlink control channel (PDCCH). The first PDCCH may be a PDCCH with Cyclic Redundancy Check (CRC) scrambled by Common Control-Radio Network Temporary Identifier (CC-RNTI), and with a Downlink Control Information (DCI) format which contains a subframe configuration field.

The UE 102 may receive 3106 a second PDCCH. The second PDCCH may be a PDCCH with DCI formats for scheduling physical uplink shared channel(s) (PUSCH(s)) on the LAA cell.

The UE 102 may determine 3108 whether the UE 102 is required to receive any other physical channels in subframe n except for the second PDCCH. If the first PDCCH is detected in subframe n, and the first PDCCH is not detected in subframe n−1, and if the number of occupied Orthogonal Frequency Division Multiplexing (OFDM) symbols for the subframe n indicated by the subframe configuration field in the subframe n is less than 14, the UE 102 is not required to receive any other physical channels in subframe n except for the second PDCCH.

Figure 32:
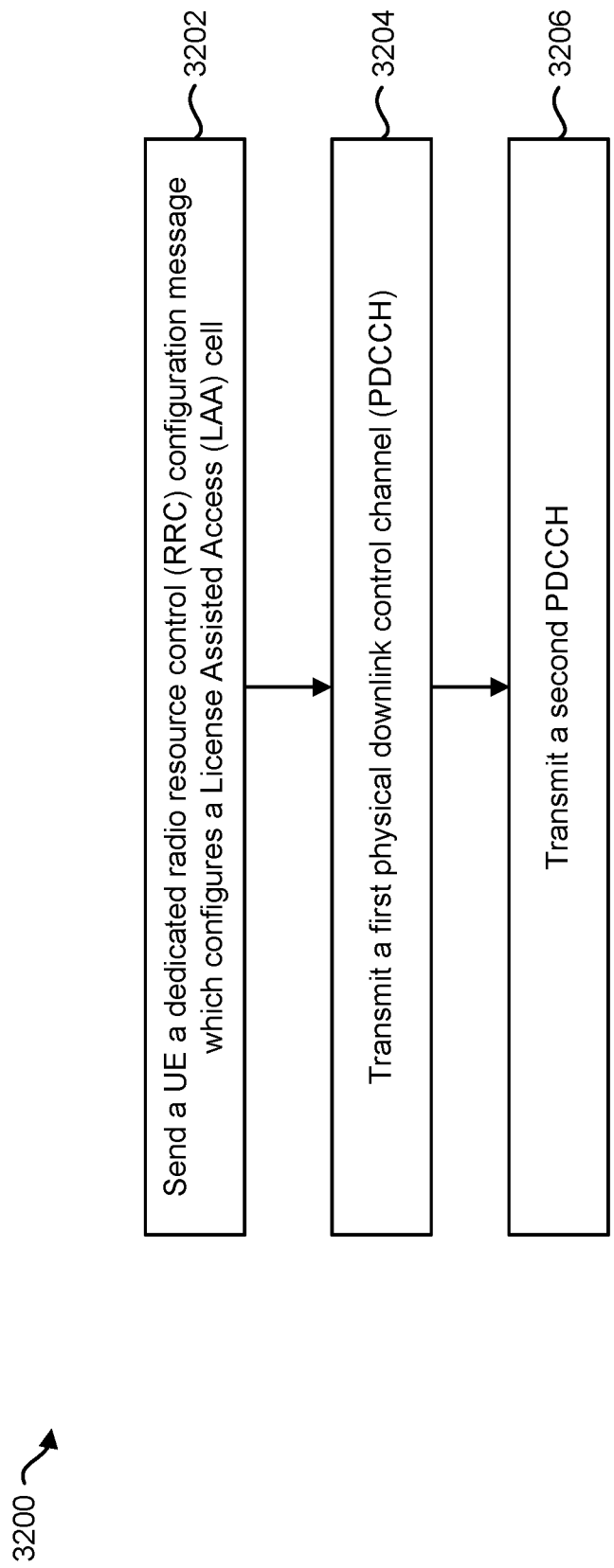
FIG. 32 is a flow diagram illustrating a method by an eNB.

FIG. 32 is a flow diagram illustrating a method 3200 by an eNB 160. The eNB 160 may communicate with one or more UEs 102 in a wireless communication network. In one implementation, the wireless communication network may include an LTE network.

The eNB 160 may send 3202 the UE 102 a dedicated radio resource control (RRC) configuration message which configures a License Assisted Access (LAA) cell. For example, the eNB 160 may send the RRC configuration message to configure an LAA secondary cell for the UE 102.

The eNB 160 may transmit 3204 a first physical downlink control channel (PDCCH). The first PDCCH may be a PDCCH with Cyclic Redundancy Check (CRC) scrambled by Common Control-Radio Network Temporary Identifier (CC-RNTI), and with a Downlink Control Information (DCI) format which contains a subframe configuration field.

The eNB 160 may transmit 3206 a second PDCCH. The second PDCCH may be a PDCCH with DCI formats for scheduling physical uplink shared channel(s) (PUSCH(s)) on the LAA cell.

If the first PDCCH is detected in subframe n, and the first PDCCH is not detected in subframe n−1, and if the number of occupied Orthogonal Frequency Division Multiplexing (OFDM) symbols for the subframe n indicated by the subframe configuration field in the subframe n is less than 14, the UE 102 is not required to receive any other physical channels in subframe n except for the second PDCCH.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
   radio resource control (RRC) message reception circuitry configured to receive a dedicated RRC configuration message which configures a License Assisted Access (LAA) serving cell; and
   physical downlink control channel (PDCCH) reception circuitry configured to receive a first PDCCH and a second PDCCH, wherein:
   the first PDCCH is a PDCCH with Cyclic Redundancy Check (CRC) scrambled by Common Control-Radio Network Temporary Identifier (CC-RNTI), and with a Downlink Control Information (DCI) format which contains a subframe configuration field on the LAA serving cell, the second PDCCH is a PDCCH with one of DCI formats for scheduling physical uplink shared channel(s) (PUSCH(s)) on the LAA serving cell, and
   if the first PDCCH is detected in subframe n, and the first PDCCH is not detected in subframe n−1, and if the number of occupied Orthogonal Frequency Division Multiplexing (OFDM) symbols for the subframe n indicated by the subframe configuration field in the subframe n is less than 14, the UE is required to receive the second PDCCH in the subframe n and the UE does not receive any other physical channels in the subframe n, except for the second PDCCH.

2. An evolved node B (eNB) communicating with a user equipment (UE), the eNB comprising:
   radio resource control (RRC) message transmission circuitry configured to send the UE a dedicated RRC configuration message which configures a License Assisted Access (LAA) serving cell; and
   physical downlink control channel (PDCCH) transmission circuitry configured to transmit a first PDCCH and a second PDCCH, wherein:
   the first PDCCH is a PDCCH with Cyclic Redundancy Check (CRC) scrambled by Common Control-Radio Network Temporary Identifier (CC-RNTI), and with a Downlink Control Information (DCI) format which contains a subframe configuration field on the LAA serving cell, the second PDCCH is a PDCCH with one of DCI formats for scheduling physical uplink shared channel(s) (PUSCH(s)) on the LAA serving cell, and
   if the first PDCCH is detected in subframe n, and the first PDCCH is not detected in subframe n−1, and if the number of occupied Orthogonal Frequency Division Multiplexing (OFDM) symbols for the subframe n indicated by the subframe configuration field in the subframe n is less than 14, the UE is required to receive the second PDCCH in the subframe n and the UE does not receive any other physical channels in the subframe n, except for the second PDCCH.

3. A method for a user equipment (UE), comprising:
   receiving a dedicated radio resource control (RRC) configuration message which configures a License Assisted Access (LAA) serving cell;
   receiving a first physical downlink control channel (PDCCH); and
   receiving a second PDCCH, wherein:
   the first PDCCH is a PDCCH with Cyclic Redundancy Check (CRC) scrambled by Common Control-Radio Network Temporary Identifier (CC-RNTI), and with a Downlink Control Information (DCI) format which contains a subframe configuration field on the LAA serving cell, the second PDCCH is a PDCCH with one of DCI formats for scheduling physical uplink shared channel(s) (PUSCH(s)) on the LAA serving cell, and
   if the first PDCCH is detected in subframe n, and the first PDCCH is not detected in subframe n−1, and if the number of occupied Orthogonal Frequency Division Multiplexing (OFDM) symbols for the subframe n indicated by the subframe configuration field in the subframe n is less than 14, the UE is required to receive the second PDCCH in the subframe n and the UE does not receive any other physical channels in the subframe n, except for the second PDCCH.

4. A method for an evolved node B (eNB) communicating with a user equipment (UE), the method comprising:
   sending the UE a dedicated radio resource control (RRC) configuration message which configures a License Assisted Access (LAA) serving cell;
   transmitting a first physical downlink control channel (PDCCH); and
   transmitting a second PDCCH, wherein:
   the first PDCCH is a PDCCH with Cyclic Redundancy Check (CRC) scrambled by Common Control-Radio Network Temporary Identifier (CC-RNTI), and with a Downlink Control Information (DCI) format which contains a subframe configuration field on the LAA serving cell, the second PDCCH is a PDCCH with one of DCI formats for scheduling physical uplink shared channel(s) (PUSCH(s)) on the LAA serving cell, and
   if the first PDCCH is detected in subframe n, and the first PDCCH is not detected in subframe n−1, and if the number of occupied Orthogonal Frequency Division Multiplexing (OFDM) symbols for the subframe n indicated by the subframe configuration field in the subframe n is less than 14, the UE is required to receive the second PDCCH in the subframe n and the UE does not receive any other physical channels in the subframe n, except for the second PDCCH.

* * * * *